US007711599B1

(12) United States Patent  (10) Patent No.: US 7,711,599 B1
Libman  (45) Date of Patent: May 4, 2010

(54) APPARATUS FOR PREPARING CLIENT COMMUNICATIONS INVOLVING FINANCIAL PRODUCTS AND SERVICES

(75) Inventor: Richard Marc Libman, Scottsdale, AZ (US)

(73) Assignee: Phoenix Licensing, LLC, Scottsdale, AZ (US)

( * ) Notice: Subject to any disclaimer, the term of this patent is extended or adjusted under 35 U.S.C. 154(b) by 0 days.

(21) Appl. No.: 09/592,086

(22) Filed: Jun. 12, 2000

Related U.S. Application Data

(63) Continuation of application No. 08/834,240, filed on Apr. 15, 1997, now Pat. No. 6,076,072, which is a continuation-in-part of application No. 08/661,004, filed on Jun. 10, 1996, now Pat. No. 5,987,434.

(51) Int. Cl.
  *G06Q 30/00* (2006.01)
(52) U.S. Cl. ............... 705/14.17; 705/14.1; 705/14.25; 705/14.49; 705/14.53; 705/14.66; 705/14.67; 705/14.72; 705/4; 705/35; 705/40
(58) Field of Classification Search ............ 705/4, 705/10, 14, 30, 35, 36, 38, 40, 14.17, 14.1, 705/14.25, 14.49, 14.53, 14.66, 14.67; 380/51, 380/55; 206/232
See application file for complete search history.

(56) References Cited

U.S. PATENT DOCUMENTS

| 4,088,981 | A | 5/1978 | Gott |
| 4,221,086 | A | 9/1980 | Berman |
| 4,237,799 | A | 12/1980 | Berman |

(Continued)

FOREIGN PATENT DOCUMENTS

CA 2282873 3/2001

(Continued)

OTHER PUBLICATIONS

*AGENA for Windows: Marketing and Sales Campaigns*, Software Brochure, AGENA Corporation, 4 pages (Nov. 1995).

(Continued)

*Primary Examiner*—Raquel Alvarez
(74) *Attorney, Agent, or Firm*—Berry & Associates P.C.

(57) ABSTRACT

A method and apparatus are provided for automatically preparing a client communication pertaining to a financial product for a client, wherein the client communication is for combined use with a corresponding host vehicle. The method comprises providing a format for the client communication wherein the communication format includes a variable portion; inputting into a computer-accessible storage medium variable information other than a client identification; inputting into the storage medium decision information; and using the decision information to select a subset of the variable information for inclusion in a variable portion of the client communication corresponding to the variable portion of the client communication format. The apparatus comprises an inputting device for inputting into a computer-accessible storage medium variable information comprising other than a client identification and decision information; a processor operatively coupled to the storage medium for using the decision information to automatically select a subset of the variable information for each of the clients; and an output preparing component in operative communication with the processor for preparing the client communications and for automatically inserting into the client communication the subset of variable information for the corresponding and respective client.

175 Claims, 25 Drawing Sheets

U.S. PATENT DOCUMENTS

| | | | |
|---|---|---|---|
| 4,567,359 A | 1/1986 | Lockwood | 235/381 |
| 4,751,640 A | 6/1988 | Lucas et al. | |
| 4,752,675 A | 6/1988 | Zetmeir | 235/375 |
| 4,831,526 A | 5/1989 | Luchs et al. | |
| 5,039,075 A | 8/1991 | Mayer | 270/1.1 |
| 5,124,911 A | 6/1992 | Sack | |
| 5,220,501 A | 6/1993 | Lawlor et al. | |
| 5,245,535 A | 9/1993 | Weiss et al. | |
| 5,319,542 A | 6/1994 | King, Jr. et al. | 364/401 |
| 5,388,165 A | 2/1995 | Deaton et al. | 382/7 |
| 5,446,653 A | 8/1995 | Miller et al. | 364/401 |
| 5,446,891 A | 8/1995 | Kaplan et al. | 395/600 |
| 5,453,601 A | 9/1995 | Rosen | |
| 5,455,407 A | 10/1995 | Rosen | |
| 5,502,636 A | 3/1996 | Clarke | |
| 5,504,675 A | 4/1996 | Cragun et al. | |
| 5,523,942 A | 6/1996 | Tyler et al. | |
| 5,537,314 A | 7/1996 | Kanter | |
| 5,550,746 A | 8/1996 | Jacobs | |
| 5,557,518 A | 9/1996 | Rosen | |
| 5,576,951 A | 11/1996 | Lockwood | 395/227 |
| 5,592,375 A | 1/1997 | Salmon et al. | |
| 5,619,558 A | 4/1997 | Jheeta | 379/90 |
| 5,621,797 A | 4/1997 | Rosen | |
| 5,640,835 A | 6/1997 | Muscoplat | |
| 5,642,419 A | 6/1997 | Rosen | |
| 5,644,727 A | 7/1997 | Atkins | |
| 5,655,085 A * | 8/1997 | Ryan et al. | 705/4 |
| 5,659,165 A | 8/1997 | Jennings et al. | |
| 5,671,280 A | 9/1997 | Rosen | |
| 5,671,282 A | 9/1997 | Wolff et al. | |
| 5,673,402 A | 9/1997 | Ryan et al. | |
| 5,687,322 A | 11/1997 | Deaton | |
| 5,699,527 A | 12/1997 | Davidson | 395/238 |
| 5,703,949 A | 12/1997 | Rosen | |
| 5,710,889 A | 1/1998 | Clark et al. | |
| 5,721,831 A | 2/1998 | Waits et al. | |
| 5,732,400 A | 3/1998 | Mandler et al. | |
| 5,745,886 A | 4/1998 | Rosen | |
| 5,761,650 A * | 6/1998 | Munsil et al. | 705/34 |
| 5,774,553 A | 6/1998 | Rosen | |
| 5,787,403 A | 7/1998 | Randle | |
| 5,794,218 A | 8/1998 | Jennings et al. | |
| 5,799,097 A | 8/1998 | Rosen | |
| 5,806,057 A | 9/1998 | Gormley et al. | 707/1 |
| 5,819,241 A | 10/1998 | Reiter | |
| 5,819,263 A | 10/1998 | Bromley et al. | 707/3 |
| 5,822,735 A * | 10/1998 | De Lapa et al. | 705/14 |
| 5,825,856 A | 10/1998 | Porter et al. | |
| 5,844,971 A | 12/1998 | Elias et al. | |
| 5,845,302 A | 12/1998 | Cyman | |
| 5,852,811 A | 12/1998 | Atkins | |
| 5,857,175 A | 1/1999 | Day | |
| 5,866,889 A | 2/1999 | Weiss et al. | |
| 5,878,139 A | 3/1999 | Rosen | |
| 5,890,140 A | 3/1999 | Clark et al. | |
| 5,893,075 A | 4/1999 | Plainfield et al. | 705/14 |
| 5,895,468 A | 4/1999 | Whitmyer | |
| 5,898,154 A | 4/1999 | Rosen | |
| 5,913,202 A | 6/1999 | Motoyama | |
| 5,920,629 A | 7/1999 | Rosen | |
| 5,926,800 A | 7/1999 | Baronowski | |
| 5,930,764 A | 7/1999 | Melchione et al. | |
| 5,933,811 A | 8/1999 | Angles | |
| 5,953,423 A | 9/1999 | Rosen | |
| 5,963,648 A | 10/1999 | Rosen | |
| 5,963,968 A | 10/1999 | Warmus et al. | |
| 5,966,695 A | 10/1999 | Melchione et al. | |
| 5,974,396 A | 10/1999 | Anderson et al. | 705/10 |
| 5,978,485 A | 11/1999 | Rosen | |
| 5,987,434 A * | 11/1999 | Libman | 705/36 |
| 6,018,721 A | 1/2000 | Aziz et al. | |
| 6,021,397 A | 2/2000 | Jones | |
| 6,026,370 A | 2/2000 | Jermyn | 705/14 |
| 6,029,153 A | 2/2000 | Bauchner et al. | |
| 6,047,067 A | 4/2000 | Rosen | |
| 6,047,887 A | 4/2000 | Rosen | |
| 6,049,782 A | 4/2000 | Gottesman et al. | |
| 6,055,513 A | 4/2000 | Katz et al. | 705/26 |
| 6,058,378 A | 5/2000 | Clark et al. | |
| 6,064,969 A | 5/2000 | Haskins | |
| 6,076,068 A | 6/2000 | DeLapa et al. | |
| 6,076,072 A * | 6/2000 | Libman | 705/34 |
| 6,088,686 A | 7/2000 | Walker et al. | |
| 6,122,190 A | 9/2000 | Ooishi | |
| 6,122,625 A | 9/2000 | Rosen | |
| 6,131,810 A | 10/2000 | Weiss et al. | |
| 6,134,532 A | 10/2000 | Lazarus | |
| 6,138,139 A | 10/2000 | Beck | |
| 6,141,666 A | 10/2000 | Tobin | |
| 6,154,527 A | 11/2000 | Porter et al. | |
| 6,175,921 B1 | 1/2001 | Rosen | |
| 6,188,993 B1 | 2/2001 | Eng et al. | |
| 6,205,436 B1 | 3/2001 | Rosen | |
| 6,226,623 B1 | 5/2001 | Schein et al. | |
| 6,233,564 B1 | 5/2001 | Schulze et al. | |
| 6,236,975 B1 | 5/2001 | Boe et al. | |
| 6,272,528 B1 | 8/2001 | Cullen et al. | |
| 6,327,599 B1 | 12/2001 | Warmus et al. | 707/517 |
| 6,330,543 B1 | 12/2001 | Kepecs | |
| 6,332,154 B2 | 12/2001 | Beck | |
| 6,336,095 B1 | 1/2002 | Rosen | |
| 6,349,290 B1 | 2/2002 | Horowitz et al. | |
| 6,354,490 B1 | 3/2002 | Weiss et al. | |
| 6,411,686 B1 | 6/2002 | Porter et al. | |
| 6,453,302 B1 | 9/2002 | Johnson et al. | |
| 6,470,156 B1 | 10/2002 | Sahay | 399/82 |
| 6,513,019 B2 | 1/2003 | Lewis | |
| 6,611,811 B1 | 8/2003 | Deaton et al. | |
| 7,072,849 B1 | 7/2006 | Filepp et al. | 705/14 |
| 2002/0026349 A1 | 2/2002 | Reilly | |
| 2002/0026351 A1 | 2/2002 | Coleman | |
| 2003/0216965 A1 | 11/2003 | Libman | |
| 2004/0030626 A1 | 2/2004 | Libman | |
| 2004/0039588 A1 | 2/2004 | Libman | |
| 2005/0154658 A1 | 7/2005 | Bove | |
| 2006/0004642 A1 | 1/2006 | Libman | |

FOREIGN PATENT DOCUMENTS

| | | |
|---|---|---|
| CA | 2590237 | 3/2001 |
| EP | 0 354 260 A1 | 2/1990 |
| EP | 0 572 281 A1 | 12/1993 |
| EP | 1 071 030 A1 | 1/2001 |
| WO | WO 97/15023 A2 | 4/1997 |
| WO | WO 97/34246 A1 | 9/1997 |
| WO | WO 98/02835 | 1/1998 |
| WO | WO 99/12115 | 3/1999 |
| WO | WO 99/22328 A1 | 5/1999 |
| WO | WO 99/33012 | 7/1999 |

OTHER PUBLICATIONS

*The Agency Manager: Putting Everything On The Desktop with Applied Systems*, Software Brochure, Applied Systems, Los Angeles, California, 12 pages (1994).

SelectQuote Insurances Services Letter and Quote, SelectQuote Insurance Services of San Francisco, California, 8 pages (Jun. 12, 1995).

Sommers/Moreland & Associates, Inc. Letter and Quote, Sommers/Moreland & Associates, Inc., Atlanta, Georgia, 11 pages (Jul. 8, 1995).

Wells Fargo Insurance Services Letter and Sales Literature, Wells Fargo Services, Brisbane, California, 4 pages (date unknown).

Consumer's Choice Financial Services Company Quote, 1 page (Nov. 28, 1995).
USAA Credit Card Statement Attachment, 2 pages (1997).
AT&T Account Statement, 4 pages (Jan. 1997).
U.S. Appl. No. 09/354,802, filed Jul. 16, 1999, Libman.
David T. Phillips and Co. Insurance Solicitation, 6 pages (Nov. 17, 1995).
Equiguard Insurance Services, Inc. Solicitation, 6 pages (Nov. 1995).
CUNA Life Insurance Solication, 9 pages (date unknown).
American Savings Bank Solicitation, 5 pages (date appears to be before Feb. 3, 1995).
IQ Insurance Quote Services, Inc. Solicitation, 5 pages (Jul. 12, 1995).
TermQuote Life Insurance Solicitation, 3 pages (date unknown).
American Airlines AAdvantage Program Statement, 2 pages (Dec. 8, 1995).
Globe Life and Accident Insurance Co. Solicitation, 3 pages (date unknown).
Jackson National Life Insurance Co. Solicitation, 6 pages (Jul. 1995).
Teachers Insurance and Annuity Association Solicitation, 4 pages (Nov. 1994).
Foley, John, "Market of One: Ready, Aim, Sell!," *Information Week*, pp. 34-36, 40, 42 and 44 (Feb. 17, 1997).
*Electronic Image Management—EIM*, Brochure from Applied Systems, 6 pages (Jan. 1996).
Premiumatic Plan Life Insurance Solicitation, United Services Life Insurance Company, 4 pages (date unknown).
SelectQuote Insurances Services Letter and Attachments, SelectQuote Insurance Services of San Francisco, California, 4 pages (Jul. 5, 1995).
SelectQuote Insurances Services Letter and Insurance Application, SelectQuote Insurance Services of San Francisco, California, 7 pages (Jun. 27, 1995).
SelectQuote Insurances Services Letter and Quote, SelectQuote Insurance Services of San Francisco, California, 6 pages (Jun. 12, 1995).
USLife All American Life Insurance Company Account Statement, 1 page (appears to be before Jan. 15, 1997).
KeyMoney Access Account Statement, 2 pages (Jan. 27, 1997).
Wells Fargo Proven Credit Visa Gold Account Statement, 4 pages (Jan. 8, 1997).
ABN-AMRO Mortgage Acceleration Offer Letter, 2 pages, dated Jul. 29, 2002, earliest date for letters/processes of this type unknown but possibly early 1990's (unconfirmed).
Alliance Mortgage Company Equity Accelerator™ Solicitation Letter with attachments, 3 pages (dated Mar. 10, 1994).
Enrico, D., "Dollars and Dialers: Phone company's plan to sell names stirs controversy," *Newsday: The Long Island Newspaper*, Jun. 11, 1990, pp. 3 and 18.
Colonial Penn Life "Happy Birthday" letter, internal date of Apr. 15, 1993.
Colonial Penn Life, 1Q91 GBL Birthday Results as of Dec. 27, 1991.
Colonial Penn Life, 2Q91 GBL Birthday Results as of Dec. 27, 1991.
Colonial Penn Life, 1Q91 Lifechoice Birthday Results as of Dec. 27, 1991.
Colonial Penn Life, 2Q91 Lifechoice Birthday Results as of Dec. 27, 1991.
Colonial Penn Life, "Life Advertising 1986."
Colonial Penn Life, Memorandum, "4Q90 GLB Birthday Campaign—Input Document," May 8, 1990.
AT&T Universal Gold MasterCard, Apr. 1993, 8 pages.
AT&T Universal MasterCard, Apr. 1993, 8 pages.
Ford Citibank MasterCard billing statements, Feb. 1995, 2 pages.
Stanfed Financial Services, Inc., "BiWeekly Advantage Plan," home mortgage payment acceleration, Jul. 30, 1993, 6 pages.
America's Mortgage Servicing, Inc., unemployment insurance, Mar. 6, 1992, 4 pages.
Friedman, A.S., "Turnkey Selling Shifts Away From Quoting," *National Underwriter*, vol. 101, No. 46, National Underwriter Company, 1 Page (Nov. 17, 1997).
Goldstein, S., "Firstmerit Offers Customized Insurance Quotes With Checking Statements." *Bank Investment Product News*, vol. III, No. 15, Institutional Investor, Inc., 1 page (Apr. 27, 1997).

*Institutional Telemarketing Services*, Insurance Service Incorporated Brochure, 2 Pages (Date believed to be 1986 or 1987).
Larmer, F.L., "'Virtual Agent' Maximizes Small Bank Reach," *National Underwriter*, National Underwriter Company, p. 17 (Apr. 13, 1998).
Lauer, G., "FirstMerit: Using Technology to Personalize Mass-Marketed Life Insurance," *Bank Insurance Marketing*, vol. 6, No. 3, 2 Pages (Summer 1997).
*Newco™News*, Richard Libman, I.C.A. Insurance Marketing, Inc., 2 Pages (Jun. 1996).
"Virtual Agent Custom Markets Bank Insurance: High-volume, low-touch selling boosts profits," *FutureBanker*, 1 Page (Nov. 1997).
Berry, J. et al., "Database Marketing: A Potent New Tool for Selling," *Business Week*, pp. 56-62 (Sep. 5, 1994).
"American Express Acquires License For Banc One's Triumph Card Processing Software," *PR Newswire*, PR Newswire Association, Inc., 2 pages (Feb. 6, 1995).
Loeffler, L., "Computer helps marketers romance business clients," Marketing News, American Marketing Association, Chicago, IL, US, vol. 22, No. 6, Mar. 14, 1988, pp. 8-9.
Pitchon, J., "Using the computer to convert advertising enquiries into sales" Best's Review. Property—Casualty Insurance Edition, A.M. Best, US, vol. 83, No. 10, Feb. 1983, pp. 62, 64.
Alpeter V.R., "Market Fax: Computerized Support for Sales and Marketing," Small Business Computers, vol. 7, No. 3, May 1983, pp. 51-53.
Seller and Gray, "A Survey of Database Marketing," Graduate School of Management and Department of Information and Computer Science, University of California, Mar. 1999, pp. 1-45.
Pearson, S., "A Lasting Relationship (Databases in Direct Marketing)" Marketing, Haymarket Publishing, London, GB, vol. 25, No. 8, May 22, 1986, pp. 49-50, 52.
Drennan, Seybold Report, "Variable-Data Printing Comes of Age: Capabilities & Market Demand Coverage," Seybold Report on Publishing Systems, Media, PA, US, vol. 27, No. 2, Sep. 15, 1997, pp. 3-24.
Oppenheimer, N., "Hand-in-Hand Profit for Marketing and Data Processing," Direct Marketing, Hoke Communications, Garden City, NY, US, vol. 48, No. 6, Oct. 1985, pp. 60, 62, 65, 92, 137, 166-167.
Holtman, A. et al., Excerpts from "The New Age of Financial Services Marketing, A Hands-on Applications Guide to Harnessing the Power of Database Marketing," Financial Sourcebooks, Naperville, Illinois, 1992, 59 pages.
Nash, E., Excerpts from "Database Marketing, The Ultimate Marketing Tool," McGraw-Hill, Inc., 1993, 65 pages.
Morrall, K., Customize Your Cross-sell.
Webster's, Webster's Collegiate Dictionary, Tenth Edition, p. 823.
Business Week, "Click Here for Coverage," Business Week (describing online shopping for insurance), Jun. 1, 1998.
WebMaster Magazine, "Driving Forces," World Wide Web Winners, WebMaster Magazine (describing Progressive Web site), Aug. 1997.
Burch, Bill, "Companies turn to Internet server management firms," Network World (describing internet server outsourcing), Sep. 26, 1994.
Ellsworth, Jill H., "Staking a claim on the Internet," Nation's Business (small paragraph on p. 30 describing SDG Insurance Agency use of on-line forms), Jan. 1996.
Strazewski, Len, "Pioneers on the Web frontier," Rough Notes (describing agency insurance companies going online), May 1996.
Doucette, Nancy, "Aetna's newest location—on the Internet," Rough Notes (describing Aetna Life's electronic storefront), Nov. 1995.
Business Wire, "PC Quote partners in world's first virtual conference," Business Wire (describing stock quoting service), Apr. 22, 1996.
Business Wire, "Quicken InsureMarket To Debut With Major Carriers as Partners," Business Wire (describing Inuit partnering with insurance companies), Jun. 11, 1996.
Summons in *Direct Response Corporation, Response Worldwide Insurance Company, and Warner Insurance Company v. LPL Licensing, LLC, and Phoenix Licensing, LLC*, Civil Action No. 2:08-cv-00001-HRH, filed Jan. 3, 2008 in United States District Court, District of Arizona.

Complaint in *Direct Response Corporation, Response Worldwide Insurance Company, and Warner Insurance Company* v. *LPL Licensing, LLC, and Phoenix Licensing, LLC*, Civil Action No. 2:08-cv-00001-HRH, filed Jan. 3, 2008 in United States District Court, District of Arizona.
Corporate Disclosure Statement for *Direct Response Corporation, Response Worldwide Insurance Company, and Warner Insurance Company* v. *LPL Licensing, LLC, and Phoenix Licensing, LLC*, Civil Action No. 2:08-cv-00001-HRH, filed Jan. 3, 2008 in United States District Court, District of Arizona.
Complaint in *State Farm Mutual Automobile Insurance Company* v. *LPL Licensing LLC and Phoenix Licensing LLC*, Civil Action No. 2:2007cv01329, filed Jul. 10, 2007 in United States District Court, District of Arizona.
Complaint in *State Farm Bank, F.S.B.* v. *LPL Licensing, LLC and Phoenix Licensing, LLC*, Civil Action No. 2:2007cv01895, filed Oct. 4, 2007, in United States District Court, District of Arizona.
Complaint in *United Services Automobile Association (USAA)* v. *LPL Licensing LLC and Phoenix Licensing LLC*, Civil Action No. 2:07-cv-01968-FJM, filed Oct. 12, 2007, in United States District Court, District of Arizona.
Complaint in *Citicorp Credit Services Inc.* v. *LPL Licensing, LLC and Phoenix Licensing, LLC*, Civil Action No. 1:2007cv00649, filed Oct. 17, 2007, in United States District Court, District of Delaware.
Complaint in *Discover Products, Inc.* v. *LPL Licensing, LLC and Phoenix Licensing, LLC*, Civil Action No. 1:2007cv05776, filed Oct. 12, 2007, in United States District Court, Northern District of Illinois, Eastern Division.
Complaint in *LPL Licensing LLC and Phoenix Licensing LLC* v. *Chase Manhattan Mortgage Corporation, JP Morgan Chase Bank, N.A., Citibank, N.A., Citibank USA, N.A., Citibank (South Dakota), N.A., CitiMortgage, Inc., CitiGroup, Inc., Citi Assurance Services Inc., Countrywide Home Loans, Inc., Countrywide Insurance Services, Inc., Discover Financial Services, Inc., Discover Bank, GMAC Mortgage, L.L.C., GMAC Insurance Marketing, Inc., GMCA Bank, Liberty Life Insurance Company, Response Worldwide Insurance Company, Direct Response Corporation, Warner Insurance Company, State Farm Mutual Automobile Insurance Company, State Farm Bank, F.S.B., USAA Federal Savings Bank and USAA Savings Bank*, Civil Action No. 2:2007cv00387, filed Aug. 31, 2007, in United States District Court, Eastern District of Texas, Marshall Division.
Citi Parties' Motion to Consolidate and Transfer under 28 U.S.C. § 1407 in *In re LPL and Phoenix Licensing Litigation—MDL*, Civil Action No. MDL No. 1910, filed Oct. 24, 2007, Judicial Panel on Multidistrict Litigation.
Citi Parties' Brief in Support of Their Motion to Consolidate and Transfer Under 28 U.S.C. § 1407 in *In re LPL and Phoenix Licensing Litigation—MDL*, Civil Action No. MDL No. 1910, filed Oct. 24, 2007, Judicial Panel on Multidistrict Litigation.
Schedule of Actions in *In re LPL and Phoenix Licensing Litigation—MDL*, Civil Action No. MDL No. 1910, filed Oct. 24, 2007, Judicial Panel on Multidistrict Litigation.
WebMaster Magazine, World Wide Winners, Aug. 1997.
Burch, Companies Turn to Internet Server Management Firms, Sep. 26, 1994.
Business Wire, Quicken Insure Market to Debut with Major Carriers as Partners, Jun. 11, 1996.
Business Wire, PC Quote Partners in World's First Virtual Conference, Apr. 22, 1996.
Doucette, Aetna's Newest Location—On the Internet, Nov. 1995.
Strazewski, Pioneers on the Web Frontier, May 1996.
Ellsworth, Staking a Claim on the Internet, Jan. 1996.
Holtman, The New Age of Financial Services: A Marketing Hands-On Applications Guide to Harnessing the Power of Database Marketing [divided into 3 parts: 89A, 89B, 89C], 1992.
Nash, Database Marketing [divided into 3 parts: 90A, 90B, 90C], 1993.
Foley, Ready, Aim, Sell, Feb. 1997.
Morrall, Customize Your Cross-Sell, Mar. 1993.
Berry, Database Marketing: A Potent New Tool for Selling, Sep. 5, 1994.

Stephen A. Cone, How KeyCorp Competes with Breakthrough Marketing, Summer 1996.
Kirsten Bell DeTienne; Jeffrey A. Thompson, Database Marketing and Organizational Learning Theory: Toward a Research Agenda, 1996.
Beverly Cramp, Reading Your Mind, Feb. 22, 1996.
John J. Harrison, Going Direct Adding Database Marketing to the Mix, May 1996.
John J. Harrison, Using a Database Marketing Strategy to Successfully Market Manage Care, May 1996.
Rob Yoegel, Financial Services Database Marketing, May 1996.
Joseph Radigan, Marketing, Mergers and Megabits, Mar. 1996.
Richard Schroeder, The Prefabricated Financial Plan Can Be Good, Cheap Alternative to Traditional Custom Plans, Nov. 7, 1995.
Takayuki Tachikawa; Makoto Takizawa, Communication Protocol for Group Distributed Objects, 1996.
Andrew Orent, AT&T Helps Financial Institutions Harness the Power of Customer Knowledge, Winter 1995.
Donald C. Mann, Database Marketing—How Its Changing Your Business, Aug. 1990.
Peter Child Robert J. Dennis Timothy D. Gokey Tim I. McGuire Mike Sherman Marc Singer, Can Marketing Regain the Personal Touch, 1995.
Ken Graham, Data Base Marketing with a PC-Based MCIF, Summer 1992.
Lillian Schapiro, How Guardian Got to Grips with Its Database, Feb. 1995.
Chanda Ghose Dasgupta Sanjoy Ghose, Response Modeling: A Segmentation and Targeting Approach for the Life Insurance Industry, 1993.
Liberty Life, Insurance Committee Meeting Minutes, Sep. 24, 1970.
Fred C. Malan, Marketing Options for New Borrowers, Feb. 19, 1986.
Liberty Life, Specialized Marketing Direct Mail Automation, Apr. 3, 1992.
Liberty Life, Liberty Life Direct Mail User Guide, Jul. 8, 1992.
Liberty Life, Direct Response Manual, 1994.
Leo Hertzog, Jr. Bill Korn, Taking Control of Information Fulfillment, Feb. 1992.
Clinton Wilder, Interactive Ads, Oct. 3, 1994.
Clinton Wilder, Interactive Ads—Online and Interactive Services are Providing Advertisers with an Entirely New and Convenient Way to Reach Affluent, Demographically Correct Customers, Oct. 3, 1994.
Quick Quote, QuickQuote Insurance Quote System and Related Publications, Jul. 1995.
Unknown, Response Required Data Structure for Information Interchange in an Office Network.
Precision Marketing, Banking on the Changing Future, May 29, 1995.
Katherine Morrall, Forging Bonds with the Mature Market, Sep. 1995.
Elizabeth Daniele, Serendipity or Science, Mar. 1993.
Ruth Kastrud, The Agent's Creativity Advantage, Sep. 1991.
Hearst Communications Inc. Zone—Getting Control of Your Cashflow—A Financial Planning Primer, Mar. 13, 1985.
T.J. Hughes, The Customer Database: Cross Selling Retail Financial Services, 1992.
Seattle Times, Economy Computers Cranking Out Personal Financial Plans—But Some Say the Plans are Just Boilerplate, Nov. 2, 1985.
Unknown, Tradewise—A New Electronic Concept in Insurance, May 1, 1994.
D.S. Fisher T.W. Tyler, Using Distributed OLTP Technology in a High Performance Storage System, Mar. 1995.
Charles C. Ashley, Rearranging the Distribution System, Oct. 1, 1991.
Countrywide affiliated companies, Countrywide affiliated company systems, Nov. 14, 1996, Apr. 1, 1993.
Interview of Richard Crone, Electronic Marketing: It's the Content That Counts, Jul. 1996.
Joachim Angstenberger, Database Marketing, Response Analysis and Forecasting in Financial Engineering, May 22, 1997.
Amy Dunkin, Unlocking the Mysteries of Term Life, Jul. 1, 1996.

Joseph B. Treaster, Internet Sales Offer an Insurance Alternative, Sep. 6, 1996.

Business Wire, QuickQuote Adds First Chicago NBD to Client Roster, Sep. 5, 1996.

Insweb Corporation, Insweb Corporation Online Quote System and Related Publications, 1997.

Amy Rice and Julie Hsu, EZ Reader: Embedded AI for Automatic Electronic Mail Interpretation and Routing, *Proceedings of the Thirteenth National Conference on Artificial Intelligence and the Eighth Innovative Applications of Artificial Intelligence Conference*, 1996.

"Defendants' Joint Invalidity Contentions," In re Phoenix Licensing, LLC Patent Litigation, *In the United States District Court for the District of Arizona*, Case No. MDL Docket No. 2:08-md-1910-MHM, 222 pages, Dec. 19, 2008.

Claim Chart re above "Defendants' Joint Invalidity Contentions," In re Phoenix Licensing, LLC Patent Litigation, *In the United States District Court for the District of Arizona*, Case No. MDL Docket No. 2:08-md-1910-MHM, 1,570 pages, Dec. 19, 2008.

Exhibit B re above "Defendants' Joint Invalidity Contentions," In re Phoenix Licensing, LLC Patent Litigation, *In the United States District Court for the District of Arizona*, Case No. MDL Docket No. 2:08-md-1910-MHM, 12 pages, Dec. 19, 2008.

\* cited by examiner

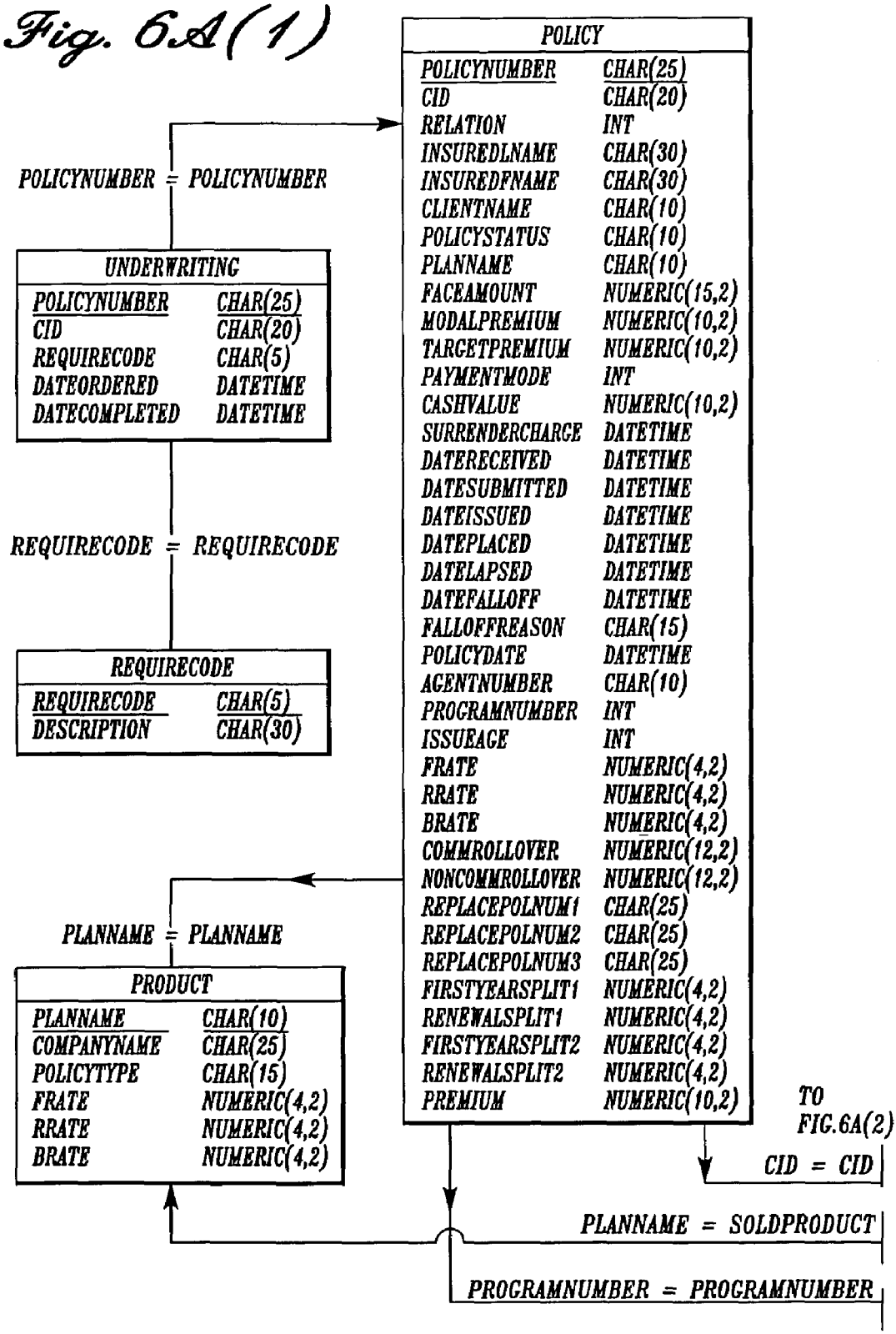
Fig. 6A(1)

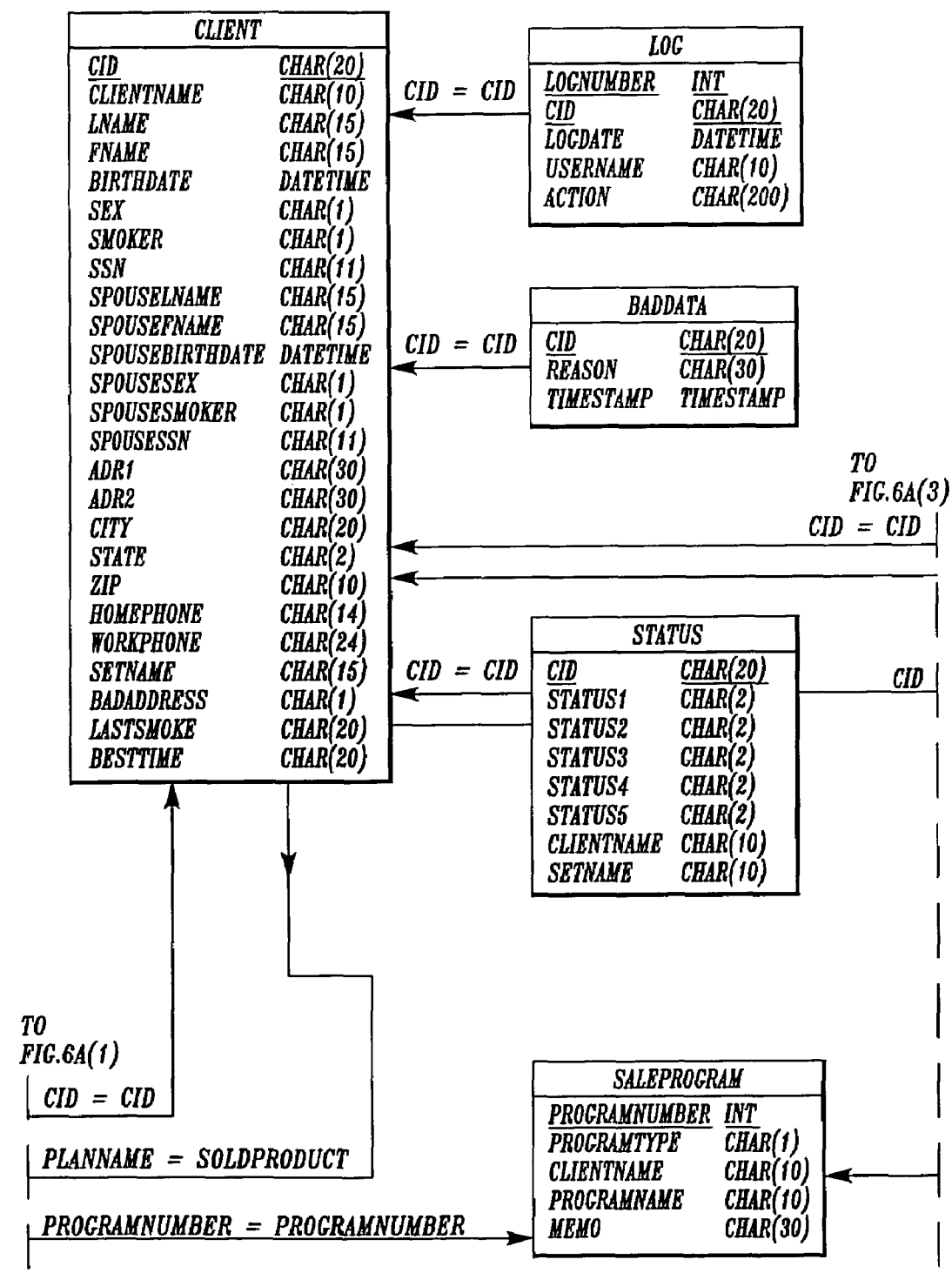
Fig. 6A(2)

*Fig. 6A(3)*

| QUOTE | |
|---|---|
| QUOTENUMBER | CHAR(20) |
| CID | CHAR(20) |
| PROGRAMNUMBER | INT |
| RELATION | INT |
| WAVE | INT |
| DATEFIRST | DATETIME |
| DATESECOND | DATETIME |
| DATEFINAL | DATETIME |
| DATECALC | DATETIME |
| AGEBASED | CHAR(7) |
| RESULTLETTER | CHAR(10) |
| RESULTDATE | DATETIME |
| RESULTCODE | CHAR(10) |
| SOLDPRODUCT | CHAR(10) |
| SOLDTARGET | NUMERIC(10,2) |
| SOLDPREMIUM | NUMERIC(10,2) |
| PAYMODE | INT |
| LETTERVERSION | CHAR(10) |
| HOWMANYMED | INT |
| SETNAME | CHAR(10) |
| APPFORM | CHAR(10) |
| ACCIDENTRIDER | INT |
| CHILDRIDER | INT |
| WPRIDER | INT |
| RIDER4 | INT |

| DEMOGRAPHIC | |
|---|---|
| CID | CHAR(20) |
| INCOME1 | INT |
| INCOME2 | INT |
| LOANNUMBER | CHAR(20) |
| LOANAMOUNT | NUMERIC(15,2) |
| LOANPAYMENT | NUMERIC(10,2) |
| LOANTYPE | CHAR(10) |
| LOANDATE | DATETIME |
| LOANINTERESTRATE | NUMERIC(4,2) |
| LOANTERM | INT |
| LOANMODE | INT |
| ACCOUNTNUMBER | CHAR(20) |
| HHNUMBER | CHAR(12) |
| ACCOUNTTYPE | CHAR(10) |
| BANKNUM | CHAR(5) |
| BRANCHNUM | CHAR(5) |
| BUSINESS | CHAR(1) |
| BDAYTYPE | CHAR(1) |
| TRWMATCH | CHAR(1) |
| ADRVERIFY | CHAR(1) |
| DWELLINGCODE | CHAR(1) |
| LENRES | INT |
| CENSUSHHINC | INT |
| CENSUSEDUC | INT |
| CENSUSHOME | INT |
| CENSUSCHILDREN | INT |
| CENSUSOWNEROC | INT |
| CENSUSRENT | INT |
| CENSUSLENRES | INT |
| MARITALCODE | CHAR(1) |
| PRESELDPARENT | CHAR(1) |
| PRESCHILDREN | CHAR(1) |
| HHCODE | CHAR(1) |
| OWNRENTCODE | CHAR(1) |
| CHILD0TO18 | INT |
| CHILD0TO3 | INT |
| CHILD4TO6 | INT |
| CHILD7TO9 | INT |
| CHILD10TO12 | INT |
| CHILD13TO18 | INT |
| PSYCLE | CHAR(2) |

TO FIG.6A(2)

CID = CID

CID

PROGRAMNUMBER = PROGRAMNUMBER

1

| PGM1 | |
|---|---|
| QUOTENUMBER | CHAR(20) |
| APLANNAME | CHAR(10) |
| ADB | NUMERIC(15,2) |
| APREM | NUMERIC(10,2) |
| ATPREM | NUMERIC(10,2) |
| ADURATION | INT |
| AMED | CHAR(1) |
| A2PLANNAME | CHAR(10) |
| A2DB | NUMERIC(15,2) |
| A2PREM | NUMERIC(10,2) |
| A2TPREM | NUMERIC(10,2) |
| A2DURATION | INT |
| A2MED | INT |
| BPLANNAME | CHAR(10) |
| BDB | NUMERIC(15,2) |
| BPREM | NUMERIC(10,2) |
| BTPREM | NUMERIC(10,2) |
| BDURATION | INT |
| BMED | INT |
| B2PLANNAME | CHAR(10) |
| B2DB | NUMERIC(15,2) |
| B2PREM | NUMERIC(10,2) |
| B2TPREM | NUMERIC(10,2) |
| B2DURATION | INT |
| B2MED | INT |
| CPLANNAME | CHAR(10) |
| CDB | NUMERIC(15,2) |
| CPREM | NUMERIC(10,2) |
| CTPREM | NUMERIC(10,2) |
| CNTPREM | NUMERIC(10,2) |
| CTNPREM | NUMERIC(10,2) |
| CDURATION | INT |
| CMED | INT |
| C2PLANNAME | CHAR(10) |
| C2DB | NUMERIC(15,2) |
| C2PREM | NUMERIC(10,2) |
| C2TPREM | NUMERIC(10,2) |
| C2NTPREM | NUMERIC(10,2) |
| C2TNPREM | NUMERIC(10,2) |
| C2DURATION | INT |
| C2MED | INT |
| CMONEYBACK | NUMERIC(15,2) |
| CMONEYWHEN | NUMERIC(15,2) |
| CID | CHAR(20) |
| PROGRAMNUMBER | INT |
| RELATION | INT |
| WAVE | INT |
| CTARGET | NUMERIC(10,2) |

| RESPONSE | |
|---|---|
| QUOTENUMBER | CHAR(20) |
| FNAME | CHAR(15) |
| LNAME | CHAR(15) |
| ADR1 | CHAR(30) |
| CITY | CHAR(20) |
| STATE | CHAR(2) |
| ZIP | CHAR(10) |
| DOB | DATETIME |
| GENDER | CHAR(1) |
| TOBUSE | CHAR(1) |
| LASTTOBUSE | CHAR(20) |
| WORKPHONE | CHAR(15) |
| HOMEPHONE | CHAR(15) |
| BESTTIME | CHAR(25) |
| MARRIED | CHAR(1) |
| SPFNAME | CHAR(15) |
| SPLNAME | CHAR(15) |
| SPDOB | DATETIME |
| SPGENDER | CHAR(1) |
| SPTOBUSE | CHAR(1) |
| SPLASTTOBUSE | CHAR(20) |
| SELAMOUNT | INT |
| SELPRODUCT | CHAR(10) |
| SPQUOTE | INT |
| REL | CHAR(20) |
| ADDFNAME | CHAR(15) |
| ADDLNAME | CHAR(15) |
| ADDDOB | DATETIME |
| ADDTOBUSE | CHAR(1) |
| ADDLASTTOBUSE | CHAR(20) |
| ADDQA1 | INT |
| ADDQA2 | INT |
| ADDQA3 | INT |
| ADDQPROD1 | CHAR(10) |
| ADDGENDER | CHAR(1) |

TO FIG.6B(1)　　　　　　　　　　　　　　　　　　　　　TO FIG.6B(3)
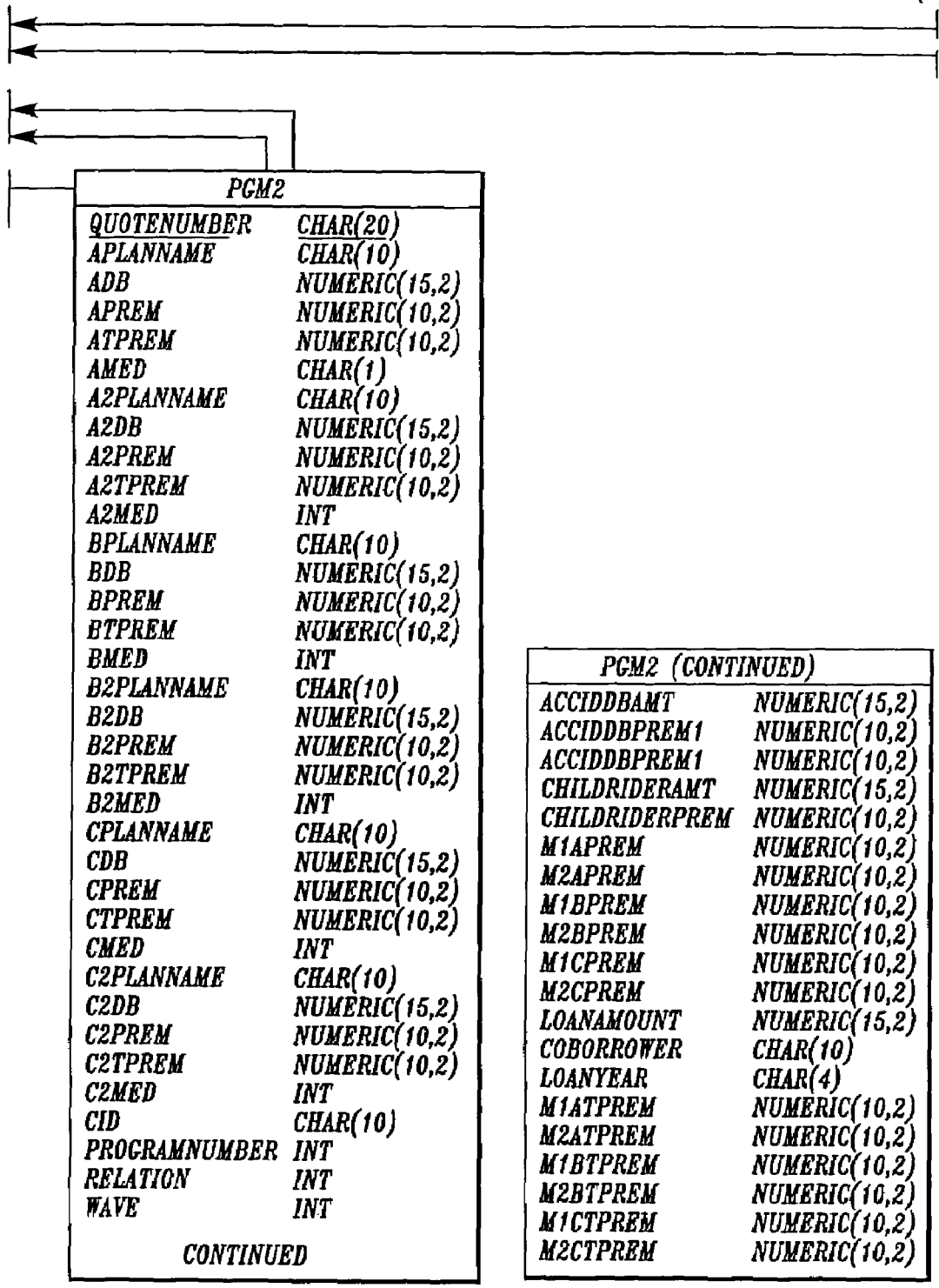
Fig. 6B(2)

| PGM3 | |
|---|---|
| QUOTENUMBER | CHAR(20) |
| APLANNAME | CHAR(10) |
| ADB | NUMERIC(15,2) |
| APREM | NUMERIC(10,2) |
| ATPREM | NUMERIC(10,2) |
| AMED | CHAR(1) |
| A2PLANNAME | CHAR(10) |
| A2DB | NUMERIC(15,2) |
| A2PREM | NUMERIC(10,2) |
| A2TPREM | NUMERIC(10,2) |
| A2MED | INT |
| BPLANNAME | CHAR(10) |
| BDB | NUMERIC(15,2) |
| BPREM | NUMERIC(10,2) |
| BTPREM | NUMERIC(10,2) |
| BMED | INT |
| B2PLANNAME | CHAR(10) |
| B2DB | NUMERIC(15,2) |
| B2PREM | NUMERIC(10,2) |
| B2TPREM | NUMERIC(10,2) |
| B2MED | INT |
| CPLANNAME | CHAR(10) |
| CDB | NUMERIC(15,2) |
| CPREM | NUMERIC(10,2) |
| CTPREM | NUMERIC(10,2) |
| CMED | INT |
| C2PLANNAME | CHAR(10) |
| C2DB | NUMERIC(15,2) |
| C2PREM | NUMERIC(10,2) |
| C2TPREM | NUMERIC(10,2) |
| C2MED | INT |
| CID | CHAR(10) |
| PROGRAMNUMBER | INT |
| RELATION | INT |
| WAVE | INT |
| CONTINUED | |

| PGM3 (CONTINUED) | |
|---|---|
| ACCIDDBAMT | NUMERIC(15,2) |
| ACCIDDBPREM1 | NUMERIC(10,2) |
| ACCIDDBPREM2 | NUMERIC(10,2) |
| WP1APREM | NUMERIC(10,2) |
| WP2APREM | NUMERIC(10,2) |
| WP1BPREM | NUMERIC(10,2) |
| WP2BPREM | NUMERIC(10,2) |
| WP1CPREM | NUMERIC(10,2) |
| WP2CPREM | NUMERIC(10,2) |
| REL | CHAR(10) |
| REL_NAME | CHAR(10) |
| WP1ATPREM | NUMERIC(10,2) |
| WP2ATPREM | NUMERIC(10,2) |
| WP1BTPREM | NUMERIC(10,2) |
| WP2BTPREM | NUMERIC(10,2) |
| WP1CTPREM | NUMERIC(10,2) |
| WP2CTPREM | NUMERIC(10,2) |

| PGM4 | |
|---|---|
| QUOTENUMBER | CHAR(20) |
| APLANNAME | CHAR(10) |
| ADB | NUMERIC(15,2) |
| APREM | NUMERIC(10,2) |
| ATPREM | NUMERIC(10,2) |
| AMED | CHAR(1) |
| A2PLANNAME | CHAR(10) |
| A2DB | NUMERIC(15,2) |
| A2PREM | NUMERIC(10,2) |
| A2TPREM | NUMERIC(10,2) |
| A2MED | INT |
| BPLANNAME | CHAR(10) |
| BDB | NUMERIC(15,2) |
| BPREM | NUMERIC(10,2) |
| BTPREM | NUMERIC(10,2) |
| BMED | INT |
| B2PLANNAME | CHAR(10) |
| B2DB | NUMERIC(15,2) |
| B2PREM | NUMERIC(10,2) |
| B2TPREM | NUMERIC(10,2) |
| B2MED | INT |
| CPLANNAME | CHAR(10) |
| CDB | NUMERIC(15,2) |
| CPREM | NUMERIC(10,2) |
| CTPREM | NUMERIC(10,2) |
| CMED | INT |
| C2PLANNAME | CHAR(10) |
| C2DB | NUMERIC(15,2) |
| C2PREM | NUMERIC(10,2) |
| C2TPREM | NUMERIC(10,2) |
| C2MED | INT |
| SPAPLANNAME | CHAR(10) |
| SPADB | NUMERIC(15,2) |
| SPAPREM | NUMERIC(10,2) |
| SPATPREM | NUMERIC(10,2) |
| SPAMED | CHAR(1) |
| SPA2PLANNAME | CHAR(10) |
| SPA2DB | NUMERIC(15,2) |
| SPA2PREM | NUMERIC(10,2) |
| SPA2TPREM | NUMERIC(10,2) |
| SPA2MED | INT |
| CONTINUED | |

| PGM4 (CONTINUED) | |
|---|---|
| SPBPLANNAME | CHAR(10) |
| SPBDB | NUMERIC(15,2) |
| SPBPREM | NUMERIC(10,2) |
| SPBTPREM | NUMERIC(10,2) |
| SPBMED | INT |
| SPB2PLANNAME | CHAR(10) |
| SPB2DB | NUMERIC(15,2) |
| SPB2PREM | NUMERIC(10,2) |
| SPB2TPREM | NUMERIC(10,2) |
| SPB2MED | INT |
| SPCPLANNAME | CHAR(10) |
| SPCDB | NUMERIC(15,2) |
| SPCPREM | NUMERIC(10,2) |
| SPCTPREM | NUMERIC(10,2) |
| SPCMED | INT |
| SPC2PLANNAME | CHAR(10) |
| SPC2DB | NUMERIC(15,2) |
| SPC2PREM | NUMERIC(10,2) |
| SPC2TPREM | NUMERIC(10,2) |
| SPC2MED | INT |
| CID | CHAR(10) |
| PROGRAMNUMBER | INT |
| RELATION | INT |
| WAVE | INT |
| ACCIDDBAMT | NUMERIC(15,2) |
| ACCIDDBPREM1 | NUMERIC(10,2) |
| ACCIDDBPREM1 | NUMERIC(10,2) |
| WP1APREM | NUMERIC(10,2) |
| WP2APREM | NUMERIC(10,2) |
| WP1BPREM | NUMERIC(10,2) |
| WP2BPREM | NUMERIC(10,2) |
| WP1CPREM | NUMERIC(10,2) |
| WP2CPREM | NUMERIC(10,2) |
| REL | CHAR(10) |
| REL_NAME | CHAR(10) |
| WP1ATPREM | NUMERIC(10,2) |
| WP2ATPREM | NUMERIC(10,2) |
| WP1BTPREM | NUMERIC(10,2) |
| WP2BTPREM | NUMERIC(10,2) |
| WP1CTPREM | NUMERIC(10,2) |
| WP2CTPREM | NUMERIC(10,2) |
| OOM | CHAR(20) |

Fig. 6B(4)

PRODUCTION AND SCHEDULING
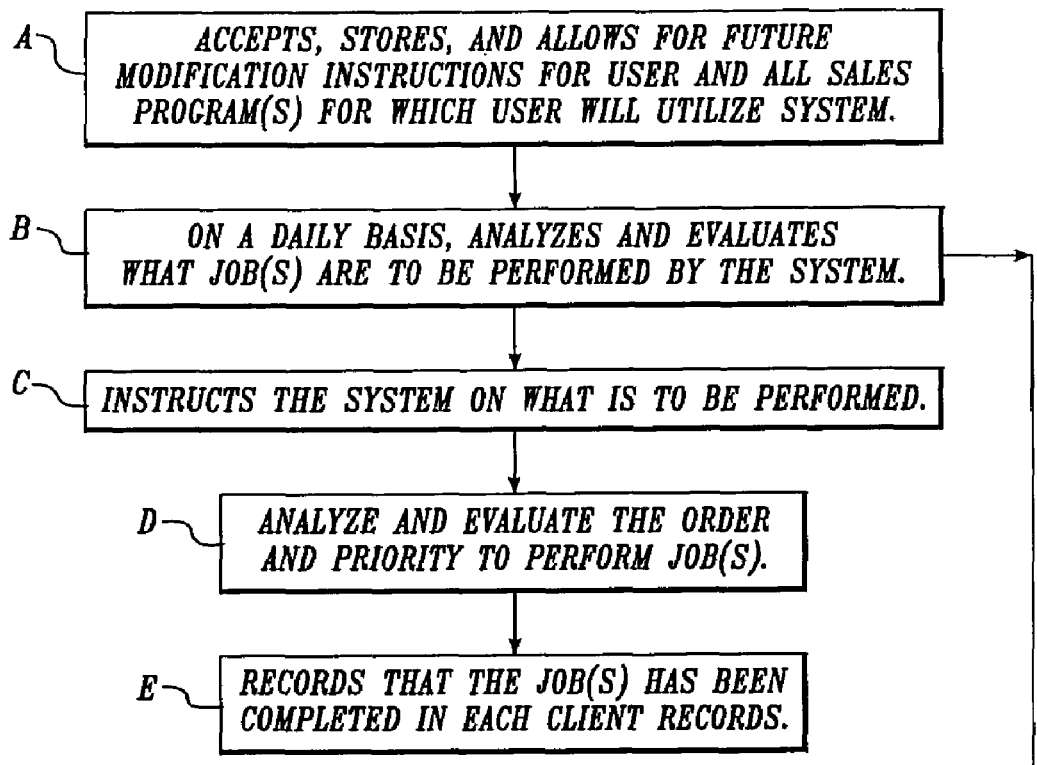
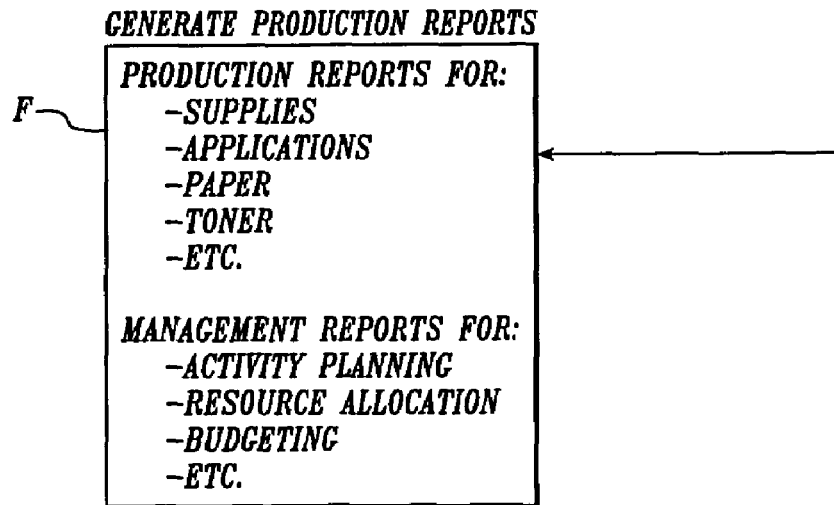
Fig. 14

APPARATUS FOR PREPARING CLIENT COMMUNICATIONS INVOLVING FINANCIAL PRODUCTS AND SERVICES

This application is a continuation of Ser. No. 08/834,240 filed Apr. 15, 1997, now U.S. Pat. No. 6,076,072, which is a continuation-in-part of Ser. No. 08/661,004 filed Jun. 10, 1996, now U.S. Pat. No. 5,987,434.

BACKGROUND OF THE INVENTION

1. Field of the Invention

The present invention relates to methods and apparatus for automatically preparing financial product and/or financial service-related communications such as advertisements, marketing solicitations, financial product sales solicitations, notices and the like for dissemination to clients, potential clients, etc. More specifically, it relates to methods and apparatus suitable for preparing such communications in a fully automated or significantly automated manner permitting large volumes of communications to be prepared and delivered quickly, efficiently, and cost effectively.

2. Description of the Related Art

The importance of widely-distributed written or printed client communications such as advertising, solicitations, etc. is well known in the marketing and advertising field. Their applicability to the financial products and services industry also is well known. The revenue generated from sales of various products and services advertised in these solicitation measures in the many millions of dollars per year for all industries. Their revenue generation in the financial industry also has been significant, and this industry has been one of the fastest growing in this area.

Traditionally, client communications of this type have been mass-distributed using techniques such as direct mail. A substantial drawback of the direct mail approach has been the relatively significant cost of distributing the communications. The transmitters and distributors of the communications often have been required to bear the expense of the communications themselves, in some cases the envelopes in which they are contained, the labor involved in stuffing the envelopes, the postage, etc.

Over the years, many businesses which dispatch mail to customers or potential customers as a routine part of their business have seized upon the tremendous profit potential of widely distributing communications by including them as inserts or "stuffers" within the routine mailings. Businesses such as commercial banks, credit card companies, brokerage firms, mortgage companies, insurance companies and utilities, to name a few, commonly include stuffers which offer products and services running the gamut from trinkets and souvenirs to durable appliances and vacation packages. Even this method has been limited, however, in that the expenses still are substantial and the response levels to such solicitations often are quite low.

To improve the efficiency and cost effectiveness of such marketing and communication techniques, companies in recent years have begun to screen or target their distribution of communications to reduce the number of communications sent and the corresponding cost, and to enhance the percentage which respond to such target-segmented marketing. Companies which have pre-existing databases of client information for their own clients, such as those mentioned above, are ideally suited for such targeted marketing. As an inherent part of their business, for example, these companies typically have client information for each of their clients. This client information typically includes not only such fundamental "client identification" information as client name and address, but often additional items such as client age, occupation, marital status, income, and the like. In many instances, the client information includes or is sufficient to derive certain information about needs and purchasing habits of the client. Even with such targeted distributions, however, response rates in many cases have remained relatively low.

An important drawback of such known approaches is the limited extent to which they personalize or individualize the communication. The communications usually are in the form of generic ads or solicitations which merely present the product or service identically in every communication to every client. A relative few of the communication or solicitation generating systems create communications which list the client identification information at the top of the communication, e.g., in a header. In the life insurance context, there have been systems which generate a letter or solicitation containing a selected set of insurance products. These systems have been limited mostly or entirely to term life insurance products. They merely list the product or products selected, and provide a brief non-individualized description or explanation of the product and perhaps sample prices or rates at various ages and amounts of coverage. The extent to which the communications take into account the particular circumstances and needs of the individual prospective client, or provide individualized explanations necessary to make an informed purchasing decision about the highlighted products, or enough interest to make further inquiries which may lead to a sale, has been extremely limited or nonexistent.

These systems also are limited in their ability to process large volumes of client communications quickly and efficiently. This is attributable in large part to their requirement for human involvement, the required level of interaction as a necessary part of their operation, the sophisticated nature of the financial products in many cases, and because of the relatively unsophisticated nature of the known systems. All of these methods and systems have been limited in that they require a substantial amount of human involvement. This necessitates substantial cost for wages, salaries, benefits, etc., and it can increase the likelihood of errors.

OBJECTS OF THE INVENTION

Accordingly, an object of the present invention is to provide a method and apparatus for preparing client communications, which method and apparatus are relatively cost effective compared to prior approaches.

Another object of the invention is to provide a method and apparatus for preparing client communications, which method and apparatus are capable of being highly automated.

Another object of the invention is to provide a method and apparatus for preparing client communications, which method and apparatus are capable of preparing large volumes of client communications relatively quickly, efficiently, and cost effectively.

Another object of the invention is to provide a method and apparatus for preparing client communications, wherein the method and apparatus produce communications which are more personalized and individualized to individual clients and/or prospective clients than in many prior approaches.

Additional objects and advantages of the invention will be set forth in the description which follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, a method and an apparatus are provided for automatically preparing client communications pertaining to one or more financial products for clients. The client communications preferably are adapted for combination with a host vehicle, such as a bank statement, utility bill and the like, so that the host vehicle and the client communication become a single document or document file.

The method and apparatus according to the invention provide a marked departure from known marketing and financial product communication systems, for example, in that they allow for the virtually complete automation of the tasks traditionally performed by people, agents, salesmen and the like, and at substantially greater effort and expense. Automatically, with little or no human intervention and with essentially no time delays, they can analyze and evaluate client information, incorporate additional information, determine and/or compare client needs with various available financial products to solve needs, select and/or recommend products most appropriate for the individual needs of each prospective client, and prepare personalized and individualized communications specifically tailored for each individual prospect to effectively communicate the information to the client or prospective client that he or she needs to make an informed buying decision, or to enable the client to seek more information which hopefully will lead to such a decision.

The method according to one aspect comprises providing a format for the communication wherein the communication format includes a variable portion, inputting into a computer-accessible storage medium variable information other than a client identification, and inputting into the storage medium decision information. The method also includes using the decision information to select a subset of the variable information, and generating the client communication according to the communication format. The generating step includes inserting the subset of variable information into a variable portion of the client communication corresponding to the variable portion of the client communication format.

In accordance with another aspect of the invention, a method is provided for automatically preparing a client communication or communications pertaining to a financial product for a client, wherein the method comprises using decision information to automatically select variable information, the variable information comprising other than a client identification, and automatically inserting the variable information into the client communication or communications. The variable information may comprise client information, financial product information, ancillary information, and/or text information. The method preferably includes a step of automatically combining the client communication for each of the clients with the host vehicle for the corresponding and respective one of the clients to create a combined communication for the corresponding and respective one of the clients, wherein each of the combined communications comprises a single document.

An apparatus according to the invention is provided for automatically preparing a client communication pertaining to a financial product for a client, wherein the client communication is for combined use with a corresponding host vehicle. The apparatus comprises means for inputting into a computer-accessible storage medium variable information comprising other than a client identification and decision information, processing means operatively coupled to the storage medium for using the decision information to automatically select a subset of the variable information for the client, and output preparing means in operative communication with the processing means for preparing the client communication and automatically inserting the subset of the variable information into the client communication. The inputting means may comprises a disk drive, a tape drive, an optical scanner, a bar code reader, a modem, and the like. The output preparing means may comprise a laser printer, a modem, another computer, and the like.

BRIEF DESCRIPTION OF THE DRAWINGS

The accompanying drawings, which are incorporated in and constitute a part of the specification, illustrate a presently preferred method and embodiment according to the invention. These drawings, together with the general description given above and the detailed description of the preferred method and embodiment given below, serve to explain the principles of the invention.

FIG. 14 is a flow chart diagram illustrating the organization and flow of the production and scheduling module of the preferred embodiment and method as depicted in FIG. 2;

DETAILED DESCRIPTION OF THE PREFERRED METHOD AND EMBODIMENT

Figure 1:
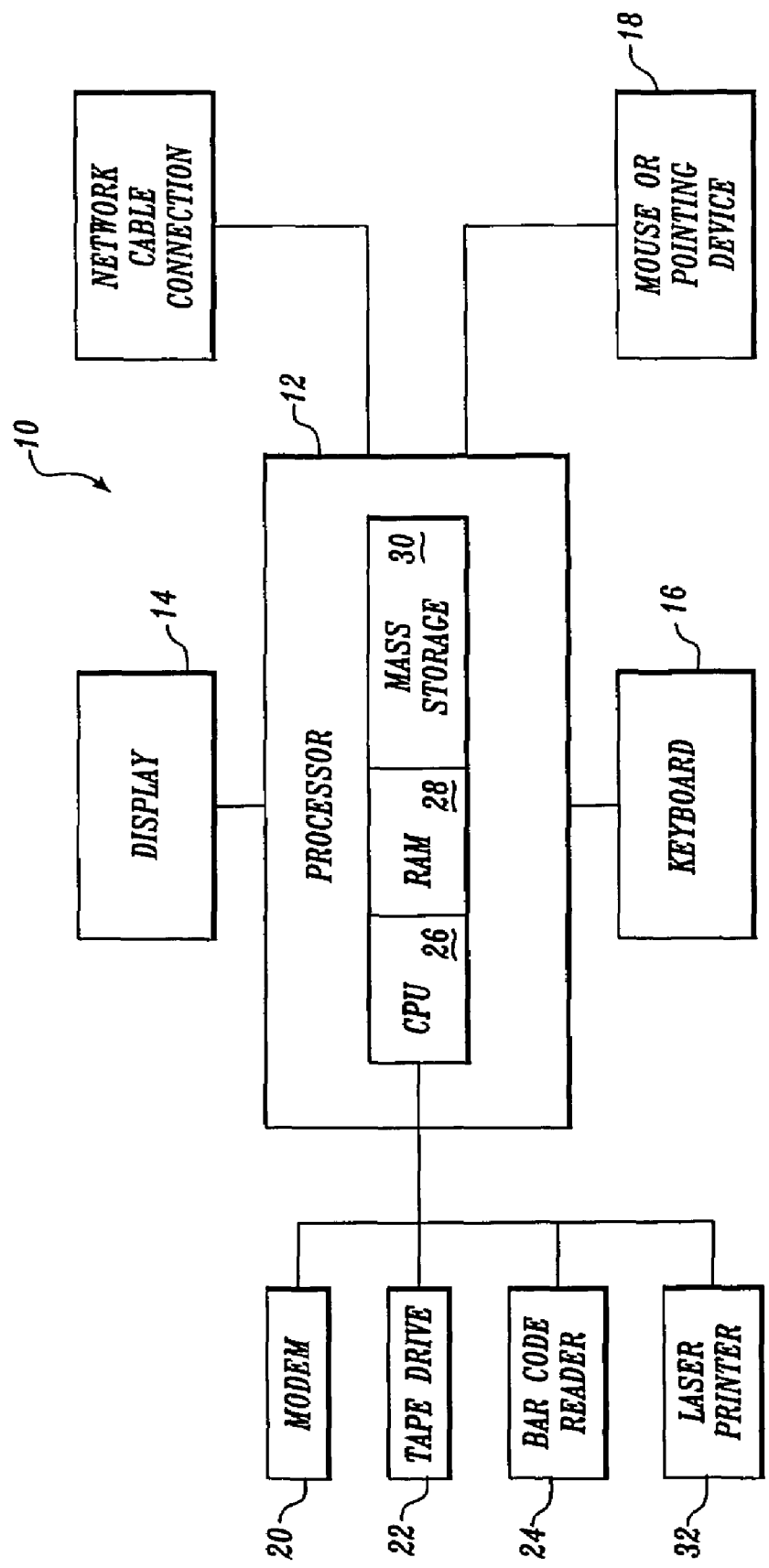
FIG. 1 is a hardware block diagram of the preferred embodiment of the invention.

Reference will now be made in detail to the presently preferred method and the preferred embodiment of the invention as illustrated in the accompanying drawings, in which like reference characters designate like or corresponding parts throughout the drawings. For simplicity and ease of illustration, the preferred apparatus and method according to the invention are described in conjunction with one another. This is not, however, to be construed as necessary or limiting.

In accordance with the invention, an apparatus and method are provided for automatically preparing client communications pertaining to one or more financial products, and/or financial services, and/or financial plans for clients. The apparatus and method may be used to automatically prepare a single client communication or, more preferably, to automatically prepare a plurality of client communications. The client communications preferably are for combined use with corresponding and respective host vehicles for the corresponding and respective clients, which combined communications may be and preferably are delivered to the clients.

"Client" as the term is used here should be interpreted broadly to include an actual client or customer of the user of the system and/or method according to the invention, or the party for whom the system and/or method is employed. The term "client" also includes a potential client or customer, or a similar party for whom a communication is prepared. A client is assumed for illustrative purposes here to be a party for whom a client record has been created in the client database as described more fully below.

"Client information" as used here means information which pertains to a particular client, or to a particular set or group of clients. Examples of client information would include a client name, address, telephone number, age, marital status, occupation, employer, financial income, etc. Client information also may include information pertaining to the family or other relations to the client, such as information on the spouse, children, parents, etc., or perhaps to a business associate, such as a business partner, fellow board member or officer, and the like. This category of information also may include psychographic and demographic data pertaining the client or clients.

"Client record" as used here means a compilation of information pertaining to a particular client. The client information typically would be collected into an automated or computerized database, which is referred to herein as a "client database." In this context, a client record would be a single record for a given client within the client database. The fields of each client database record would include the various items of client information, examples of which are provided above. The organization of this client information database and the records and fields within it typically would be in conformity with the data organization and structures of known relational databases.

A "client communication" as the term is used herein refers to a communication which is prepared for a given client and which provides information to the client about one or more selected financial products and/or financial services and/or related financial plans. A client communication, for example, might include a solicitation or similar marketing or advertising document in which the one or more financial products, services, etc. are presented to the client in an attempt to sell the product, service, etc. to the client, provide information on the products and services, provide a notice pertaining to such products or services, etc. A client communication may assume the physical form of a paper or papers which would be integrally attached to a host vehicle, a computerized document which is adapted to be incorporated with a computerized host vehicle, an electronic mail document, and the like.

Each client communication according to the invention includes at least one "variable." A "variable" as the term is used herein, which also is referred to as a "variable portion," refers to a portion of a client communication which may vary from client communication to client communication. The variable in a sense serves as a location marker in the client communication, at which location the system and method according to the invention insert or provide certain "variable information" selected by the system and method. The variable information, which may take a number of different forms, is selected using the decision information so that it is appropriate for, and to a certain extent individualized for, a particular client.

"Financial product" as the term is used herein is used in its broad sense to include any financially-related product, service or plan. The term would include, for example, insurance products and services, banking products and services, securities and investment products and services, and the like. Examples of insurance products would include individual life insurance of all types, tax deferred annuities of all types, health insurance of all types, disability insurances of all types, annuities or other timed payment vehicles, and the like. Examples of banking products would include savings-related products and services, demand deposit products and services, loan products and services, credit-related products, etc. Securities and investment products and services would include equity securities, debt securities, mutual funds, money markets, derivatives, etc. The term "plan" is used in its broad sense to include a plan which may incorporate one or more financial products and one or more financial services aimed at achieving a particular objective or set of objectives of the client. For convenience and ease of explanation, the term "financial products" as used hereinbelow may refer to financial products and/or financial services and/or financial plans, and combinations of these.

"Financial product information" as used herein refers to information which identifies, describes, explains or otherwise pertains to the financial product or products (including services and plans) which are to be the subject of some or all of the client communications, as explained more fully below.

"Host vehicle" as used here means a vehicle, such as an account statement, notice, letter, etc., other than a client communication, which is to be sent to a client. The term "vehicle" is used here in the sense of a medium for communication, examples of which would include a paper document, and electronic document, a machine-readable medium, and the like. Specific examples of host vehicles would include a bank account statement, credit card account statement, brokerage account statement, billing statement from a local utility, a notice or advisory bulletin, etc. In the context of the illustrative examples provided herein, typically there would be a host vehicle for each client, which host vehicle would provide the statement, notice, etc. The host vehicle typically would constitute the primary purpose for contacting or communicating with the client. The client communication preferably would be attached as an integral part of the host document.

"Host information" would include information which is included within or otherwise pertains to a host vehicle or a collection of host vehicles. Examples of host information would include such things as the type of checking account to which a statement pertains, the bank or other institution which holds the account or which issues a financial product reflected in the host vehicle (e.g., the product provider), the amount of utility services or products reflected in a particular bill, account information, a statement of account, etc.

A presently preferred embodiment of the apparatus according to the invention is illustrated in FIG. 1. This embodiment comprises a computer system using a networked client-server database system architecture with a number of computer nodes or computer workstations. A network server 10 is shown in FIG. 1. Computer workstation nodes would be very similarly configured. In addition to the server and workstation nodes, system nodes also may include output devices, such as laser printers (not shown). Each of the individual computer workstations or nodes within the system includes a processor 12, a display 14, a keyboard 16, a mouse, light pen, or similar pointing device 18, a modem 20, a tape drive 22, and a bar code reader 24. The processor of each computer node (server or workstation) includes a central processing unit (CPU) 26, random access memory (RAM) 28, and at least one mass storage device 30, such as a hard drive and/or a diskette drive. The design and configuration of CPU 26 is not limiting, and may include any of the CPU designs sold as standard components with high-end IBM-compatible personal computers or business machines. Such processors include Pentium™ processors from Intel Corp., Santa Clara, Calif., Power PC processors from IBM Corp., and their substantial equivalents, preferably with at least 32 megabytes of RAM and a hard drive with at least about 1 gigabyte of storage capacity. The capability and speed of CPU 26 will depend upon the specific application to which the apparatus is to be put, the volume of data to be handled, etc. In the preferred embodiment of FIG. 1, the CPU of the principal server comprises a 166 MHz Pentium-based processor with 32 megabytes of RAM and a 2 gigabyte hard drive. The CPUs of the network workstations comprise 166 MHz Pentium-based processors with at least about 32 MHz of RAM and at least about 500 megabytes of hard disk storage capacity.

Display 14 should be compatible with the processor, and preferably should have a resolution of at least about 800×600 pixels. Other than these requirements, many commercially-available Super VGA monitors would suffice.

Keyboard 16 is a standard IBM PC-compatible keyboard which is compatible with the processor. Keyboard 16 comprises a means for the system user to selectively input information, decisional information or criteria, module instructions, and the like into the system where manual input is called for.

The mouse, light pen, track ball or similar pointing device 18 is used to navigate the graphical user interface of the system, which is designed to increase the ease of use of the system, as will be described more fully below. It also comprises means for inputting information into the system, particularly where graphical interface environments are used in implementation. These devices may be obtained from commercially-available sources as off-the-shelf components.

Modem 20 is used for communicating with computer systems remotely from processor 12. The design of modem 20 also is not limiting, and its specific design will depend upon the design of processor 12, the design and configuration of the computer or computers to be communicated with, and similar generally known factors in a given application. In the preferred embodiment of FIG. 1, modem 20 comprises a 28.8 baud modem which is compatible with processor 12, such as the Model Sportster 28.8, commercially available from U.S. Robotics Inc.

Tape drive 22 is optional, but may be used for inputting bulk files and lists, as described in greater detail below. The specific design and configuration of tape drive 22 also will depend to a large extent on the design and configuration of other system components, and on the particulars of the application. In the preferred embodiment of FIG. 1, tape drive 22 comprises a high-capacity digital tape device which may be obtained as an off-the-shelf component from commercial suppliers.

Bar code readers may be used to speed manual input of data and also to record responses and other correspondence from prospective clients. They should be industry-standard readers capable of reading the major bar code formats, such as Code-39 bar codes, and inputting the scanned information to processor 12. An optical scanner (not shown) also may be provided as an optional input device.

The system includes a high-quality laser printer 32, such as any of the high-end commercially-available laser printers available for processors of the type employed in this system. Large-volume commercial laser printers also may be used for producing large quantities of client communications at rapid rates. The system also may include as an output a modem such as modem 20 or similar on-line or networked connection.

Figure 2:
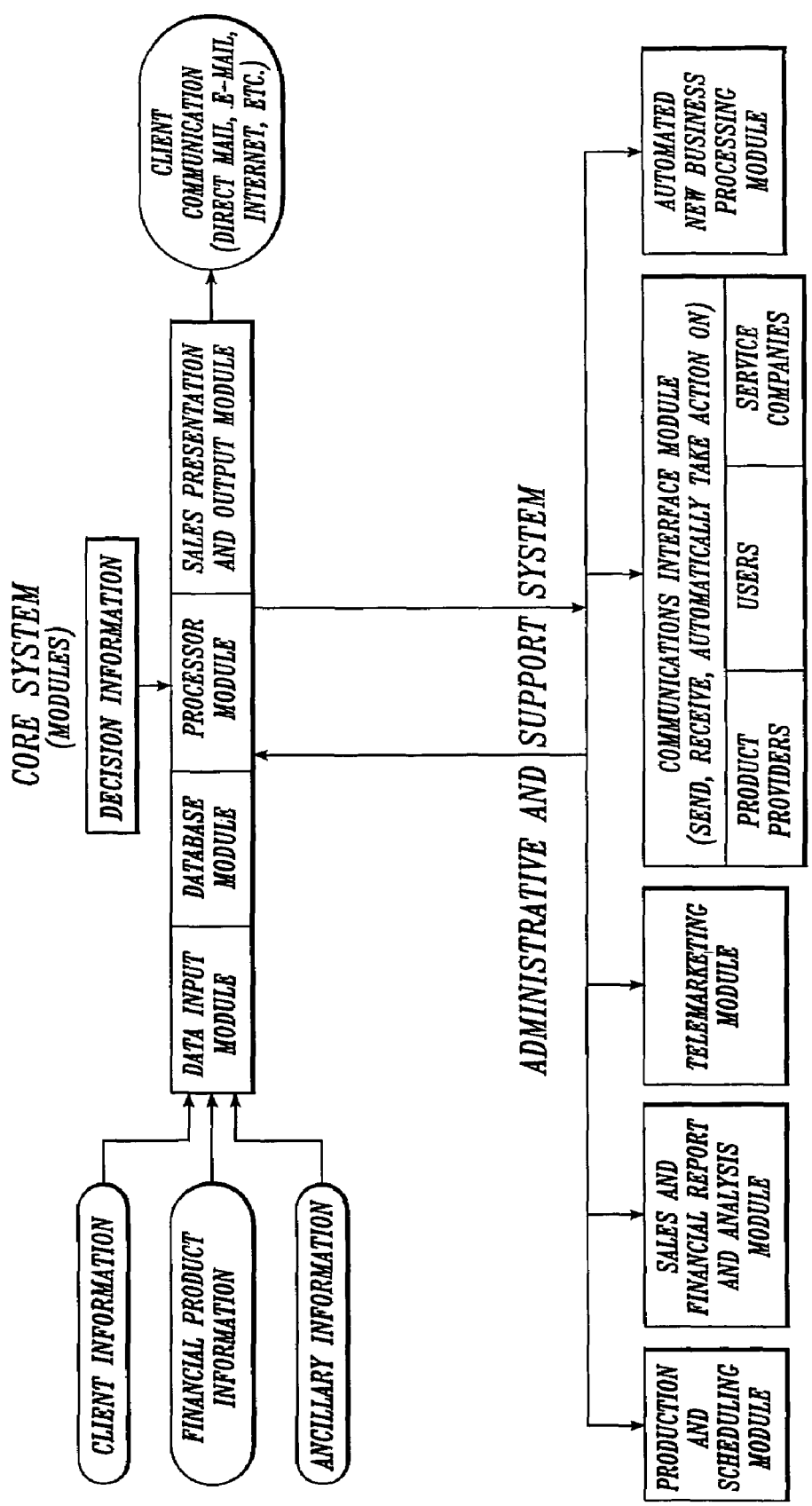
FIG. 2 is a flow chart diagram of system software used in the preferred embodiment of FIG. 1, and which illustrates the preferred embodiment and method of the invention.

Processor 12 has resident within its accessible memory system computer software or system software, a flow diagram of which is shown in FIG. 2. The software has a "core" system for processing tasks such as selecting variable information and preparing client communications. The system software also includes an "administrative and support" system for supporting the core system, facilitating the communication or marketing program, providing administrative and management reports and functions, and other tasks. The core system includes a plurality of modules, including a data input module, a database module, a processor module, and a sales presentation and output module. The administrative and support system includes a production and scheduling module, a sales and financial report and analysis module, a telemarketing module, a communications interface module, and an automated new business processing module. Each of these systems and modules will be described in greater detail below.

Figure 3:
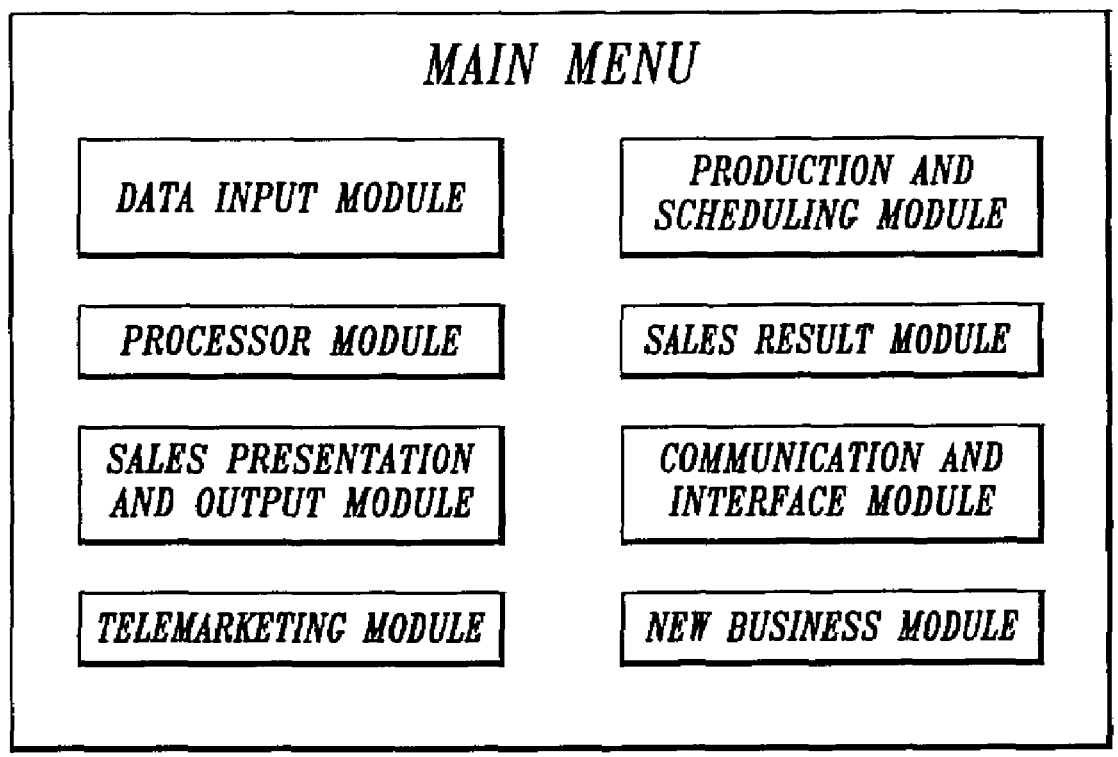
FIG. 3 provides an illustrative main menu for the system software generally depicted in FIG. 2.

In accordance with the preferred embodiment and method, an example of a main menu for the system software is shown in FIG. 3. This menu includes a plurality of buttons corresponding to the modules of the system as depicted in FIG. 2.

Figure 4:
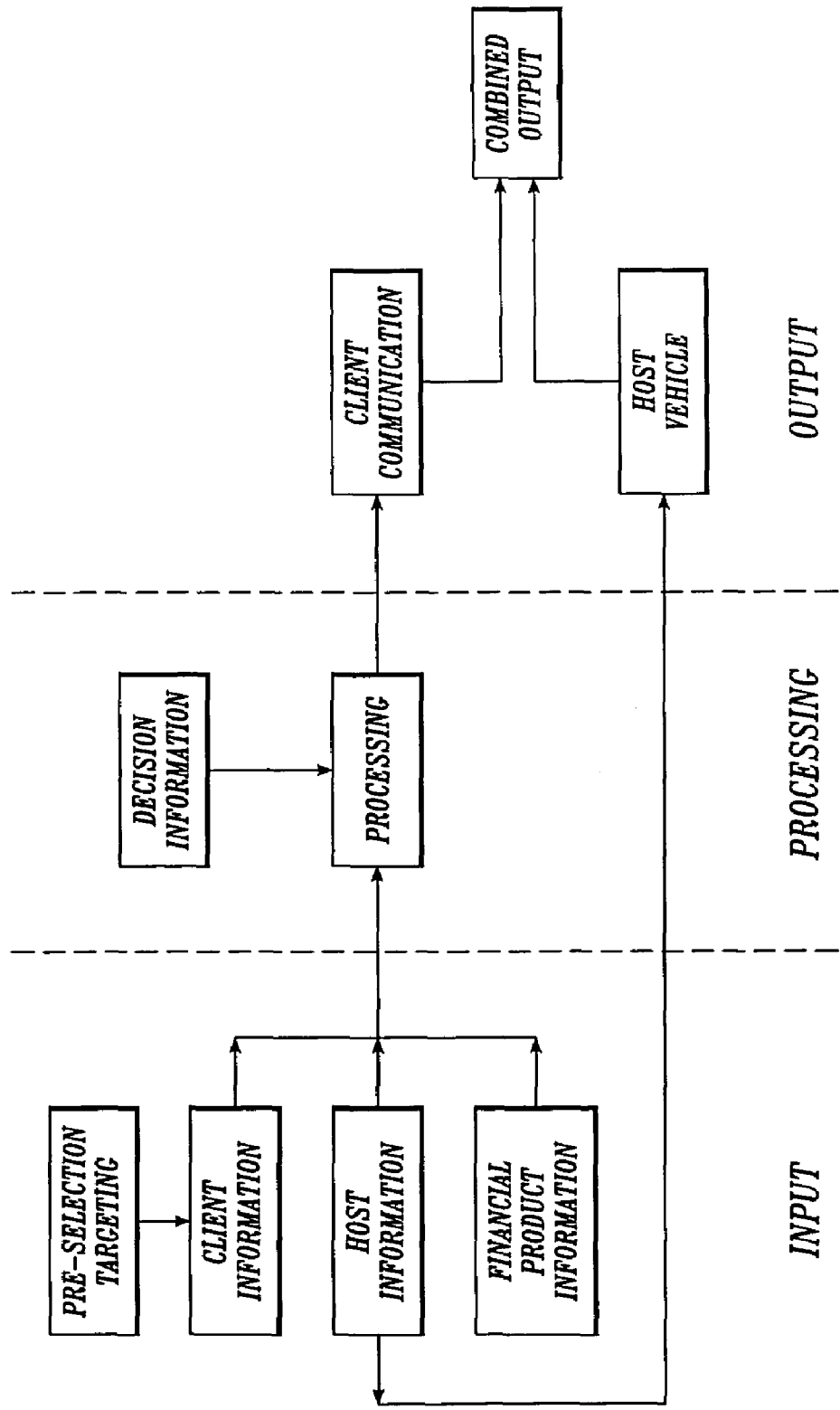
FIG. 4 is a flow diagram which illustrates a preferred method according to the invention.

A flow diagram which outlines steps of the preferred method is shown in FIG. 4. Referring to the left portion of the diagram, the method includes a step of inputting information of various types into the system. Although the specific forms of information to be inputted will vary from application to application, they generally will include client information. This client information may be pre-selected or pre-sorted, for example, using known market segmentation or targeting techniques, or what has been referred to recently as "database mining." Financial product information, and in some cases host information, also may serve as inputs.

The preferred method also includes a processing step (center of FIG. 4) in which decision information is used to automatically select variable information for inclusion or provision in the client communication or communications. The output of the processing step (right portion of FIG. 4) is one or more client communications which include the variable information. The variable information is used to make the client communications highly individualized or personalized. The client communications are adapted to be combined with corresponding host vehicles for the respective clients to create a corresponding plurality of combined outputs. This combination can be very advantageous over prior known methods, e.g., based upon the ability to make the client communications highly personalized and at the same time delivering the client communication together with the host vehicle to achieve the corresponding cost savings.

As an initial step in the preferred method, one generally would determine the financial product or products which are to be presented in the client communications. This selection may be made, for example, based upon the nature of the client population itself, the desired financial product or products to be offered, etc. It should be appreciated that this step need not necessary occur first. The selection of financial products, for example, may be one of the functions which the system performs, e.g., during its processing step as described more fully below.

The preferred method includes a step of providing a format for the client communication wherein the client communication format includes a variable portion. Each of the client communications includes at least one variable or variable portion in which variable information is inserted or otherwise provided. The variable information is selected based upon the decision information. These aspects and features of the invention will be described more fully below.

The term "format" is used according to its common meaning and refers to the general layout and appearance of the communication. The format may assume any one of a wide variety of forms, depending upon the financial product or products involved, the intended client base, the communication medium, the desired or available space, the tastes and specific needs of the communication designer, etc. Formatting inputs would include such things as typographical formatting information (e.g., top, bottom and side margins), fonts, graphics, displays and display locations, etc. The format also may include content designations. In more advanced applications, a plurality of formats may be selected, and the system and method may be adapted to select from among the formats for a given client and client communication. For illustrative purposes herein we will use single-format examples, rather than a set of communication formats from which the system and method would select on a client-by-client basis. Sample client communication formats are attached hereto as Appendix 1 and Appendix 2. These samples, which are merely illustrative and not limiting, might be attached to a bank statement (a sample host vehicle), and would be used for marketing individual life insurance. Note that each begins as page 3 of 4 pages. Pages 1 and 2 in this illustrative example would be the host vehicle.

The communication format includes at least one variable or variable portion, as noted above. Preferably, the format of each communication will include a plurality of variables or variable portions. Each of these variables constitutes a portion or segment of the client communication which, in the actual communications, will vary from client to client, and from client communication to client communication. The variable may assume any one or combination of a wide variety of informational types and content components. Examples would include client information (generally other than a client identification), financial product information, ancillary data, variable text, etc. A given communication format may include a plurality of variables of a given type, e.g., all client information, or it may comprise different types of variables, e.g., client information, financial product information, etc.

The preferred method includes steps of inputting into a computer-accessible storage medium variable information other than a client identification, and inputting into the storage medium decision information. The preferred apparatus similarly is provided with appropriate input means for inputting these and other various categories of information into a computer-accessible storage medium. The method and apparatus of the invention are adapted to process various types of information in generating and outputting the client communications. The flexibility and variability of the specific types of information which may be used, and the specific manner in which the information may be used, comprise significant advantages of the invention over prior known systems and methods.

Initial system inputs typically and preferably would include client information, financial product information, decision information, text information, and in some applications ancillary information. Any one of these classes of information could comprise variable information, although decision information often is used primarily for internal systems purposes.

The types and amounts of client information provided to the system and used in the method will depend upon the types and amounts available, the desired client communication format, the decisional information or logic to be used, etc. Client information may comprise a variety of types of information pertaining to a particular client, or to a particular class of clients. In most instances, this client information will include a client identification. "Client identification" as used herein includes the information about the client which uniquely identifies a given client and permits correspondence or communications to be forwarded to the client. In most instances this client identification constitutes the client's name, or the client's name and post office address. A client account number also may be included. This term is intended to be construed narrowly, for example, to include only the minimum information, usually name and postal address, necessary to uniquely identify the client and forward the communication to the client. It would not include, for example, infatuation which may happen to be unique to the client and may uniquely identify the client under analysis, but which information is not typically used to identify the client. Individual components of client identification other than client name also typically would not be included within the scope of the term client identification as used herein. A client's postal zip code used separately from the postal address, for example, would not qualify as the client identification.

A wide variety of types of client information other than the client identification may and often is available. Typical examples might include the client's age, occupation, employer, annual income, marital status, whether he or she smokes, family information, geographic information other than client address information (e.g., zip code, city, county, state, etc.), purchasing information such as purchasing practices and proclivities, client asset information, liability information such as mortgage or loan information, client activity information (e.g., hobbies, sporting activities, etc.), and other psychographic, demographic and general client data or information. A commercial bank or savings and loan which loans on home mortgages, for example, typically would have client information in the form of the address of the mortgaged property, the mortgage loan amount, and the loan origination date. This information would be useful for an individual mortgage life insurance program in which insurance solicitation communications are sent to mortgagee clients.

"Financial product information" as used herein refers to information which identifies, describes, explains or otherwise pertains to the financial product or products (including financial services and financial plans) which are to be the subject of some or all of the client communications. Financial product information includes product pricing information and product non-pricing information. Pricing information includes the pricing for the relevant products, and perhaps other information relevant to pricing, for example, such as the time period during which particular prices will be available, payment terms, available financing terms, etc. Product non-pricing information includes any financial product information other than product pricing information. Examples of product non-pricing information would include product-related descriptions, conditions of offer, classes of clients for whom the product is available (e.g., "issue constraints" as used in the insurance industry), annuity tables, actuarial tables, etc.

The financial product information may pertain to a single product, or to a plurality of different financial products. In the field of insurance, for example, the financial product information may pertain to a non-property and non-casualty insurance product, an individual life insurance product such as term, whole life, universal life and the like, a health insurance product, a disability insurance product, an annuity, and the like, and combinations of these. In the banking area, the financial product information may pertain to a savings product, a checking or demand account product, a loan product, a credit-related product, a retirement product, etc., and combinations of these. In the banking and brokerage firm areas, the financial product information may pertain to such products as an investment product and/or financial security (e.g., stocks and other equities, bonds and other debt instruments, money markets, mutual funds, etc.), derivatives, etc., and combinations. Combinations of financial products across fields, such as banking and insurance, also are possible.

"Ancillary information" as used herein refers to virtually any type of data or information useful for the system (hardware and software of FIGS. 1 and 2) and/or method in performing the intended functions, but excludes client information, financial product information and decision information. Examples of such ancillary data or information would include statistical information, geo-code data, and the like. Non-client specific information also may be included in this category, such as demographic, psychographic or buying habit data. Incidentally, the term "information" is used broadly herein to include quantitative data as well as other forms of information.

Text information comprises text, e.g., in the form of an alphanumeric character or character string, a word, a phrase, a sentence, a paragraph, or even a graphical symbol. The preferred form of text information in many applications involving the marketing of financial products would comprise a phrase, i.e., a collection of words, which would be part of a sentence or paragraph of fixed text within the client communication. For example, if the client communication presents a financial product such as a security, the description of the product may assume one form for clients under a predetermined age, such as 40 years old, and the description of the same product may assume another, perhaps more conservative or risk-adverse form for clients over the predetermined age.

Text information as used herein can and often will overlap with the other categories of information as defined herein. Text information may, for example, comprise or pertain to client information. In the example provided immediately above, the text information pertains to financial product information. Text information also may comprise or pertain to ancillary information, decision information, etc.

The decision information to be provided to the system may and usually will vary from application to application. This decision information typically would be inputted as part of the system initialization for a given run. The decision information generally will comprise criteria or conditions used for the selection of variable information. The decision criteria preferably comprise programmed database queries which are used in conjunction with the client database, and perhaps a financial product database and/or an ancillary information database to select records, to select fields within records, and the like. The decision information also may comprise conditions and instructions for selection of information from lookup tables and similar data structures.

According to the method of the invention, decision information is used to automatically select variable information for insertion or inclusion in the variable or variable portions of the client communication or communications. This variable information preferably includes information other than, or in addition to, a client identification as that term has been defined herein. The variable information may be selected for insertion into the variables or variable portions of the client communication for one or more of the clients.

The variable information may comprise part or all of the information provided to the system as the client information, the financial product information, the ancillary information, text information, and even the decision information. This variable information may comprise virtually any form of client information, but preferably, as noted, it would be other than, e.g., in addition to, a client identification, most notably the client's name, address, account number, etc. The variable client information may, for example, comprise information pertaining to the client such as client age information, health information, client family information, client geographic information other than client address information, client purchasing information, client asset information, client liability information such is information about a mortgage, client financial income information, client occupation information, client activity information (e.g., sports activities, recreational activities, etc.), and the like. The variable client information may comprise psychographic client data and/or demographic client data. In the term life insurance context specifically, this variable client information preferably would be other than a client name, address, age, marital status, tobacco habits, and other than the type and amount of life insurance coverage, which comprise related product information.

Where the variable information comprises financial product information, this variable financial product information also may assume a wide variety of forms. As noted, the variable financial product information may pertain to a single financial product or to a plurality of different financial products. The variable financial product information may comprise or pertain to, for example, one or more insurance-related products. Examples would include property and casualty insurance products, as well as non-property and non-casualty insurance products. The latter grouping would include individual life insurance products such as individual term life insurance products and individual life insurance products other than term, such as permanent life insurance products. Permanent life insurance products would include such things a whole life, universal life, and the like. Where combinations of insurance products are included, they may include, for example, a combination of an individual term life insurance product and an individual permanent life insurance product. Other types of insurance products to which the variable information may pertain include health insurance products, disability insurance products, annuities, etc.

The variable financial product information also may comprise or pertain to bank-related products such as information on various types of demand deposit accounts, savings accounts and product, loan products, credit products, etc. Where the variable financial product information pertains to financial investments or brokerage-type products, the information may comprise or pertain to various investment products, financial securities, equity instruments such as common and/or preferred stocks, stock options, warrants and the like, debt instruments, money market funds, mutual funds, derivatives, etc. The variable financial information may comprise or pertain to financial product pricing information or financial product non-pricing information, or both.

The variable information also may comprise or pertain to ancillary information, such as statistical demographic information, geo-code data, psychographic data, economic data pertaining to more than one person, e.g., pertaining to persons other than merely to a single client, and combinations of these.

The variable information also may comprise text or text information. Where it would be desirable to present differing text in the respective communications, for example, depending upon the age, marital status, etc., of the respective clients, several different versions of text may be used as variable information. Any given one of the text inputs would be used for a particular client only if that text were appropriate for that client. As noted, information other than a client identification, i.e., information in addition to the client identification information if client identification is present, may constitute the variable information.

The apparatus according to the invention comprises means for inputting into a computer-accessible storage medium variable information comprising other than (in addition to) a client identification and decision information. The input means used for a particular application will vary depending upon the format in which the information is available. Examples would include a keyboard, a disk drive, a tape drive, a hard drive, a modem, an optical scanner, a bar code reader, a pointing device such as a mouse or track ball, a network link, etc. Client information, financial product information, decision information, ancillary information, etc. may be provided on a data tape, compact disk, diskette, or similar storage medium, in which case the input means correspondingly would comprise a tape drive, a compact disk reader, a disk drive, and so on. Some records may be available on non-resident databases, as noted. This is increasingly the case as online networks such as the Internet gain widespread use and acceptance. In such instances, the information may be received via modem 20.

The input means of the preferred embodiment may include any one or any combination of keyboard 16, pointing device 18, modem 20, tape drive 22, bar code reader 24, an optical scanner, mass storage device 30 (e.g., hard drive or diskette drive), and equivalent input devices. With reference to FIG. 1, for example, information may be directly entered using keyboard 16. In some instances, bulk information may be available, for example, comprising lists of client records, in which case the input devices more suitable for transfer of bulk files would be used. Diskette drive 30, for example, as would come as standard equipment with the types of processors noted above, may be used.

The input means preferably is adapted for inputting such data and information both individually and automatically in bulk. Automatic or bulk input would be done essentially or entirely without human intervention. This is particularly desirable when inputting client information, which ideally would be capable of being inputted as client records without human intervention between input of the respective client records.

The decision information may take a number of forms, as noted above. The means for inputting the decision information therefore may assume different forms, such as those identified above and their equivalents. Preferably, the decision information will comprise one or more computer programs which include database query commands to query or filter the client information, financial product information, etc. according to desired conditions or criteria. The preferred input means for this task accordingly would comprise keyboard 16 and/or tracking and pointing device 18, operated in conjunction with the associated device-related software and software drivers.

The input means is operatively coupled to a computer-accessible storage medium so that the storage medium receives and stores the information as it is inputted. The storage medium according to the preferred embodiment may comprise RAM 28, mass storage device 30, other memory within CPU 26, tape drive 22, and any combination of these. The storage medium according to this aspect of the invention may comprise any storage device or medium capable of storing the inputted information and storing it for subsequent retrieval and transmission ultimately to CPU 26. The storage medium need not be directly connected to or directly in communication with CPU 26, provided it is capable of transferring the information to CPU 26 upon the appropriate command.

The inputting of data and information in the preferred embodiment is carried out as part of the data input module as depicted in FIG. 2. This module forms part of and interacts with the inputting means to receive the inputted client information, financial product information, and possibly ancillary information and text, and to store the information in an appropriate storage medium, such as mass storage device 30 or RAM 28.

Figure 5:
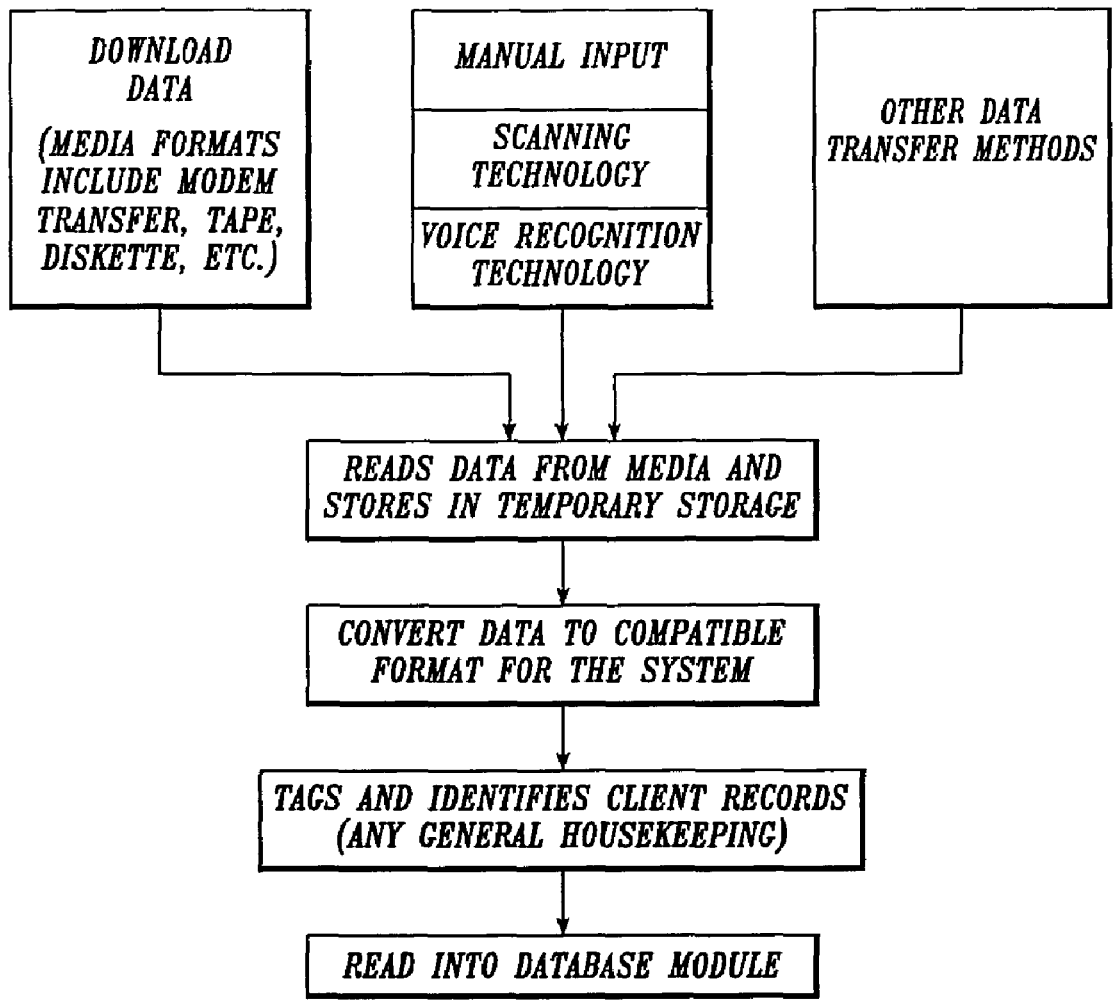
FIG. 5 is a flow chart diagram illustrating the data input module of the preferred embodiment and method of the invention.

The data input module performs tasks related to inputting information into the system. An example of the organization and task flow of the data input module is shown in FIG. 5. As noted above, data may be entered manually or automatically. For example, information may be entered using scanning technologies. Bar codes may be used on advertisements, information cards and other documentation. Scanners such as those commercially available for use with processor 12 may be used to read the bar coded information. Similarly, an optical scanner may be used to scan an entire page or document, and standard image processing software may be used to read information from the scanned client information from the scanned input. The invention is not, however, limited to these input modes, and others may be used. For example, as voice recognition technology develops, there very well may be the ability to input client information merely by voicing that information into a voice recognition device, which would translate the voice information into digital client data.

The task of automatically or semi-automatically sending large numbers of communications efficiently and cost effectively generally will require that the system receive or gather on its own large volumes of client information. For a given client, the system is adapted to retrieve client information and, depending upon the circumstances, other information as well. Inherent advantages of using an automated environment to undertake these tasks is the tremendous speed with which computers can retrieve, process and store large volumes of information.

The data input module of this embodiment and method inputs data into the system from one or more of the input devices for the system, such as modem 20, tape drive 22, or bar code reader 24. The details of the data input module will depend to a certain extent upon the type of data to be input.

With further reference to FIG. 5, as data is inputted, the data input module stores it in a temporary storage area within processor 12. If necessary or appropriate, the data is converted to a format compatible with the system. For example, as is known in the database arts, it is sometimes necessary to import or export files to convert one database format to pre-defined database structure. In this embodiment, the data input module also may tag and identify client records as they are inputted, and perform general and routine "house keeping" tasks on the data.

Once these tasks have been performed by the data input module, the properly-formatted client information is transferred to the database module. In the preferred embodiment, the database module comprises a relational database essentially equivalent to commercially-available database packages. The database module of the preferred embodiment stores client information for general use by the system, as explained more fully below. The database stores client information so that each client is represented by a record in the database, and the various items of information to a given client are contained within fields under the record for that client. Examples of the structure and contents of a client database for life insurance, for example, may include the following fields:

Name
Address (including zip code)
Age
Tobacco user v. non-tobacco user
Marital Status
General Health The contents of a representative client database record for marketing of individual mortgage life insurance may include the following:

| Borrower | Co-Borrower |
| --- | --- |
| Name | Name |
| Address | Address |
| (including zip code) | (including zip code) |
| Age | Age |
| Tobacco user v. non-tobacco user | Tobacco user v. non-tobacco user |
| Marital Status | Marital Status |
| General Health | General Health |

The contents of a representative client database record for a commercial bank may include the following:

Name
Address (including zip code)
Account Type
Account Number
Account Balance
Spouse
Occupation
Employer
Income The database module also may include information other than client information. For example, this module typically may include a listing or database of financial products and/or financial product information. The financial product information typically would include not only the identification of the products, but information about pricing, conditions on availability (e.g., "issue constraints"), etc. Product availability conditions or constraints as used here refers generally to limitations on the availability of the product, e.g., geographic availability constraints, age range constraints, face value or amount constraints, and so forth. The product-related database also may include descriptions and explanations of the products, e.g., in the form of text information. This will be explained in greater detail in connection with the sales presentation and output module.

Figure 6A:
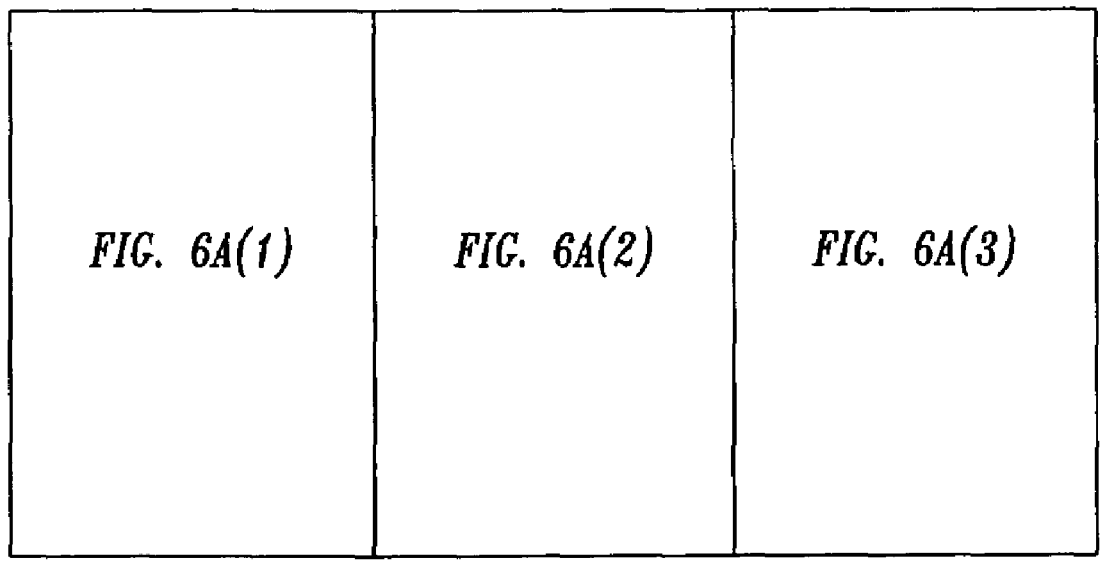
FIG. 6 (including 6A and 6B) shows the organizational structure of various illustrative database tables managed by the database module according to the preferred embodiment and as used in connection with the preferred method of the invention.
Figure 6B:
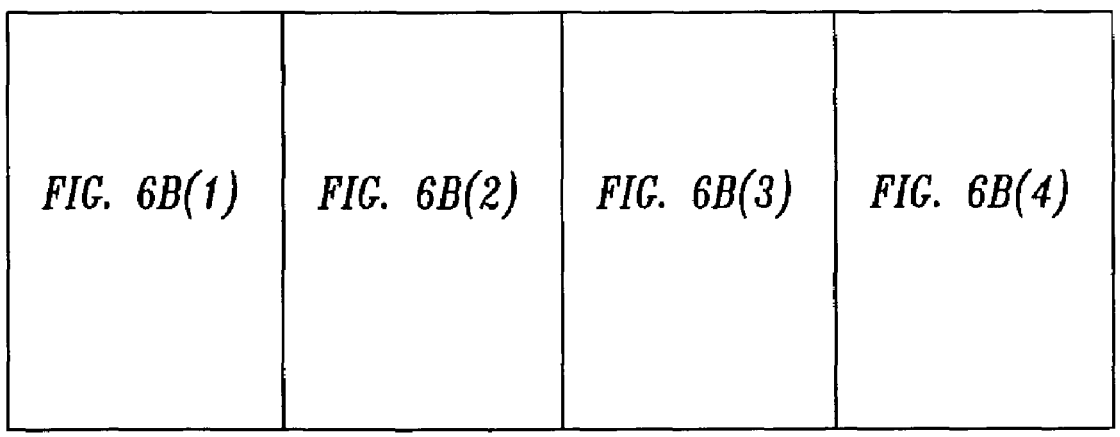

A sample set of tables for use in preparing and delivering client communications pertaining to life insurance products is presented in FIG. 6 (including Fig. parts 6A and 6B). These tables may be inter-related depending upon the specific design of the database or databases for a given application.

According to the method, the decision information is used or processed to automatically select variable information. In the preferred method, the decision information is used to select a subset of the variable information for inclusion in the variable portion or portions of the client communication corresponding to the variable portion or portions of the client communication format. The apparatus according to the invention similarly includes processing means operatively coupled to the storage medium for using the decision information to automatically select a subset of the variable information for the client, or for each client where processing involves a plurality of client records. The subset of variable information for a given client then may be used in the subsequently-prepared communication for that client to individualize or personalize the communication. As implemented in the preferred embodiment, the processing means comprises processor 12, including CPU 26 and related components, operating under the control of processor module computer software, as shown generally in FIG. 2.

The specific identity and nature of the variable information selected by the processing module may be varied from application to application depending upon a number of factors, the most important of which is the decision information as selected by the system user. The processor module provides tremendous flexibility. It may be adapted, for example, to handle a wide variety of classes of financial products, such as term life insurance, permanent life insurance, combinations of term and permanent life insurance, health insurances, disability insurances, long term care insurances, and the like. The processor module can accommodate any type of client information that can be incorporated into the client database. In addition, the processor module has great flexibility in the specific analytical and decision making methods and procedures used. Specific yet merely illustrative examples are provided below.

Figure 7:
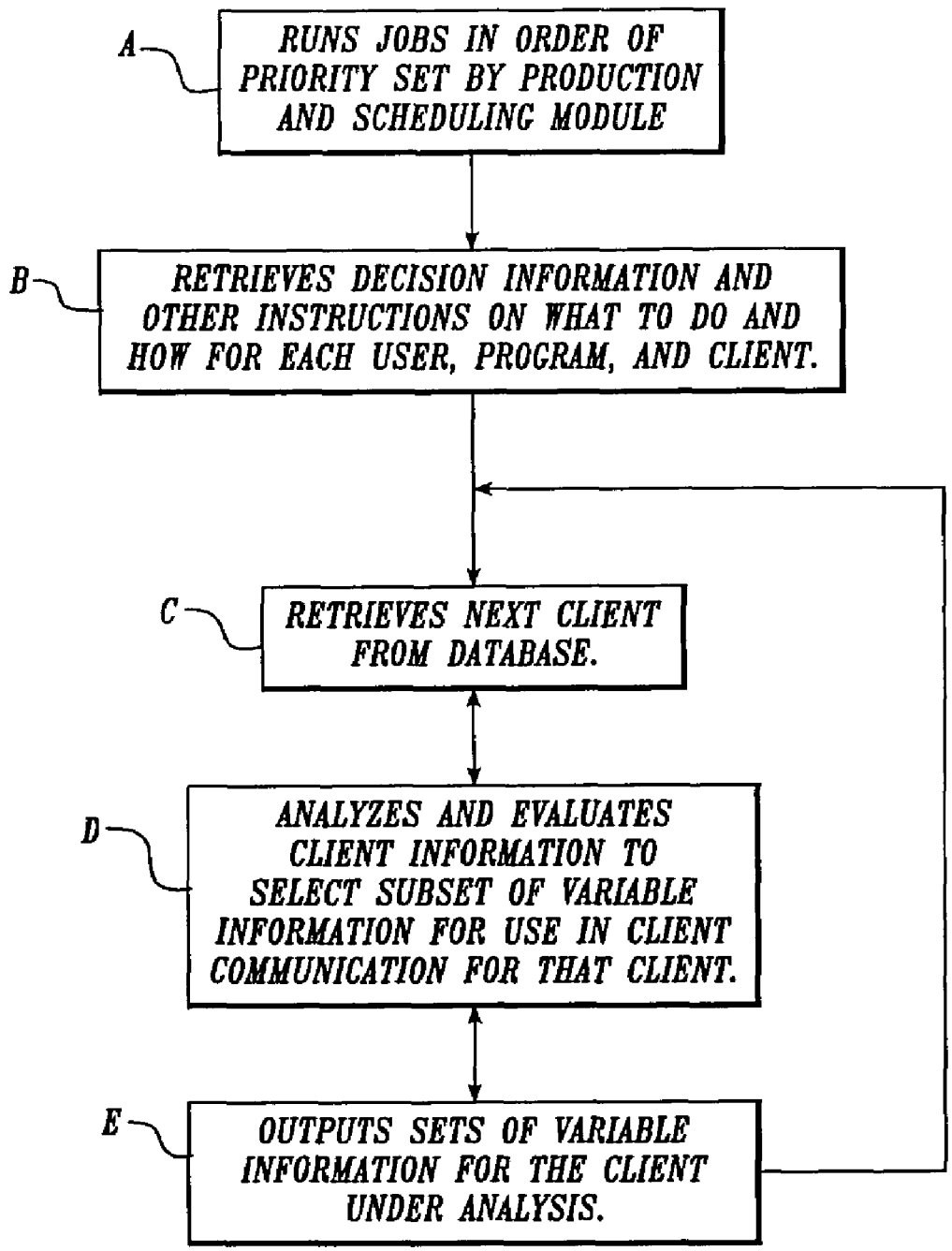
FIG. 7 is a flow chart diagram illustrating the processor module of the preferred embodiment and method of the invention.

A flow chart depicting the general organization and logic flow of the processor module for the preferred embodiment and method is presented in FIG. 7. As indicated at block A, the processor module is scheduled by and operates under the general instruction of the production and scheduling module (described more fully below). The production and scheduling module would determine, for example, which of several competing jobs or client databases would be processed and in which order. The processor module flow then moves to step B, in which it retrieves decision information and other instructions delineating the tasks the system is to perform and upon which information.

The processor module flow at block C retrieves the information, in this case a client record (client information), which is to be used with the decision information in selecting the variable information. By operating upon the decision information, such as database query commands based upon the client database fields, the system processes the client information and uses it to select the variable information. The type of information retrieved by the processor module will depend upon the type of analysis under consideration, and for which the system has been adapted. Illustrative examples of such input data are described above with reference to the data input module and the database module. The processor module is described herein as processing data files sequentially, one record at a time. This is not necessarily limiting. For example, the processor module may be configured so that it processes more than one record at a time through such generally known approaches as multi-tasking or parallel processing, and/or by means of networked machines operating in parallel or otherwise concurrently.

In step C, depending on the particular application, the processor module may undertake some pre-sorting or other manipulation of the client information prior to the principal analysis of it. For example, there may be categories or items of information within a given a client record that are not utilized in the analysis and decision making procedures to be undertaken by the processor module in that application. Therefore, it may be appropriate to modify the retrieved client records to eliminate such categories or items before further processing in undertaken in the processor module.

In step D of the processor module, the processor module uses the decision information to analyze and evaluate the client information for that record to select the subset of variable information for that client. The selected variable information is outputted as step E. This may occur as each client record is processed or, preferably, for a plurality of records. The process returns to block C to retrieve the next client record, and processing is repeated at block D. This looping process is continued until all client records to be processed in fact have been processed in this manner.

Figure 8:
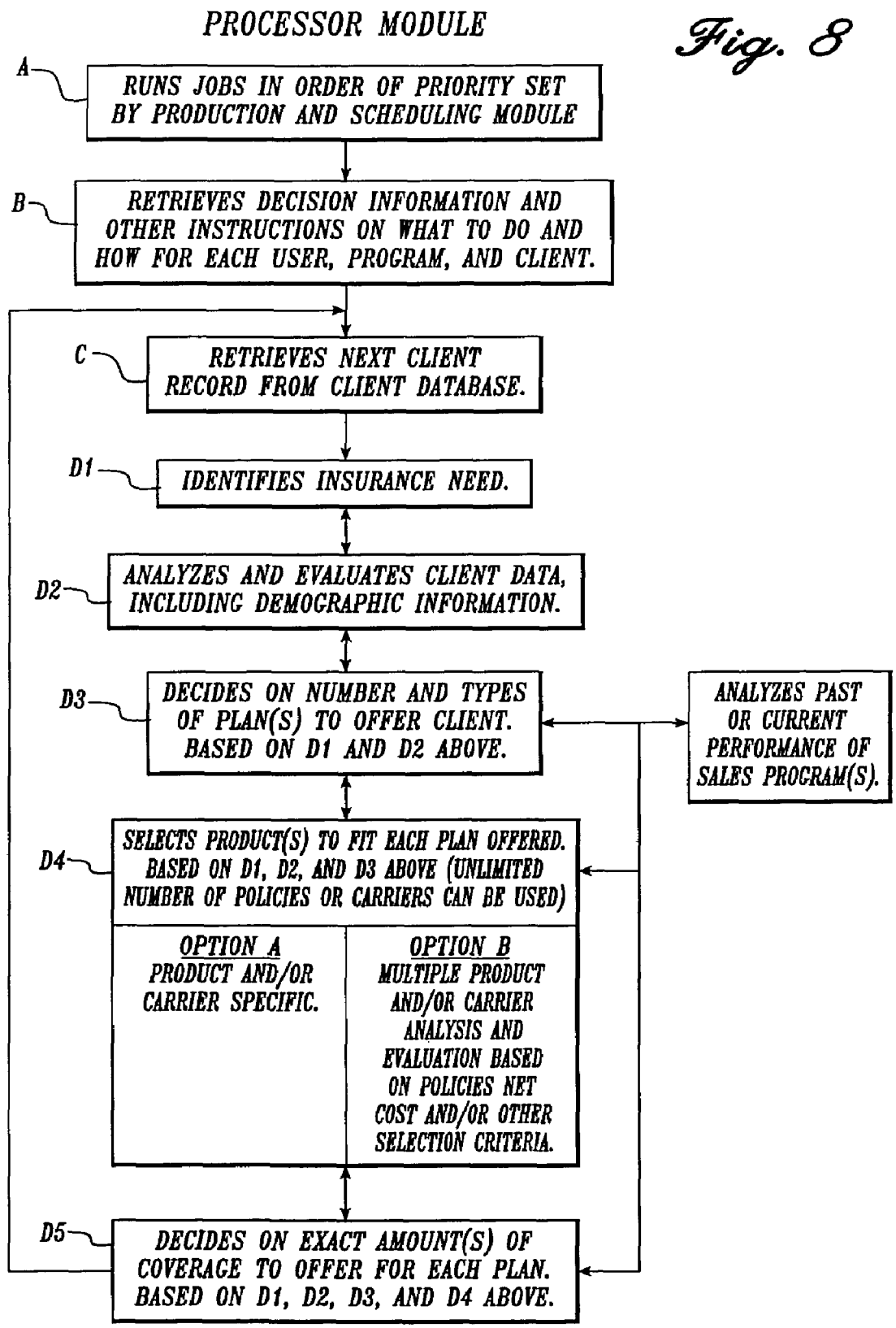
FIG. 8 is a flow chart diagram illustrating the processor module of the preferred embodiment and method of the invention similar to that of FIG. 7, but which is specifically adapted for processing of insurance products.

A slightly more complicated application or process flow for the processor module of the preferred embodiment and method is illustrated in FIG. 5. FIG. 8 is similar to FIG. 7, but is specifically adapted for preparing client communications in connection with the marketing of life insurance. Blocks A through C of FIG. 8 are essentially identical to those of FIG. 7. Bock D of FIG. 8 shows considerably more detail as to the process which occurs in this example. In substep D1, the insurance need of the client is identified. This may be done, for example, based upon information in the client record such as age, marital status, financial information pertaining to the client, etc. Substep D2 involves analyzing and evaluating the client information, such as demographic data, to make the selections described in the subsequent steps. In substep D3, the processing flow decides on the number and types of insurance plans to offer to this particular client. In substep D4, the processing flow selects the financial product or products to fit into each plan offered. This would be accomplished as part of the decision information and its programming. Two sample options are illustrated in the drawing figure. Option A involves presenting only certain products and/or the products of certain product carriers. Option B provides greater leeway in selecting products and plans. In substep D5, the processing flow uses client information, such as for example the client's age, financial income, and the client's zip code, to determine an amount of coverage to be offered in each plan presented to that client. The process returns to block C to retrieve the next client record, and processing is repeated at block D. This looping process is continued until all client records to be processed have been processed in this manner.

Variable information may be selected using client information, i.e., the decision information may include using client information to select the variable information for inclusion in the client communication. This is generally true regardless of the nature or content of the information actually selected as the variable information.

In step D3 of the processor module flow depicted in FIG. 8, the module decides on the number and types of plans to be proposed to the client, which represents financial product variable information. This decision is based upon the insurance needs of the clients as identified in the decision information, on the client information in the client record, and possibly on other information such as demographic information, geo-coding information, etc. This step involves making an informed intelligent decision regarding the possible solution or solutions to the product or protection needs of the customer. Factors which may be considered by the module in this selection process may include the client demographic information (e.g. age, gender, tobacco usage, and occupation) mortgage information, financial information such as income, marital information, existing policy information, family-related information, and other factors selected by the system user and incorporated into the processor module decision making criteria.

The processor module in conjunction with the decision information selects the variable information, in this example the financial products, which satisfy the decision making criteria being employed in the module. Under this substep, the processor module draws from the available product pool the most appropriate product to fit each plan selected as a candidate in this substep. Preferably the processor module has the ability to select from a large number of products and product providers. In performing this step D3, the processor module may take into consideration factors such as: the premium for the product, the compensation paid to the system user or other provider including primary and secondary compensation, legal issues, underwriting requirements, demographic information pertaining to the client, and the net cost of premiums over a specified period of time. As to legal issues, all local, state, and federal laws regarding insurance sales, for example, and additional constraints imposed by product providers may be considered.

There are numerous examples in which client information may be used to select client information. To illustrate this approach, the decision information may include the criteria of selecting a first text string describing a financial product ("text string A") if the client has an annual financial income of greater than a certain amount, e.g., $50,000, and selecting a second text string ("text string B"), if the client's income is less than $50,000. This example uses client information (annual income) to select variable information (alternative financial product descriptions) based upon decision information (income greater than or less than $50,000). The client's age easily could be used instead of annual income, as could virtually any other item of client information.

To further illustrate the types of decision making procedures and criteria which may be embodied in the processor module, we will use the example of individual mortgage life insurance. Pursuant to the example, assume that each client record includes the address of the property subject to the mortgage, the amount of the mortgage, the monthly mortgage payments and the following information for each borrower and co-borrower: Name, age, and gender. As part of the analytical and decision making criteria information retrieved by the processor module, a set of scenarios are provided for characterizing the client and the surrounding circumstances. Illustrative examples of the scenarios would include the following:

| | |
|---|---|
| Scenario 1: | Single individual borrower. |
| Scenario 2: | Two borrowers of different gender, which may include a husband and wife, business partners, etc. |
| Scenario 3: | Two borrowers of the same gender, which may include a parent and child, siblings, business partners, gay partners, etc. |

Figure 9:
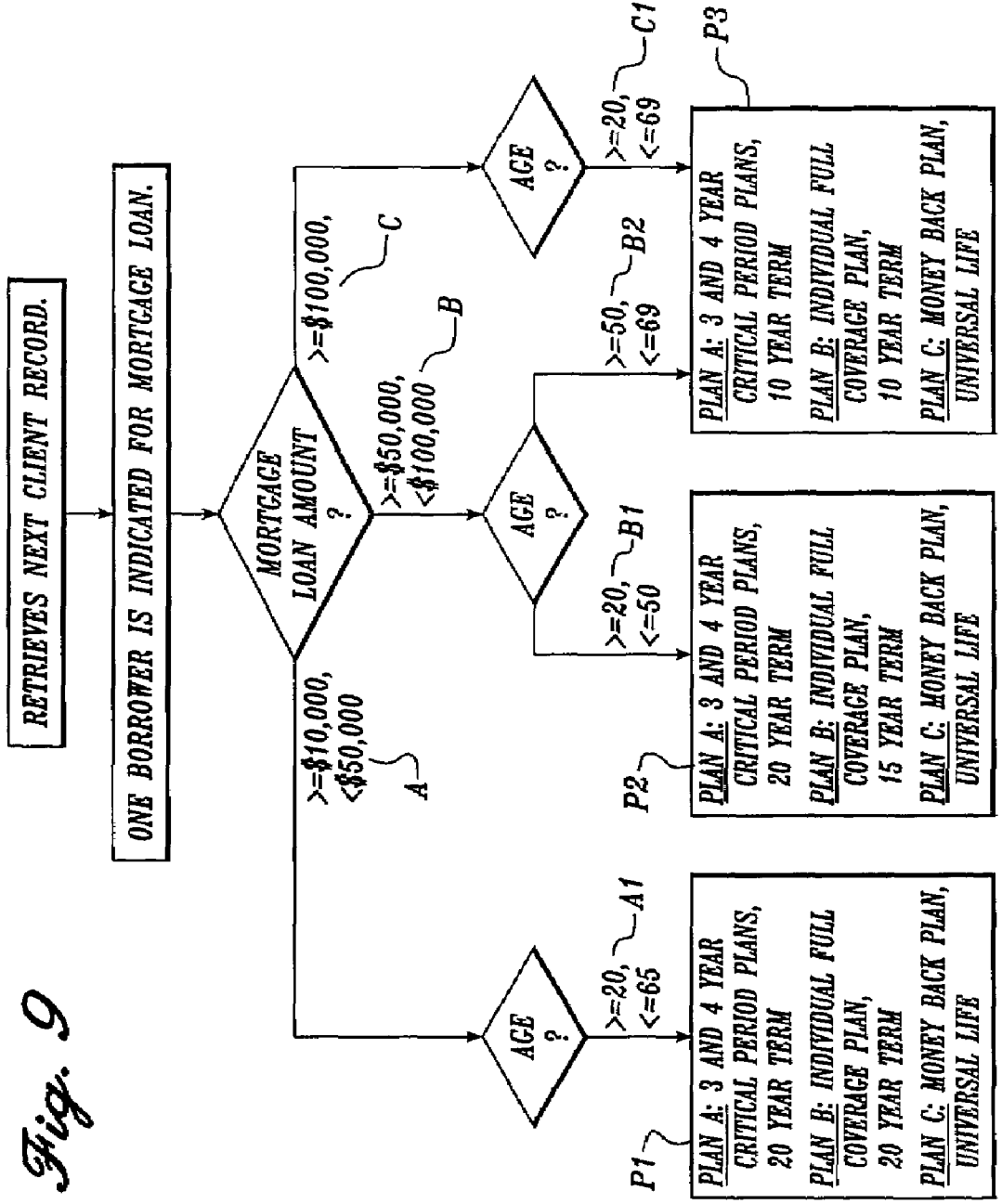
FIG. 9 is a flow chart diagram illustrating a specific example of the organization and flow of the processor module specifically pertaining to a mortgage life insurance-related communication.
Figure 10:
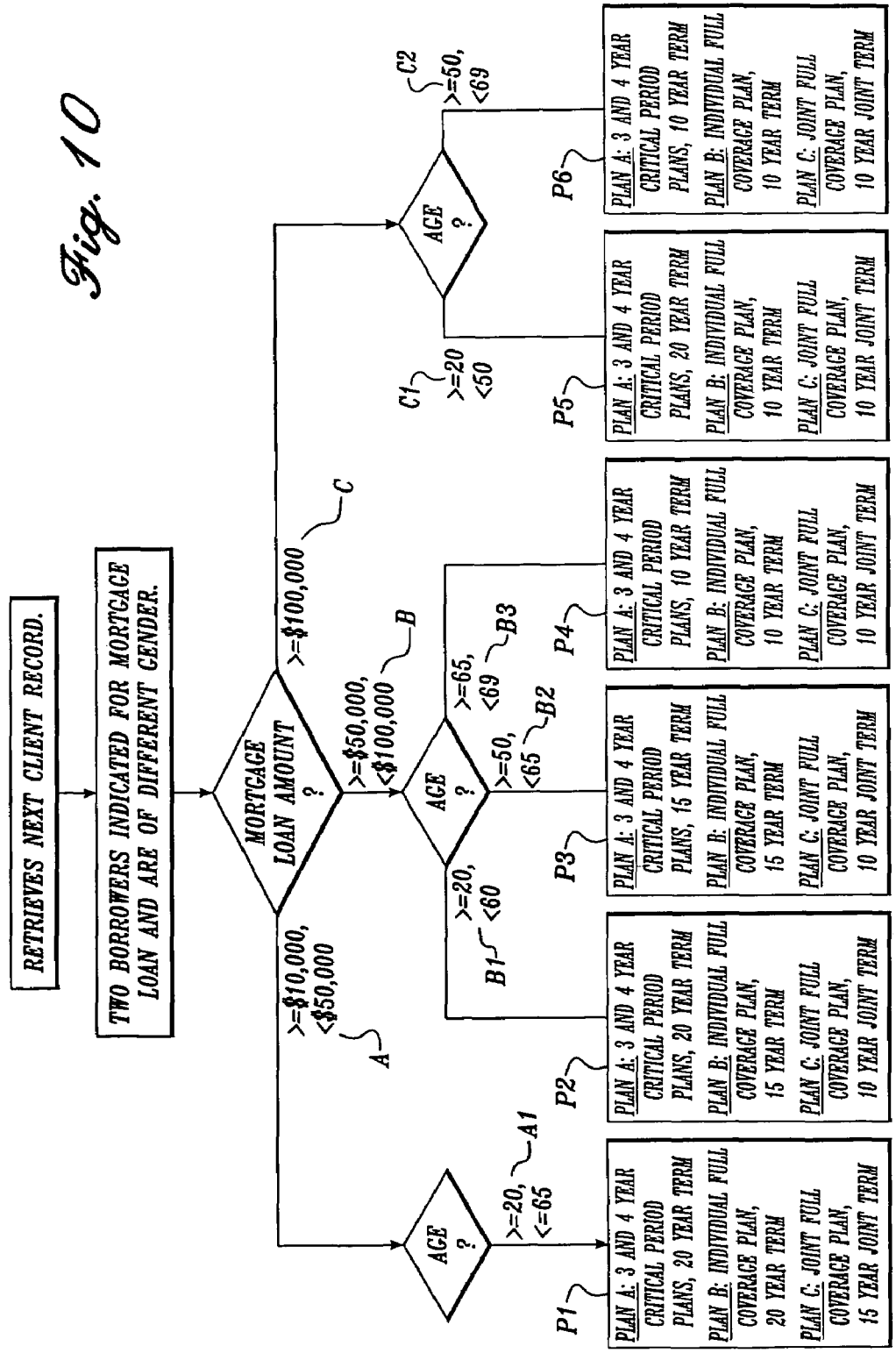
FIG. 10 is a flow chart diagram illustrating another specific example of the organization and flow of the processor module specifically pertaining to another mortgage life insurance-related communication.
Figure 11:
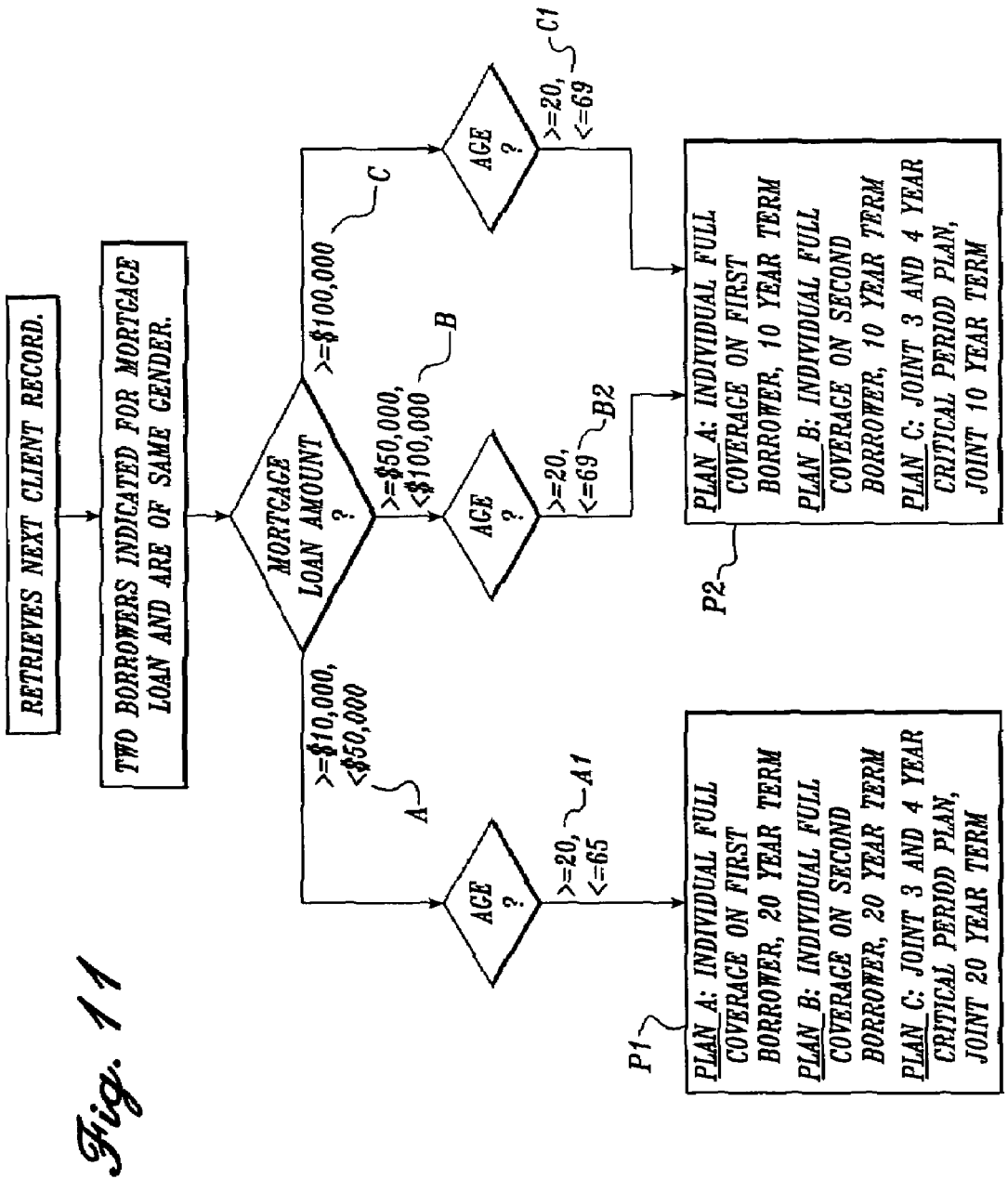
FIG. 11 is a flow chart diagram illustrating a specific example of the organization and flow of the processor module specifically pertaining to another mortgage life insurance-related communication.

As part of the retrieved decision making criteria, the processor module would retrieve the information depicted graphically in FIGS. 9 through 11. If the client record under consideration reflected a single borrower, the processor module would employ the decision making criteria (decision information) reflected in FIG. 9. According to those criteria, the processor module would determine into which of three mutually exclusive categories the mortgage falls based on the loan amount. In this example, loan amounts of at least $10,000 but less than $50,000 would fall into category A. Loan amounts of at least fifty thousand dollars but less than one hundred thousand dollars would fall into category B, whereas loan amounts of at least one hundred thousand dollars would fall into category C. At a second level of decision making, the age of the borrower would be considered. For borrowers in category A between the ages of twenty (20) and sixty-five (65), the processor module would select product package number 1 (P1), which includes three alternative plans, i.e., plan A, plan B, or plan C, as described in the box for package P1 in FIG. 9. Note that for any age or mortgage loan amounts outside the ranges indicated in FIG. 9, no proposal would be made because of issue constraints.

To the extent the client record falls into category B based on loan amount, the agent borrower similarly would be used to further categorize the record. In this illustrative example, category is segregated into two age categories, i.e., B1 and B2. Category B1 includes borrower of at least twenty (20) but less and fifty (50). Category B2 includes ages greater than fifty (50) but less than sixty-nine (69). Those records qualifying under category B1 would result in the proposal of a package P2. This package P2 would include three optional proposals, as described in the box for package P2 in FIG. 9.

For category B2, a package P3 would be proposed. Package P3 similarly includes three optional plans, as described in the box for package P3 in FIG. 9.

For those records falling within category C, i.e., involving loan amounts of at least $100,000, package P3 would be proposed.

The processor module would analyze each client record to recognize scenario #2, i.e., two borrowers of different gender. The decision making criteria and processing undertaken for records qualifying under scenario #2 is depicted in FIG. 10. Processing under this scenario would be very similar to that described above with regard to FIG. 9. At the initial level, each record would be categorized based on loan amount. Segregation at a second level would occur based on age of the first or principal borrowers Similarly to FIG. 9, those clients qualifying under scenario #2 and falling within category A1 would be proposed a package P1 which includes three optional plans, i.e., A, B and C. A package P2 would be proposed to those clients qualifying under category B1 in FIG. 10. For those clients qualifying under category B2, a package P3 would be proposed. For those clients qualifying under category B3 of FIG. 10, a package P4 would be proposed. For clients qualifying under category C1, package P5 would be proposed. For those clients qualifying under category C2, a package P6 would be proposed.

Where the client record indicates there are two borrowers of the same gender, scenario #3 would be implicated. The decision making criteria and processing for this illustrative example is shown in FIG. 11, which follows the same logic and processing of FIGS. 9 and 10.

In these illustrative insurance examples, two methodologies may be employed for selecting the variable product information, i.e., a product and/or product provider-specific methodology and a "best policy" analysis methodology. Both of these methodologies taken to account the information from substep D3. The first methodology considers each of the various factors which may be used to evaluate the attractiveness of that product for the particular client. Such factors considered by the processor module may include the premiums, issue constraints, compensation paid to the system user, product provider, etc., and underwriting requirement.

The "best policy" methodology evaluates and analyzes a potentially large number of product providers and products which best meet a specified set of criteria, for example, by picking the product having the lowest premium for the client.

In step I of processor module processing according to this embodiment and method (FIG. 8), the module analyzes the past or current performance on a real-time basis of various sale programs. It identifies on a real-time basis who is buying on any geographic or any demographic basis. This step involves determining what the individual client is most likely to buy, making the end users aware of that fact, recommending changes, and if given permission, or appropriately coded, automatically implementing the changes, which may occur even during the running of the module.

To better illustrate the organization, operation and flow of the processor module, another example, i.e., one involving the logic associated with the marketing of life insurance, will now be explained with reference to FIG. 12. Steps C, D, E, . . . of FIG. 12 correspond to the similar steps of FIG. 8. In step C, the processor module retrieves a client record for analysis. In step D, the module identifies the insurance need for the client, e.g., to replace lost income.

In step E, the module analyzes and evaluates client information for this client, including all pertinent client demographics available to the system. The system also may retrieve and use additional demographic data, for example from a geo-coding module.

The database module of this preferred embodiment includes a geo-coding module which includes geo-coding data. This geo-coding data can be organized by zip code and includes statistical information regarding location, average income, average education, average property values and the like within that zip code area. It can obtain in real-time any field of demographic information for use contained within the United States census.

Figure 12:
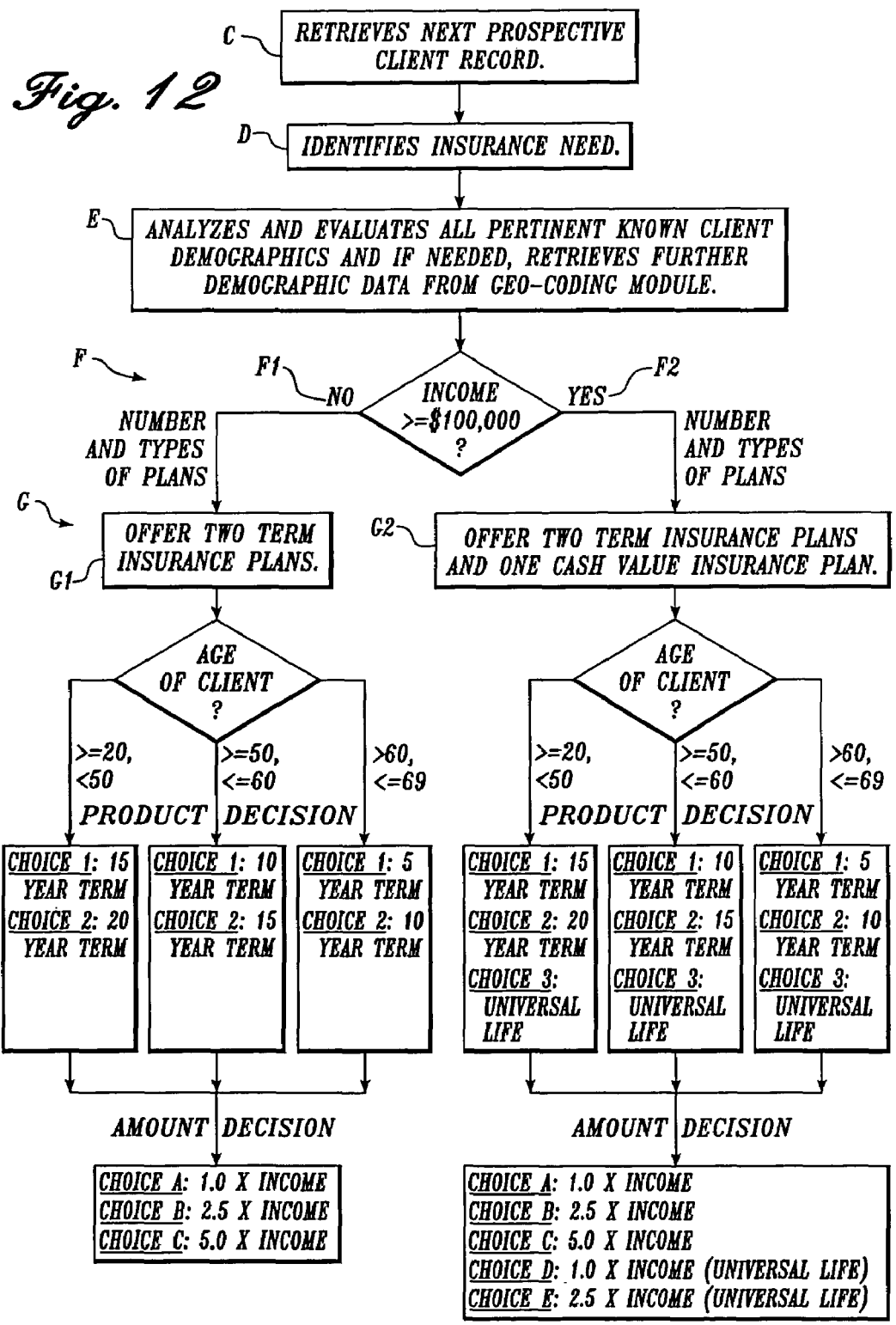
FIG. 12 is a flow chart diagram illustrating a specific example of the organization and flow of the processor module specifically pertaining to a basic individual life insurance-related communication.

In this illustrative example shown in FIG. 12, step F involves segregating client records by annual income. For client records reflecting an annual income of less than one hundred thousand dollars, processing continues along a path F1. For client records reflecting an annual income of at least one hundred thousand dollars, processing proceeds along a path F2.

In step G of FIG. 12, clients falling under category F1 are offered two optional term insurance plans, depending on the age of the client. For those clients having an income of less than one hundred thousand (path F1), two term insurance plans would be proposed, but specifically which two would depend upon the age of the client. For clients at least twenty

(20) years old but younger than fifty (50) years, their choices would include a 15 year term policy and a 20 year term policy. For clients aged at least fifty (50) but less than sixty, the choices would include a 10 year term policy and a 15 year term policy. For clients older than sixty (60) but not over sixty-nine (69), the two choices would include a 5 year term policy and a 10 year term policy. In each of these instances, three separate coverage amounts for each of the two policies proposed would be presented. In this illustrative example, the system user may select between an Option A and an Option B. Under Option A, only specified products and/or specific product providers may be considered. Under Option B, a variety of products and product providers may be considered in selecting the appropriate plans and products for selection.

In step H of the processor module flow of FIG. 8, the module selects a specific amount or amounts of coverage to propose under each plan. This decision is based on the information as compiled in step D as described above.

These three coverage amounts are determined by multiplying the annual income by a multiplier and rounding (e.g., to the nearest $5,000 or $10,000). The multiplier for path F1 would be 1.0, 2.5 and 5.0 for plan A, B and C, respectively.

For those clients who have annual incomes in excess of at least one hundred thousand dollars (path F2), the processor module optionally proposes two term insurance plans and one cash value insurance plan. The specific plan again depend on the age of the client among other things. For clients at least twenty (20) but less than fifty (50) years old, the choices include a twenty year term policy, a 15 year term policy, and a universal life policy. For clients at least fifty (50) but no more than sixty (60), the choices include a 10 year term policy, a fifteen year term policy, and a universal life policy. For clients older than sixty (60) but less than sixty-nine (69), the choices proposed are a 5 year term policy, a 10 year term policy, and a universal life policy. In this example the processor module also selects an amount of coverage based on income. Specifically, five alternative levels of coverage are proposed corresponding to annual income multipliers of 1.0, 2.5 and 5.0, respectively.

Financial product information also may be used to select the variable information. To illustrate, a particular financial product may be offered at one price in some states and at another price in others. As part of the decision information, the system and method may use this pricing information to select text and/or pricing information as variable information for inclusion in the respective client communications.

In some instances it may be useful or otherwise desirable to use separate software packages or "link programs" to provide financial information. A link program, for example, may be used to calculate insurance premiums based on a selected set of client information. The premiums then would be imported back into the system software of FIG. 2 and used as financial product information, such as product pricing data.

The subset or subsets of the variable information selected for a given client is adapted to be inserted into or provided as an integral part of the corresponding variable portion or portions of the client communication for that client. Depending upon the manner in which the tasks are segregated, the output of the system software therefore may comprise the completed client communications ready as they are delivered to the clients. Short of this, however, the system output may comprise an intermediate product such as the subset or subsets of the variable information themselves, ready for inclusion or integration into the client communication or communications, but not yet so integrated or merged.

In the latter instance, i.e., where the system output comprises unintegrated subsets of the variable information themselves, ready for inclusion or integration into the client communications, these variable information subsets preferably would be stored and provided as part of the client information database, e.g., as was provided as part of the initial system and method input, or as a separate database. Each record of the database would include the subset of variable information for that client, as well as an identifier to identify the client, such as client name, account number, etc. This client output database could be stored, for example, to RAM 28, mass storage 30, or other suitable storage medium.

As an optional but preferred step in the method, the variable information is automatically inserted into the client communications. This step preferably involves generating the client communication according to the communication format, wherein the generating step includes inserting the subset of variable information into the variable portion of the client communication corresponding to the variable portion of the client communication format. The variable information preferably is inserted or merged into the format or other text of the client communication without unwanted gaps or spaces, so that the entire document appears to be created from a single source, or the entire document appears to be an integrated whole. The merged subset or subsets of the variable information may be formatted with the same font or a compatible font to achieve this end.

A primary objective is to deliver the finalized client communications to the clients. Accordingly, the preferred method includes a step of generating the client communications according to the communication format. The generating step includes inserting the variable information or a subset of the variable information for a given client into the variable portion of the client communication for that client. The preferred embodiment of the invention similarly includes output preparing means in operative communication with the processing means for preparing the client communication and automatically inserting the variable information or variable information subset into the client communication. In the preferred embodiment, the output preparing means comprises a computer, such as processor 12 and its CPU 26, in conjunction with and operating under the sales presentation and output module ("output module). The output preparing means of this embodiment also includes laser printer 32, modem 20, and similar means for creating the final form of the client communications, whether they be in the form of printed paper, electronic mail, or other form. Where the client communication is to be transmitted on a network or other electronic medium, for example, the output preparing means may comprise another computer.

The output module uses the information obtained from the processor module and optionally from other sources to generate, design, individualize and particularize all of the client communications. Marketing solicitations, ads, product- or service-related notices, presentation letters, followup letters, and reminders all would be examples of such client communications. The output module automatically prepares and outputs a client communication, for example, in a faun of a marketing solicitation, which provides information sufficient to enable the client to make informed, intelligent decision regarding the purchase of the plans or products selected by the processor module, or sufficient to gain the interest of a prospective buyer and motivate him or her to seek additional information. The processor module creates these client communications in a manner using a format which personalizes and individualizes the information presented to the client.

The output module of the preferred embodiment and method does not merely insert client information in the header of the client communication, nor does it merely import product information from the generic product information directly from the product-related database into the communication. The output module instead selectively can use substantial portions of client information, product information, and in many instances other information as well to generate a particularized communication tailored to the particular client for whom the communication is to be sent. The communications therefore typically will vary from individual client to individual client.

Client communications generation according to the preferred embodiment and method involves organizing, formatting and outputting client communications using information received generally from the processor module. As explained, the processor module uses client information, information about available financial products, and perhaps other available information to recommend products, plans, and the like specifically tailored to each client. The output module allows the system user to define a particularized communication format for classes of customers, such as for potential individual mortgage insurance clients. It then generates highly individualized communications specifically tailored to present that client with individualized plan and product presentations, reminders, followup, etc.

The output module is adapted to present its output in a variety of forms. For example, the output can be displayed on display 14 for visual inspection by the system user, or client, etc. The output also may be in the form of a printed communication or document using a printer such as a laser printer. It may be in the form of an automated document or data file or both, and it also may be in a form suitable for transmission, for example, over modem 20 or to a network, with or without simultaneous video conferencing.

The particular format of client communication outputs will depend upon the specific circumstances, such as client demographics, plans and products offered, and marketing objectives of the particular application. Examples of client communications prepared using the preferred system and method and employing individual mortgage life insurance programs and using a procedure similar to that described above with respect to FIGS. 9-12 are attached as Appendix 1 and Appendix 2.

Figure 13:
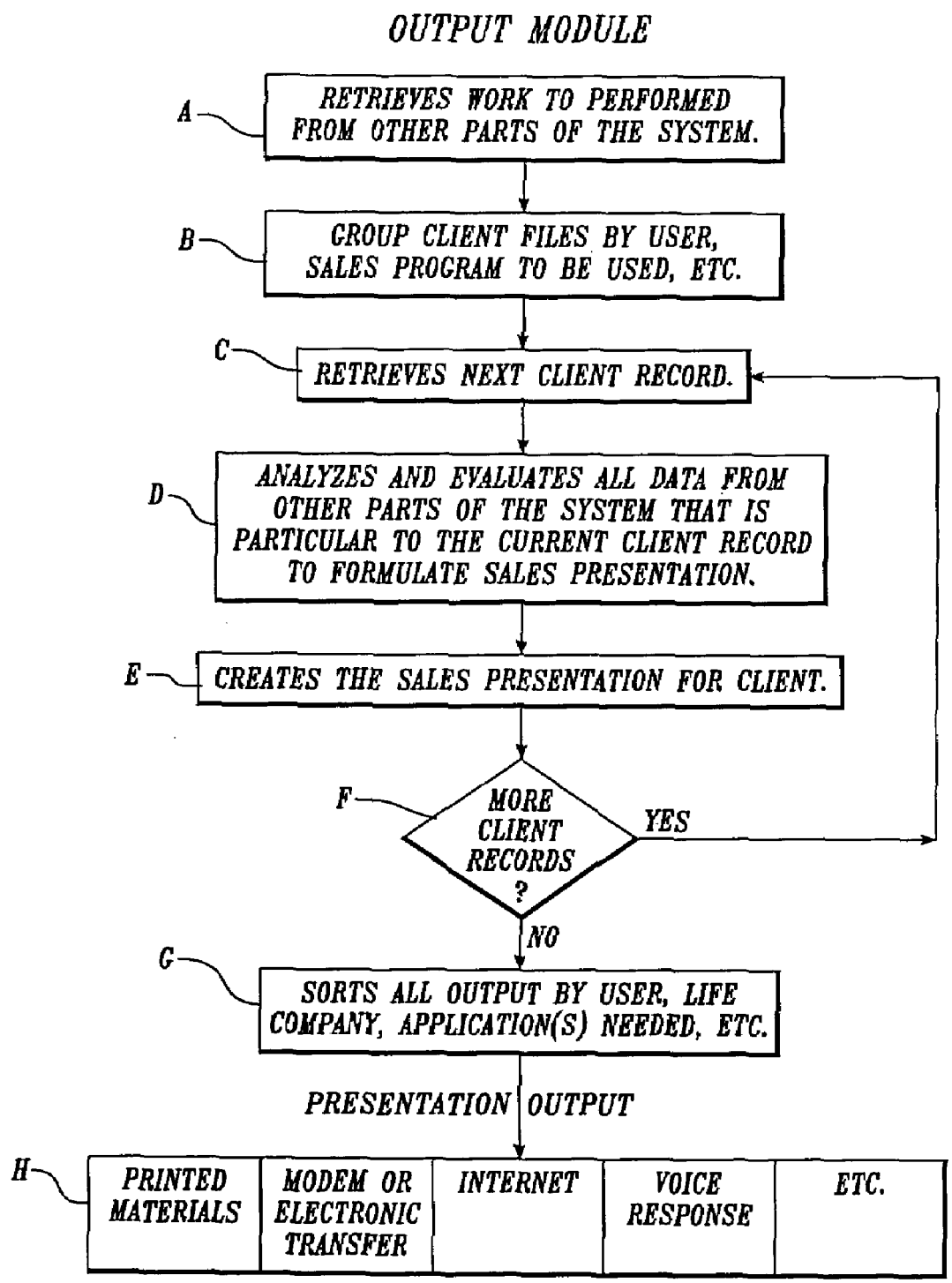
FIG. 13 is a flow chart diagram illustrating the organization and flow of the sales presentation and output module of the preferred embodiment and method as depicted in FIG. 2.

FIG. 13 presents an illustrative flow chart diagram of the logic flow of the output module for the preferred embodiment and the preferred method. In step A of FIG. 13, the output module retrieves work to be performed from other parts of the system. For example, after a set of client records has been processed with the processor module as described above, the output module would retrieve those files and store them in temporary memory locations so that a client communication, for example, can be prepared for each client record. As part of step A, the output module retrieves instructions which would be used in preparing the client communication or other communications output. The specific nature and content of these instructions will depend upon the specific type of client communication to be prepared and the specific format for the client communication. The specific examples to be presented below also provide a description and explanation of the types of the instructions used by the output module in preparing communications.

In step B of FIG. 13, client files are grouped by user, or by the sales program to be used, or by other criteria specified by the system user. Grouping criteria preferably would be selected by the system user during a setup phase, and would remain unchanged indefinitely until a different set of grouping criteria is desired.

The processing of a set of client records to generate and output a corresponding set of client communications primarily takes place between step C and F of FIG. 13. More specifically in step C the output module receives a client record for processing. In step D, the output module analyzes and evaluates the client information from the client record, the corresponding output from the processor module for that client record, and other data or information needed to construct the communication. Other forms of data or information which might be retrieved at this point could include geocoding data, demographic data, and the like.

In step E, the output module uses the instructions for preparation of the communication, together with the data and information from step D, to prepare the client communication. The specific manner in which the instructions and the information are used to construct the communication will vary depending upon the application, the specification of the system user and other factors. To better understand and appreciate this aspect of the invention, however, we will refer to the client communication attached hereto as Appendix 1, which is a sample communication presenting individual mortgage life insurance. Appendix 2 provides another very similar example, to which the description of Appendix 1 generally applies as well.

The sample format used for this client communication includes eight sections. Each section may or may not use information variables and insertion logic to construct the text or presentation of the section, and decisional logic (decision information) is employed to determine what if any states the variable is to assume. In other words, the instructions and/or decision logic may be employed in various places throughout a section and throughout the entire communication to adapt the communication to the particular circumstances of the client. The following discussion will provide more concrete examples of these features.

The output module may include any one or any combination of at least four types of logic or variables, including (1) customer information logic, (2) words/paragraphs/sentence ("text") logic, (3) product/plan/amount of coverage/payment mode/underwriting logic, and (4) pricing logic. "Logic" or "variable" as referred to herein may involve the placement of a particular word, number, phase, or item of information in a particular place within the communication. Insertion of such items within a blank space in a sentence would be an example. Client information logic refers to the place of the selective placement of client information in a particular location, blank space, or gap in a communication. "Text logic" refers to the insertion of Words, Paragraphs, Sentence etc. other than client information, product type and related information and pricing information, which is selectively placed in a specific location, blank space or gap in the communication. Products/Plans/Amount of Coverage/Payment Mode/Underwriting Logic ("product logic") refers to information pertaining to any of these topics, which is to be placed in particular location, blank space or gap in the communication. Pricing logic refers to pricing information which pertains to the product which is to be positioned in a particular location, blank space or gap (variable) in the document.

The purpose and function of each of the illustrative sections as created by the output module will now be outlined and discussed. It should be borne in mind that this sample client communication is merely an example, and that virtually an infinite number of alternative formats and designs is possible.

Section 1 describes the "need" for the proposed product and why the proposal or offer is being made to the client. In the individual mortgage life insurance application, the need is straightforward, i.e., to provide funds to pay the mortgage or liquidate it upon the death of the mortgagee so the family may retain ownership of the home without the burden of a mortgage. In the individual life insurance application, the need may be less apparent because there are so many individual uses of the product, a prime example of which is replacement of lost income.

In terms of variables, in this section, for example, the client name, address, the loan number and the loan amount constitute client information logic gleamed from the client record. The entry at the top of the letter at "Co-Mortgager" as well as the name of the company of the third paragraph of the letter constitute text logic. The mortgage loan amount in the fourth paragraph of the communication again constitutes client information logic.

Section 2 of the sample form client communication presents proposed solutions to the need. This usually involves identifying and presenting alternative plan(s) or financial product(s) to meet the need, and factors such as the provider, coverage and price particular to each plan and product. Referring again to Appendix 1, most of section 2 comprises product logic and pricing logic. The boxed portion in which the client may select the desired plan also includes product logic, for example, in that not all product proposals will include the same plans as has been demonstrated in the examples shown above. Much of the information presented in the footnote supplementing the product presentation involves text logic, but client information logic (e.g., personal information about the client), product logic, and pricing logic also appear in this footnote material. The footnotes both front and back are highly individualized throughout.

In the case of individual life insurance, the proposed plans may include various plans which include term insurance products, and permanent insurance plans such as whole life, universal life, variable life, and the like.

Section 3 of the sample communication format of Appendix 1 explains the various products selected by the processor module for presentation to the client in this presentation. This section may include text logic and product logic, for example, in that is may provide alternative descriptions, explanations, even different tone of writing depending on such things as the age of the client.

Section 4 of the sample communication format of Appendix 1 explains each plan utilized and selected by the processor module. This section typically would include text logic and product logic in that the description would change for the various products and classes of the various plans and products. The description of plans will vary with the plan selected. In addition, for a given plan the explanation may change to more particularly addressed a given client or class of clients. For example, the explanation provided to a client in the twenty (20) to forty (40) year old category may differ from the explanation from for the same product provided to a client in the sixty-five (65) to sixty-nine (69) year old range. Similarly, the explanation for a single male may differ for a given product from the explanation provided for the same products to a married couple.

Incidentally, the location of the various sections as described herein would not necessarily appear sequentially, e.g., section 1, 2, 3, . . . The order may be changed or mixed, and information from one section may be intermingled or interposed with information from another section or sections. Sections and what is contained therein also may be subject to change frequently. The number of sections also may vary.

Section 5 of the sample communication format explains to the client if there are requirements to qualify for a particular plan presented, if any. These requirements will be listed in this section 5 (if the plan requires such based on among other things, amount of insurance, age, etc.) if it is necessary to qualify with more than just the standard application presented to the client. Much of the logic here centers around Plan/Product/Amount of Coverage/Underwriting Logic, etc., text logic, and client information logic.

Section 6 of the sample communication format explains in clear, concise and individualized terms how to obtain the coverage. This section typically will include customer logic in personalizing the presentation, e.g., by inserting the clients name in various places in the text, and product logic in explaining the requirements specific to a particular product(s).

Section 7 of the sample communication format presents, in question and answer format, for example, important information and commonly asked questions regarding the plans and products shown in the presentation. This section typically would include text logic, e.g., to refer to the system user or product marketer. It also may include client information logic, e.g., to refer to specific circumstances which the customer may encounter.

Section 8 of the sample communication format is variable in nature, and may be customized for a given application, product set, system user, etc. It may, for example, provide information on how to obtain additional information, help with application forms, additional price quotes, etc. Given its customized format it may include any of the logic forms as variables, as may essentially any other section.

Through designation by the system user in interaction with the system, the output module creates the format to be used, the specific information to be included within the format, and the specific locations in the output format where the specific items of information will be used. It also formats all sections to be easy to read and highly organized, no matter what amount of information is contained in the output.

The method according to the invention also may and preferably does include a step of automatically combining the client communication with the host vehicle to create a combined communication, wherein the combined communication comprises a single document, again using the term document in its broad sense. Where a plurality of client communications are to be prepared, this step includes automatically combining the client communication for each of the clients with the host vehicle for the corresponding and respective one of the clients to create a combined communication for the corresponding and respective one of the clients, wherein each of the combined communications comprises a single document.

In accordance with the preferred method, all client communications sent to the client could be accompanied by an application for the financial product, together with an envelope or other means to facilitate return. For example, the client communication would be accompanied by a application for the products presented therein with a return envelope. This also could include electronic communication forms, such as by return e-mail, etc. This effectively results in a one-step sales process for any or all sales programs and products marketed by the system. In many instances, little or no human interaction or involvement is required in the marketing and purchasing process beyond the initiation of the system to provide the appropriate input information.

Turning now to the administrative and support system as illustrated in FIG. 2, the various modules of this system are intended to provide support functions for the Core System modules. In addition, they include management and administrative support modules to aid management in the system, including operation of the core system, scheduling of follow-ups, future communications, etc., with little or no need for human involvement.

The production and scheduling module automates scheduling of marketing sales, preparing budgets, and the like. A flow diagram outlining the logical organization and flow of the production and scheduling module according to the preferred embodiment and method is shown in FIG. 14.

In step A of FIG. 14, the production and scheduling module accepts, stores and allows for future modification instructions for system user(s), and for all sales programs for which the system user will utilize the system. Future add-on sales programs can be easily accepted.

As shown in step B of FIG. 14, the production and scheduling module analyzes and evaluates the jobs which are to be performed by the system. This is done on a daily basis. With this information as an input, the production and scheduling module schedules operation of the core system and instructs the system to operate accordingly, as indicated in step C. In the course of this scheduling and the instruction, the production and scheduling module operates according to a set of predetermined criteria to determine the ordering and scheduling of the system operation and job performance.

As jobs are completed, the production and scheduling module causes that fact and others to be recorded in each of the client records for which processing has been successfully completed. This is indicated in step E of FIG. 14.

As an administrative support role, the production and scheduling module is capable of generating hard copy, readable, production reports, e.g., on a daily basis, as indicated in step F. of FIG. 14. Production reports may be useful for system users and operators, for example, for allocating and providing sufficient supplies, paper, toner, etc. The system also is capable of generating management reports which can aid management in activity planning, resource allocation, budgeting, etc.

The production and scheduling module also is useful for automatically following up on pre-defined activities. A key attribute of the production and scheduling module is it's ability to remember a virtually unlimited number of users and user sales program(s) and implement a virtually unlimited number of instructions for the system to begin work at any point in the future.

The sales & financial report and analysis module ("sales and report module") assembles, calculates and outputs sales, test, financial and projected earnings reports. This can be done on a real-time basis with the preferred embodiment and method.

Figure 15:
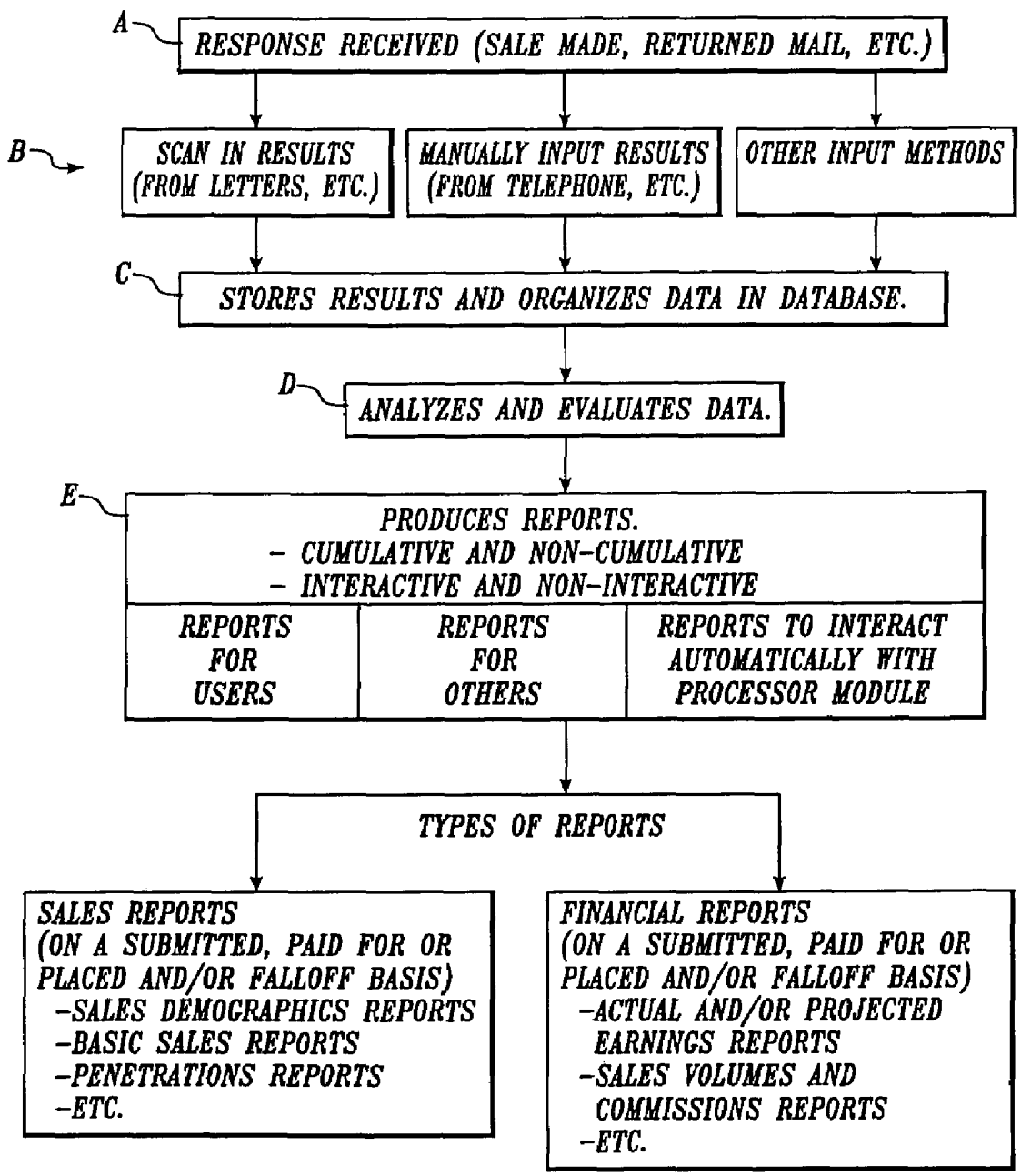
FIG. 15 is a flow chart diagram illustrating the organization and flow of the sales and financial report and analysis module of the preferred embodiment and method as depicted in FIG. 2.

A flow chart which illustrates the organization and flow of the sales and financial report and analysis module for the preferred embodiment and method is shown in FIG. 15. This particular example pertains to the marketing and sale of life insurance products. As shown in that illustrative diagram, step A involves receiving sales information based on sales of financial products actually made. In step B, these sales results are inputted into the system, manually, by scanning, or by other methods described above which regard to the data input module. In step C of FIG. 15, these results are stored and organized in a sales database resident in the database module.

The sales report module analyzes and evaluates this sales data, e.g., by segregating and compiling it in formats and statistical summaries useful in management. Once calculated, compiled, etc., the data may be incorporated into and reported as sales reports, as reflected in step E of FIG. 15. These reports may be cumulative in nature or they may be non-cumulative, essentially reflecting snapshots in time. The reports also may be interactive or non-interactive, depending on the format selected, the output mode, etc. The reports may be provided to system users, management, etc. These reports also may be used in digital or automated form to interact automatically with other modules of the system, for example, the processor module.

The sales reports may compile such information as sales demographics, penetration, etc. They may reflect such statistics on several basics, such as sales submitted, the number of sales actually placed, as policies and the number of sales which resulted in falloff (for which no policy was issued or taken).

The sales module also is adapted to generate financial reports. These financial reports also may reflect sales on a submitted, placed, and or falloff basis. They may be incorporated with other data to reflect actual and/or projected earnings reports, commission reports, and the like.

Figure 16:
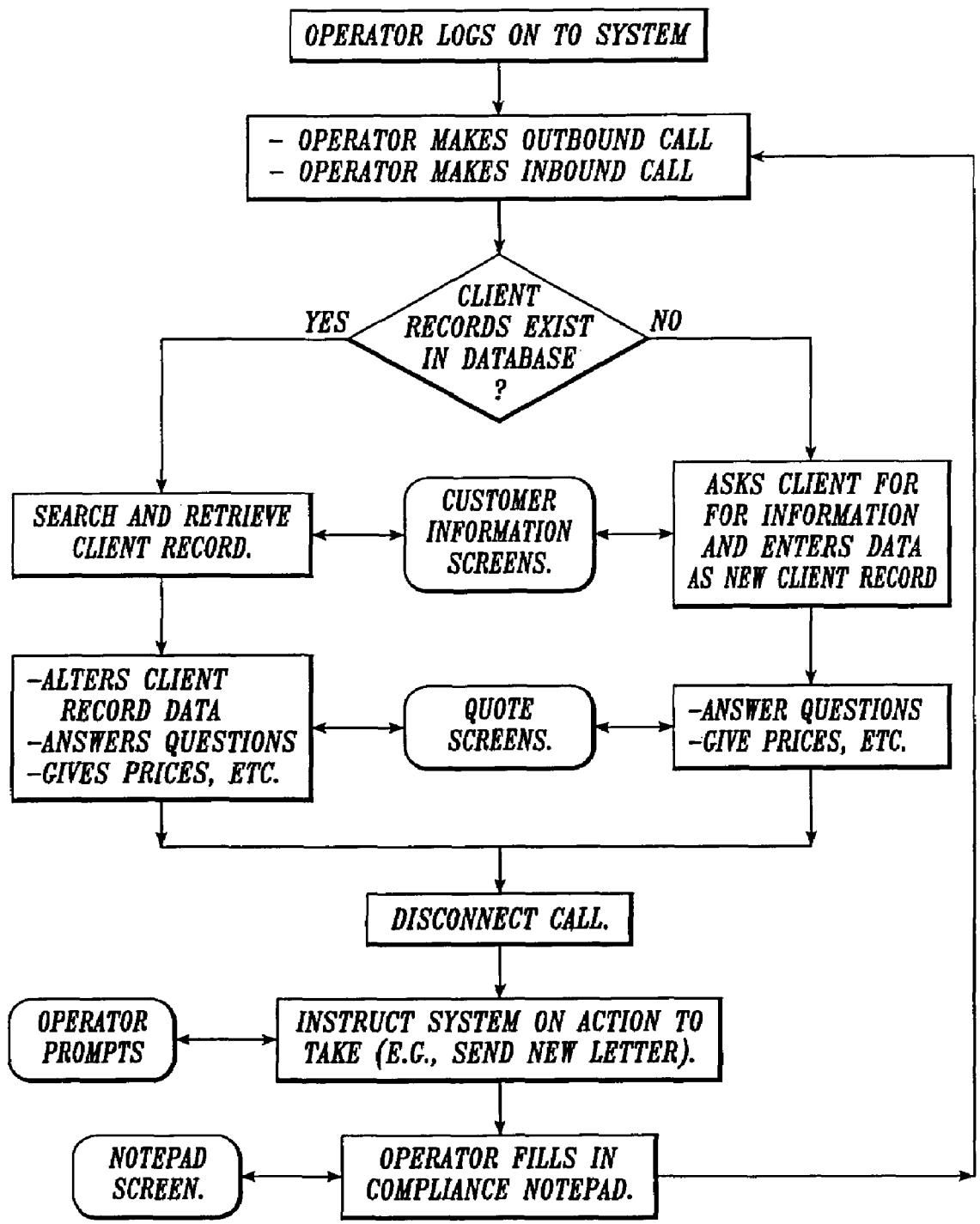
FIG. 16 is a flow chart diagram illustrating the organization and flow of the telemarketing module of the preferred embodiment and method as depicted in FIG. 2.

The system also supports a telemarketing function using the telemarketing module. An illustrative flow chart which outlines the organization and flow of the telemarketing module according to the preferred embodiment and method for the marketing of life insurance products is shown in FIG. 16.

In accordance with that flow chart, the operator would log on to the system and thereby gain access to it. Communications between the operator and clients would take place, for example, through inbound or outbound calls. For existing clients for whom a client record exists in the client database, that record would be retrieved and edited appropriately. Where no client record exists, a new one would be created as reflected in FIG. 16. In both instances, information would be entered into the system so that the client record reflects the appropriate client information. When this task is complete, the call is disconnected. At this stage, the operator may instruct the system, e.g., to schedule an input the client record for processing in the core system to generate a client communication. To create a record of the communication the operator would complete the compliance note pad to reflect the conversation and the events which occurred during it.

The automated new business ("new business") module supports the processing for new business. The automated portion of this module supports the future policy holder service and insurance need of the client automatically. Flow chart reflecting the organization and logic of this module is shown in FIG. 17.

Figure 17:
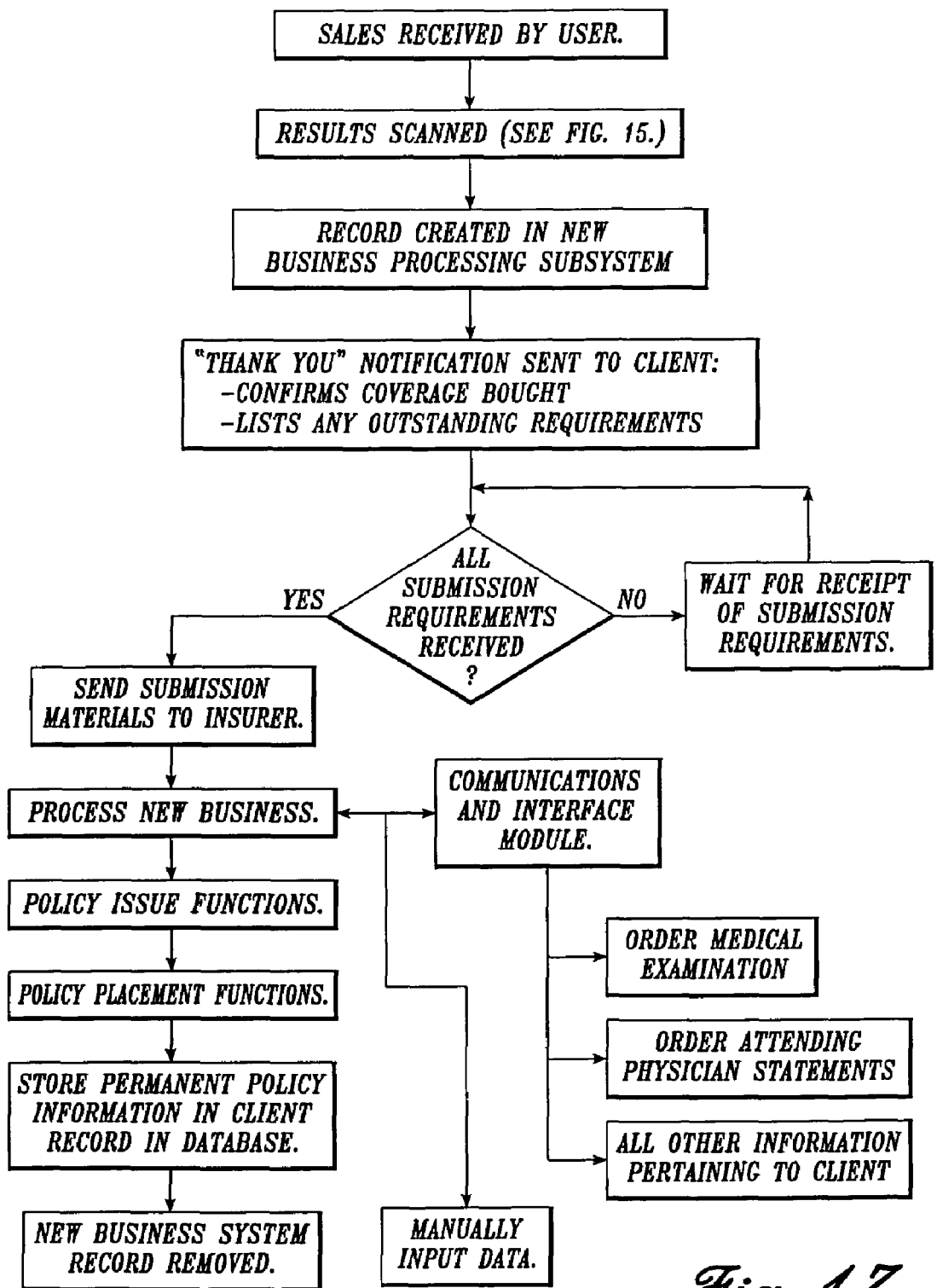
FIG. 17 is a flow chart diagram illustrating the organization and flow of the automated new business processing module of the preferred embodiment and method as depicted in FIG. 2, adapted for use in the marketing and sale of insurance products.

Referring to FIG. 17, as sales are made the sales information is received by the system user. The sale results are inputted, for example, by scanning, or by other input means, e.g., as disclosed in the discussion of the data input module. As new sales are made a corresponding client record is created in this module. The module automatically creates a "thank you" notification, which is particularized for that particular client. It confirms the products that have been purchased and the corresponding coverage. The automatically-generated communications also lists any outstanding requirements the client needs to execute to obtain product.

In addition to generating a confirming notice to the client, the system also manages the tasks, if any which correspond with sales and new business. As reflected in FIG. 17, such followup tasks may include sending submission materials to the product provider, processing the new business, e.g., from an accounting perspective, attending to function relating to issuance of an insurance policy, placement functions, etc. Client records and other system files are updated as appropriate to reflect the sales, the correspondence of the client, etc.

In performing these tasks, it may be necessary in some instances to undertake additional communications, which may implicate the communications and interface module. These communication may be required, for example to order medical examinations, to order attending physicians statements, and to obtain all other information pertaining to the client as required under the circumstances. This module will follow-up on these requirements automatically with no human intervention.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A computer-implemented method of automatically preparing a plurality of specific offerings of one or more financial products or financial services or both for specific entities, with use of a processor and one or more associated databases, the method comprising the steps of:

automatically inputting into the one or more associated databases a plurality of client records without human intervention between input of the respective client records, the client records comprising client data on specific entities;

using the processor to consider said client data on said specific entities and financial product data relating to said one or more financial products or financial services and determine whether to offer a financial product or a financial service or both to the specific entities;

if the processor makes a determination to offer said financial product or said financial service or both to a specific entity, then the processor uses client-specific decision information to automatically select parts of variable information from at least two different databases with client data and financial product data to determine the variable information specific to each specific entity and select the parts of the variable information determined for inclusion in a specific communication formulated to express an offering for said determined financial product or service or both for said specific entity; and using an output module associated with the processor and configured to use at least one automated process to automatically compose the variable information comprising the parts determined to create the communication for each said specific entity such that at least one portion within the communication accommodates the variable information, wherein said variable information for each specific entity comprises at least partially a customized identification, specification and/or promotion of said financial product or said financial service or both wherein said variable information for each specific entity has at least some data that is different and automatically generating each of the plurality of communications without human intervention between the generation of each communication for each specific entity.

2. The computer-implemented method of claim 1, further comprising the steps of:

inputting data from one or more sources into a data processing device associated with the one or more databases, wherein said data comprises ancillary data; and using at least some of said data to determine the financial product or service for each specific entity or said variable information of the communication.

3. The computer-implemented method of claim 2, further comprising the steps of:

storing said data in the one or more databases; and collecting additional data from the one or more sources, and updating said one or more databases with said additional data.

4. The computer-implemented method of claim 2, wherein said one or more sources comprises at least one of the following:

one or more non-resident databases;

one or more sources accessible via modem;

one or more sources accessible via the Internet;

inbound telemarketing databases; and outbound telemarketing databases.

5. The computer-implemented method of claim 1, wherein the step of automatically determining the variable information using the client-specific decision information further comprises: applying said client-specific decision information to retrieve or select information from one or more sources, said retrieved or selected information to be included in said communication.

6. The computer-implemented method of claim 1, further comprising the steps of:

inputting data from one or more sources;

wherein said variable information is generated from said data.

7. The computer-implemented method of claim 1, wherein the step of automatically determining the variable information using the client-specific decision information further comprises the step of:

processing the client data and financial product and at least one other data type according to client specific decision information to determine said variable information.

8. The computer-implemented method of claim 7, wherein the step of automatically determining the variable information using the client-specific decision information further comprises the step of:

processing said variable information according to other decision information to refine said variable information.

9. The computer-implemented method of claim 7, wherein the step of automatically determining the variable information using the client-specific decision information further comprises the steps of:

automatically modifying on a real-time basis said variable information so as to be more desirable to said specific entity.

10. The computer-implemented method of claim 1, further comprising the steps of:

using outbound or inbound telemarketing data to obtain additional data pertaining to said specific entity; and modifying said communication for said specific entity based on said additional data pertaining to said specific entity.

11. The computer-implemented method of claim 1, wherein said variable information comprises at least one of textual components, alphanumeric components, and graphical components.

12. The computer-implemented method of claim 1, further comprising the step of:

generating said communications wherein some communications have differing formats.

13. The computer-implemented method of claim 12, wherein said differing formats differ in one or more of textual components, alphanumeric components, and graphical components.

14. The computer-implemented method of claim 12, further comprising the step of:

selecting a format for a specific entity's communication based on at least data pertaining to said specific entity.

15. The computer-implemented method of claim 1, further comprising the step of:
   designating a delivery medium for each communication that will be used to deliver the each communication to said each entity.

16. The computer-implemented method of claim 15, wherein said delivery medium is at least one of:
   electronic; and
   non-electronic.

17. The computer-implemented method of claim 16, wherein said electronic delivery medium comprises at least one of modem, network, Internet, and video.

18. The computer-implemented method of claim 16, wherein said non-electronic delivery medium comprises printed materials.

19. The computer-implemented method of claim 15, wherein said designating step is performed automatically.

20. The computer-implemented method of claim 15, further comprising the step of:
   selecting a format for said each communication based on said designated delivery medium.

21. The computer-implemented method of claim 15, further comprising the step of:
   selecting a format for said each communication suitable for said designated delivery medium.

22. The computer-implemented method of claim 1, further comprising the step of:
   using a format for each communication suitable for a delivery medium that is to be used to deliver each communication to said each entity.

23. The computer-implemented method of claim 1, further comprising the step of:
   using a format for each communication based on a delivery medium that is to be used to deliver each communication to said each entity.

24. The computer-implemented method of claim 1, further comprising the step of:
   constructing said communication based on data pertaining to said specific entity.

25. The computer-implemented method of claim 1, further comprising the step of:
   delivering said communication to said specific entity based on data pertaining to said specific entity.

26. The computer-implemented method of claim 1, further comprising the step of:
   designating a plurality of delivery mediums that will be used to deliver the communication to said entity.

27. The computer-implemented method of claim 1, further comprising the step of:
   outputting said communication to a data file.

28. The computer-implemented method of claim 1, further comprising the step of:
   automatically generating a communication for a specific entity based on one or more pre-defined events.

29. The computer-implemented method of claim 1, further comprising the step of:
   automatically generating a communication for a specific entity based on a set of predetermined criteria.

30. The computer-implemented method of claim 1, wherein said generating step comprises:
   selectively placing content in said communication.

31. The computer-implemented method of claim 30, wherein said generating step further comprises:
   selectively placing at least some content in blank spaces of said communication.

32. The computer-implemented method of claim 1, further comprising the step of:
   selecting a subset of entities from a set of available entities; and
   performing said steps for only said selected subset of entities.

33. The computer-implemented method of claim 1, wherein said generating step comprises:
   generating said communication using a printing device.

34. The computer-implemented method of claim 1, wherein part of said communication comprises variable information.

35. The computer-implemented method of claim 1, wherein said communication only includes variable information.

36. The computer-implemented method of claim 1, wherein said specific entity is at least one of a client and a potential client.

37. The computer-implemented method of claim 1, wherein said communication format is customized for said specific entity.

38. The computer-implemented method of claim 37, further comprising the step of:
   generating said communication format based on client demographics.

39. The computer-implemented method of claim 37, further comprising the step of:
   generating said communication format based on said financial product or said financial service being offered to said specific entity.

40. The computer-implemented method of claim 37, further comprising the step of:
   generating said communication format based on marketing objectives.

41. The computer-implemented method of claim 1, further comprising at least one of:
   delivering said communication to said entity via printed materials;
   delivering said communication to said entity via modem;
   delivering said communication to said entity via electronic transfer;
   delivering said communication to said entity via internet;
   delivering said communication to said entity via a data file; and
   delivering said communication to said entity via voice response.

42. The computer-implemented method of claim 1, further comprising the step of:
   generating a document comprising said communication.

43. The computer-implemented method of claim 42, wherein said document is an electronic document.

44. The computer-implemented method of claim 42, wherein said document is a printed document.

45. The computer-implemented method of claim 1, the method further comprising the step of:
   delivering said communication and reply means to said specific entity.

46. The computer-implemented method of claim 45, wherein said reply means enable said specific entity to conduct a transaction pertaining to said determined financial product or financial service.

47. The computer-implemented method of claim 45, wherein said reply means enable said specific entity to obtain more information pertaining to said determined financial product or financial service.

48. The computer-implemented method of claim 45, wherein said reply means enable said specific entity to purchase said determined financial product or financial service, as a one-step sales process.

49. The computer-implemented method of claim 45, wherein said delivering step comprises:
providing said communication and reply means to said specific entity electronically or via printed materials.

50. The computer-implemented method of claim 45, wherein said reply means is part of said communication.

51. The computer-implemented method of claim 45, wherein said delivering step comprises:
providing said communication and reply means to said specific entity electronically.

52. The computer-implemented method of claim 45, wherein said delivering step comprises:
providing said communication and reply means to said specific entity via printed materials.

53. The computer-implemented method of claim 1, wherein the step of automatically determining the variable information using the client-specific decision information step further comprises:
(a) determining said variable information by performing one or more calculations.

54. The computer-implemented method of claim 53, wherein step (a) comprises:
performing calculations based on data pertinent to said specific entity to at least one of select, design, and price at least one of a financial product and a financial service.

55. The computer-implemented method of claim 53, wherein the step of automatically determining said variable information using said client-specific decision information step further comprises:
calculating one or more amounts of said one or more particular financial products or financial services to offer to said specific entity.

56. The computer-implemented method of claim 55, wherein the step of automatically determining the variable information using the client-specific decision information step further comprises:
calculating costs of said one or more amounts of said one or more particular financial products or financial services to offer to said specific entity.

57. The computer-implemented method of claim 1, further comprising the steps of:
identifying any types of financial products or financial services that said specific entity needs; and
determining, for each type needed by said specific entity, particular financial products or financial services to offer to said specific entity.

58. The computer-implemented method of claim 1, further comprising the steps of:
identifying whether said specific entity has need for any pre-selected types of financial products or financial services; and
determining, for each type needed, particular financial products or financial services to offer to said specific entity.

59. The computer-implemented method of claim 1, further comprising the step of:
using demographics to at least one of select, design, and price at least one of a financial product and a financial service.

60. The computer-implemented method of claim 1, wherein said financial product or financial service determined relates to a mortgage loan, further comprising the step of:
using data related to at least said mortgage loan to at least one of select, design, and price said mortgage loan-related financial product or financial service.

61. The computer-implemented method of claim 1, wherein said financial product or financial service determined relates to insurance, further comprising the step of:
using data related to said specific entity to at least one of select, design, and price said insurance-related financial product or financial service.

62. The computer-implemented method of claim 61, wherein said insurance comprises at least one of life insurance, health insurance, and annuities.

63. The computer-implemented method of claim 1, wherein said financial product or financial service determined relates to life insurance, further comprising the step of:
determining, based on at least one of demographics, age of said specific entity, income of said specific entity, and other data pertinent to said specific entity, one or more life insurance plans to offer to said specific entity.

64. The computer-implemented method of claim 1, wherein said financial product or financial service determined relates to life insurance, further comprising at least one of the steps of:
selecting, designing, and pricing said life insurance based on at least one of demographics, age of said specific entity, income of said specific entity, and other data pertinent to said specific entity.

65. The computer-implemented method of claim 1, wherein said using and generating steps operate over a set of the plurality of client records.

66. The computer-implemented method of claim 1, wherein the client records do not include identification information or transactional information.

67. The computer-implemented method of claim 1, further comprising the steps of:
designating a first delivery medium that will be used to deliver said communication to said specific entity; and
designating a second delivery medium that will be used to deliver a subsequent communication pertaining to said offer to said specific entity.

68. The computer-implemented method of claim 1, wherein all steps are performed within an automated process without the need for human intervention between each step.

69. The computer-implemented method of claim 1, wherein all steps are performed within an automated process without human intervention between each step.

70. The computer-implemented method of claim 1, wherein all steps are performed using one or more data processing devices, and are performed within an automated process without the need for human intervention between each step.

71. The computer-implemented method of claim 70, wherein all steps are performed without human intervention between each step.

72. A system for automatically preparing a plurality of communication data offering one or more financial products or financial services or both, comprising a processor and one or more associated databases:
means for automatically inputting into the one or more associated databases a plurality of client records without human intervention between input of the respective client records, the client records comprising client data on specific entities;

first determining means within the processor for automatically determining whether to offer a financial product or a financial service or both to a specific entity based on consideration of client data on said specific entities and financial product data relating to said financial product or a financial service;

second determining means within the processor for using client-specific decision information for automatically determining parts of data from at least two different databases comprising the client data and the financial product data to assemble variable information if it is determined to offer said financial product or said financial service or both to said specific entity, the second determining means selecting the variable information for inclusion in the communication data formulated to express an offering for said specific entity;

means for automatically creating the communication data for said specific entity, including at least on data processing device associated with the processor and, the communication data including the variable information, including at least partially a identification, specification and/or promotion for said entity, and wherein said variable information for each specific entity has at least some data that is different; and means for automatically generating each of the plurality of communication data without human intervention between the generation of said communication data for each specific entity.

73. The system of claim 72, further comprising:
means for inputting data from one or more sources; and
means for using at least some of said data to determine content of the communication.

74. The system of claim 73, further comprising:
means for storing said data in one or more databases; and
means for collecting additional data from one or more sources, and updating said one or more databases with said additional data.

75. The system of 73, wherein said one or more sources comprises at least one of:
one or more non-resident databases;
one or more sources accessible via modem;
one or more sources accessible via the Internet;
inbound telemarketing databases; and
outbound telemarketing databases.

76. The system of claim 72, wherein said second determining means comprises means for determining said variable information using client-specific decision information, and further comprising:
means for applying said client-specific decision information to retrieve or select information, said retrieved or selected information to be included in said communication.

77. The system of claim 72, further comprising:
means for inputting data from one or more sources;
wherein said variable information is generated from said data.

78. The system of claim 72, wherein said second determining means further comprises:
means for processing said variable information according to other decision information to refine said variable information.

79. The system of claim 72, wherein said second determining means further comprises:
means for automatically modifying on a real-time basis said variable information so as to be more desirable to said specific entity.

80. The system of claim 72, further:
means for using outbound or inbound telemarketing to obtain data pertaining to said specific entity; and
means for customizing said communication for said specific entity based on said data pertaining to said specific entity.

81. The system of claim 72, wherein said variable information comprises at least one of textual components, alphanumeric components, and graphical components.

82. The system of claim 72, further comprising:
means for generating communications comprising said communication data for said specific entities, said communications having differing formats.

83. The system of claim 82, wherein said differing formats differ in one or more of textual components, alphanumeric components, and graphical components.

84. The system of claim 82, further comprising:
means for selecting a format for specific entity based on at least data pertaining to said specific entity.

85. The system of claim 82, wherein said format is customized for said specific entity.

86. The system of claim 85, further comprising:
means for generating said format based on client demographics.

87. The system of claim 85, further comprising:
means for generating said format based on said financial product or said financial service being offered to said specific entity.

88. The system of claim 85, further comprising:
means for generating said format based on marketing objectives.

89. The system of claim 72, further comprising:
means for designating a delivery medium that will be used to deliver a communication comprising the communication data to said specific entity.

90. The system of claim 89, wherein said delivery medium is at least one of:
electronic; and
non-electronic.

91. The system of claim 90, wherein said electronic delivery medium comprises at least one of modem, network, Internet, and video.

92. The system of claim 90, wherein said non-electronic delivery medium comprises printed materials.

93. The system of claim 89, wherein said designating means operates automatically.

94. The system of claim 89, further comprising:
means for selecting a format for said communication based on said designated delivery medium.

95. The system of claim 89, further comprising:
means for selecting a format for said communication suitable for said designated delivery medium.

96. The system of claim 72, further comprising:
means for using a format for a communication comprising the communication data suitable for a delivery medium that is to be used to deliver said communication to said specific entity.

97. The system of claim 72, further comprising:
means for using a format for a communication comprising the communication data based on a delivery medium that is to be used to deliver said communication to said specific entity.

98. The system of claim 72, further comprising:
means for constructing a communication comprising the communication data based on data pertaining to said specific entity.

99. The system of claim 72, further comprising:
means for delivering a communication comprising the communication data to said specific entity based on data pertaining to said specific entity.

100. The system of claim 72, further comprising:
means for designating a plurality of delivery mediums that will be used to deliver a communication comprising said communication data to said specific entity.

101. The system of claim 72, further comprising:
means for outputting a communication comprising the communication data to a data file.

102. The system of claim 72, further comprising:
means for automatically generating a communication comprising communication data for a specific entity based on one or more pre-defined events.

103. The system of claim 72, further comprising:
means for automatically generating a communication comprising communication data for a specific entity based on a set of predetermined criteria.

104. The system of claim 72, wherein said generating means comprises:
means for selectively placing content data in a communication comprising communication data.

105. The system of claim 104, wherein said generating means further comprises:
means for selectively placing at least some content in blank spaces of said communication.

106. The system of claim 72, further comprising:
means for selecting a subset of client records from a set of available client records; and
wherein said first determining means, second determining means, and generating means operate for only said selected subset of client records.

107. The system of claim 72, wherein said generating means comprises:
means for generating a communication comprising communication data using a printing device.

108. The system of claim 72, wherein a communication comprising communication data only includes variable information.

109. The system of claim 72, wherein said specific entity is at least one of a client and a potential client.

110. The system of claim 72, further comprising at least one of:
means for delivering a communication comprising the communication data to said specific entity via printed materials;
means for delivering a communication comprising the communication data to said specific entity via modem;
means for delivering a communication comprising the communication data to said specific entity via electronic transfer;
means for delivering a communication comprising the communication data to said specific entity via internet;
means for delivering a communication comprising the communication data to said specific entity via a data file; and
means for delivering a communication comprising the communication data to said specific entity via voice response.

111. The system of claim 72, further comprising the step of:
means for generating a document comprising said communication data.

112. The system of claim 111, wherein said document is an electronic document.

113. The system of claim 111, wherein said document is a printed document.

114. The system of claim 72, said system further comprising:
means for delivering a communication comprising said communication data and reply means to said specific entity.

115. The system of claim 114, wherein said reply means enable said specific entity to conduct a transaction pertaining to said financial product or financial service.

116. The system of claim 114, wherein said reply means enable said specific entity to obtain more information pertaining to said financial product or financial service.

117. The system of claim 114, wherein said reply means enable said specific entity to purchase said financial product or financial service, as a one-step sales process.

118. The system of claim 114, wherein said delivering means comprises:
means for providing said communication and reply means to said entity electronically or via printed materials.

119. The system of claim 114, wherein said reply means is part of said communication.

120. The system of claim 72, wherein said second determining means comprises:
means for determining said variable information by performing one or more calculations in accordance with said decision information.

121. The system of claim 120, wherein said first determining means comprises:
means for performing calculations based on data pertinent to said specific entity to at least one of select, design, and price at least one of a financial product and a financial service.

122. The system of claim 72, wherein said second determining means further comprises:
means for calculating one or more amounts of said one or more particular financial products or financial services to offer to said specific entity.

123. The system of claim 122, wherein said second determining means further comprises:
means for calculating costs of said one or more amounts of said one or more particular financial products or financial services to offer to said specific entity.

124. The system of claim 72, wherein said second determining means comprises:
means for identifying any financial products or financial services that said specific entity needs; and
means for determining, for each type needed by said specific entity, particular financial products or financial services to offer to said specific entity.

125. The system of claim 72, wherein said second determining means comprises:
means for identifying whether said specific entity has need for any pre-selected types of financial products or financial services; and
means for determining, for each type needed, particular financial products or financial services to offer to said specific entity.

126. The system of claim 72, further comprising:
means for using demographics to at least one of select, design, and price at least one of a financial product and a financial service.

127. The system of claim 72, wherein said financial product or financial service relates to a mortgage loan, wherein said second determining means comprises:
  means for using data related to at least said mortgage loan to at least one of select, design, and price said mortgage loan-related financial product or financial service.

128. The system of claim 72, wherein said financial product or financial service relates to insurance, wherein said second determining means comprises:
  means for using data related to said specific entity to at least one of select, design, and price said insurance-related financial product or financial service.

129. The system of claim 128, wherein said insurance comprises at least one of life insurance, health insurance, and annuities.

130. The system of claim 72, wherein said financial product or financial service relates to life insurance, and wherein said second determining means comprises:
  means for determining, based on at least one of demographics, age of said specific entity, income of said specific entity, and other data pertinent to said specific entity, one or more life insurance plans to offer to said specific entity.

131. The system of claim 72, wherein said financial product or financial service relates to life insurance, and wherein said second determining means comprises:
  means for at least one of selecting, designing, and pricing said life insurance based on at least one of demographics, age of said specific entity, income of said specific entity, and other data pertinent to said specific entity.

132. The computer-implemented method of claim 1, further comprising the step of:
  determining one or more types of financial products or financial services to offer to said specific entity.

133. The system of claim 72, wherein said second determining means comprises:
  means for determining one or more types of financial products or financial services to offer to said specific entity.

134. The computer-implemented method of claim 1, further comprising the step of:
  selecting the client specific decision information that is used to determine said variable information.

135. The computer-implemented method of claim 1, further comprising the step of:
  inputting and storing the client-specific decision information that is used to determine said variable information.

136. The computer-implemented method of claim 1, wherein said client-specific decision information is a part of control logic.

137. The computer-implemented method of claim 136, further comprising the step of:
  using a module operating according to said control logic to use said the client-specific decision information to automatically determine said variable information for inclusion in the communication.

138. The computer-implemented method of claim 1, further comprising the step of:
  delivering said communication to said specific entity via printed materials.

139. The computer-implemented method of claim 1, further comprising the step of:
  delivering said communication to said specific entity via modem.

140. The computer-implemented method of claim 1, further comprising the step of:
  delivering said communication to said specific entity via electronic transfer.

141. The computer-implemented method of claim 1, further comprising the step of:
  delivering said communication to said specific entity via internet.

142. The computer-implemented method of claim 1, further comprising the step of:
  delivering said communication to said specific entity via a data file.

143. The computer-implemented method of claim 1, further comprising the step of:
  delivering said communication to said specific entity via voice response.

144. The computer-implemented method of claim 1, further comprising the step of:
  determining one or more types of financial products or financial services to offer to said specific entity.

145. The computer-implemented method of claim 144, further comprising the step of:
  determining, for at least some of said types, particular financial products or financial services to offer to said specific entity.

146. The system of claim 72,
  wherein said generating means comprises:
  means for preparing a communication comprising communication data for said specific entity if it is determined that said particular financial product or service is to be offered to said specific entity.

147. The system of claim 146, wherein said second determining means and generating means operate over a set of said plurality of client records.

148. The system of claim 72, wherein said client records do not include identification information or transactional information.

149. The system of claim 72, further comprising:
  means for designating a first delivery medium that will be used to deliver a communication comprising the communication data to said specific entity; and
  means for designating a second delivery medium that will be used to deliver a subsequent communication comprising subsequent communication data pertaining to said offer to said specific entity.

150. The system of claim 72, wherein said first determining means, said second determining means, and said generating means operate without the need for human intervention therebetween.

151. The system of claim 72, wherein said first determining means, said second determining means, and said generating means operate without human intervention therebetween.

152. The system of claim 72, wherein said first determining means, said second determining means, and said generating means operate in one or more data processing devices within an automated process, wherein said first determining means, said second determining means, and said generating means operate without the need for human intervention therebetween.

153. The system of claim 152, wherein said first determining means, said second determining means, and said generating means operate without human intervention therebetween.

154. A computer-implemented method of automatically preparing a plurality of communications offering data of one or more financial products or financial services or both, with use of a processing system and one or more associated databases, the method comprising the steps of:
  automatically inputting into the one or more associated databases, a plurality of client records without human intervention between input of the respective client records, the client records comprising client data on specific entities;

determining with the processing system whether to create an offer of a financial product or a financial service or both to a specific entity, if it is determined to create an offer of said financial product or said financial service or both to said specific entity, then automatically determining, without human intervention, parts of variable information specific to each specific entity based on entity-specific decision information and taking the parts from different databases and composing the variable information as communications offering data created for said specific entity; and automatically generating without human intervention, using at least one automated process on at least one data processing device, data sufficient to produce a communication offering for said specific entity, the communication offering including at least one portion that accommodates the communication offering data comprising the variable information, the generating step including the step of designating placement of the variable information into said at least one portion of the communication offering, wherein the content of the communication offering includes the variable information wherein said variable information in said communication offering includes at least partially a identification, specification and/or promotion of said financial product or said financial service for said specific entity, wherein said variable information has at least one different component among different specific entities and wherein the different components are determined by each specific entity's client information; and automatically generating each of the plurality of communication offerings without human intervention between generation of each communication offering for each specific entity.

155. The method of claim 154, further comprising at least one of the steps of:
 delivering said communication offering to said specific entity via printed materials;
 delivering said communication offering to said specific entity via modem;
 delivering said communication offering to said specific entity via electronic transfer;
 delivering said communication offering to said specific entity via internet;
 delivering said communication offering to said specific entity via a data file; and
 delivering said communication offering to said specific entity via voice response.

156. The method of claim 154, further comprising the step of:
 designating a delivery medium that will be used to deliver said communication offering to said specific entity.

157. The method of claim 156 wherein said delivery medium is at least one of:
 electronic; and
 non-electronic.

158. The method of claim 157, wherein said non-electronic delivery medium comprises printed materials.

159. The method of claim 154, further comprising the step of:
 using a format for said communication offering based on a delivery medium that is to be used to deliver said communication offering to said specific entity.

160. The method of claim 154, further comprising the step of:
 designating a plurality of delivery mediums that will be used to deliver said communication offering to said specific entity.

161. The method of claim 154, further comprising the step of:
 automatically generating said communication offering for said specific entity based on a set of predetermined criteria.

162. The method of claim 154, wherein said generating step further comprises:
 selectively placing at least some content in blank spaces of said communication offering.

163. A method of automatically preparing a plurality of communications offering one or more financial products or financial services or both, with use of a processing system with one or more associated databases, the method comprising the steps of:
 automatically inputting into the one or more associated databases, a plurality of client records without human intervention between input of the respective client records, the client records comprising client data on specific entities;
 determining with the processing system if a financial product or a financial service or both is suitable for an specific entity;
 determining select parts of variable information taken from different databases based on entity-specific decision information concerning an offer for a financial product or financial service or both for inclusion in a communication to said specific entity;
 generating a variable information offer with said select parts of the variable information using a first automated process, without human intervention; and
 automatically generating said communication comprising said variable information to create an offer for said specific entity using a second automated process, the communication having a communication format, wherein said communication format comprises at least one portion that accommodates the variable information, the generating step including incorporating the variable information into said at least one portion of the communication, wherein content of said communication for said variable information offer includes the variable information and includes at least partially a specific identification, specification and/or promotion of said financial product or said financial service or both for said entity;
 wherein said variable information may vary among said entities being offered any single financial product or said financial service or both determined to be suitable for each entity; and
 automatically generating each of the plurality of communications without human intervention between the generation of each communication for each entity.

164. The method of claim 163, further comprising at least one of the steps of:
 delivering said communication to said specific entity via printed materials;
 delivering said communication to said specific entity via modem;
 delivering said communication to said specific entity via electronic transfer;
 delivering said communication to said specific entity via internet;

delivering said communication to said specific entity via a data file; and delivering said communication to said specific entity via voice response.

165. The method of claim 163, further comprising the step of:

designating a delivery medium that will be used to deliver the communication to said specific entity.

166. The method of claim 165 wherein said delivery medium is at least one of:

electronic; and non-electronic.

167. The method of claim 165, wherein said non-electronic delivery medium comprises printed materials.

168. The method of claim 163, further comprising the step of:

using a format for said communication based on a delivery medium that is to be used to deliver said communication to said specific entity.

169. The method of claim 163, further comprising the step of:

automatically generating said communication for a specific entity based on a set of predetermined criteria.

170. The method of claim 163, wherein said generating step further comprises:

selectively placing at least some content in blank spaces of said communication.

171. A method of automatically preparing communications offering one or more financial products or financial services or both, with use of a processing system and one or more associated databases, the method comprising the steps of:

(1) using a first automated process to generate one or more electronic files identifying an entity set determined to be suitable for a financial product or a financial service or both, said entity set comprising a plurality of specific entities, (2) providing variable information for a financial product or financial service for inclusion in a communication to a specific entity;

wherein said variable information consists of a plurality of predefined identifications, specifications, promotions and/or explanations of said financial product or financial service formulated to be specific to each specific entity, which can be included to create an offer to each specific entity;

(3) generating a variable information offer for said specific entity using a second automated process without human intervention, said variable information offer including at least one of said plurality of predefined identifications, specifications, promotions and/or explanations of said financial product or financial service determined to be most appropriate for each said specific entity;

wherein said variable information may vary among different specific entities being offered said financial product or said financial service or both;

(4) automatically generating the communication comprising said variable information offer for said specific entity using the second automated process, the communication with at least one portion that accommodates the variable information, the generating step incorporating the variable information into said at least one portion of the communication, wherein content of said communication includes said identification, specification, promotions and/or explanation of said financial product or financial service or both determined to be most appropriate for each said specific entity;

wherein at least one financial product or financial service or both is predetermined as being suitable for a variable information offer and is at least considered for offering to each entity in said entity set;

automatically generating each of the plurality of communications without human intervention between the generation of each communication for each specific entity; and delivering each communication to the specific entity via the internet.

172. The method of claim 171, further comprising the step of:

using a format for said communication based on said internet medium.

173. The method of claim 171, further comprising the step of:

designating at least one other delivery mediums that will be used to deliver the communication to said specific entity.

174. The method of claim 171, further comprising the step of:

automatically generating said communication for said specific entity based on a set of predetermined criteria.

175. The method of claim 171, wherein said generating step further comprises:

selectively placing at least some content in blank spaces of said communication.

* * * * *